US005600649A

United States Patent [19]
Sharma et al.

[11] Patent Number: 5,600,649
[45] Date of Patent: *Feb. 4, 1997

[54] DIGITAL SIMULTANEOUS VOICE AND DATA MODEM

[75] Inventors: Raghu Sharma, North Oaks; Jeffrey P. Davis, Ham Lake; Timothy D. Gunn, Mounds View; Ping Li, New Brighton, all of Minn.; Sidhartha Maitra, Saratoga, Calif.; Ashish Thanawala, Saratoga, Calif.; Steve Young, Saratoga, Calif.

[73] Assignee: Multi-Tech Systems, Inc., Mounds View, Minn.

[ * ] Notice: The term of this patent shall not extend beyond the expiration date of Pat. No. 5,471,470.

[21] Appl. No.: 527,849

[22] Filed: Sep. 14, 1995

Related U.S. Application Data

[62] Division of Ser. No. 2,467, Jan. 8, 1993, Pat. No. 5,452,289.
[51] Int. Cl.$^6$ ................................................. H04J 3/17
[52] U.S. Cl. .................... 370/435; 370/473; 370/477
[58] Field of Search .............................. 370/79, 80, 81, 370/24, 31, 112, 118, 111, 94.2, 110.1, 32.1; 375/222, 240, 241, 246, 250; 395/2.1, 2.32, 2.33, 2.31

[56] References Cited

U.S. PATENT DOCUMENTS

| Re. 34,034 | 8/1992 | O'Sullivan ............................ 379/59 |
| 3,304,372 | 2/1967 | Filipowsky et al. . |

(List continued on next page.)

FOREIGN PATENT DOCUMENTS

| 488865A2 | 6/1992 | European Pat. Off. . |
| 0510411A3 | 10/1992 | European Pat. Off. . |

(List continued on next page.)

OTHER PUBLICATIONS

European Search Report for Application No. EP 93403164 completed on Sep. 21, 1995 by Examiner Lambley; 4 pages.

(List continued on next page.)

Primary Examiner—Douglas W. Olms
Assistant Examiner—Chau T. Nguyen
Attorney, Agent, or Firm—Schwegman, Lundberg, Woessner & Kluth, P.A.

[57] ABSTRACT

A personal communications system is described which includes components of software and hardware operating in conjunction with a personal computer. The user interface control software operates on a personal computer, preferably within the Microsoft Windows® environment. The software control system communicates with hardware components linked to the software through the personal computer serial communications port. The hardware components include telephone communication equipment, digital signal processors, and hardware to enable voice, fax and data communication with a remote site connected through a standard telephone line. The functions of the hardware components are controlled by control software operating within the hardware component and from the software components operating within the personal computer. The major functions of the system are a telephone function, a voice mail function, a fax manager function, a multi-media mail function, a show and tell function, a terminal function and an address book function. The telephone function allows the present system to operate, from the users perspective, as a conventional telephone using either hands-free, headset or handset operation. The telephone function is more sophisticated than a standard telephone in that the present system converts the voice into a digital signal which can be processed with echo cancellation, compressed, stored as digital data for later retrieval and transmitted as digital voice data concurrent with the transfer of digital information data.

10 Claims, 52 Drawing Sheets

Microfiche Appendix Included
(14 Microfiche, 1172 Pages)

U.S. PATENT DOCUMENTS

| | | | |
|---|---|---|---|
| 3,789,165 | 1/1974 | Campanella . | |
| 3,904,830 | 9/1975 | Every, Sr. et al. . | |
| 3,973,081 | 8/1976 | Hutchins . | |
| 3,997,732 | 12/1976 | Every, Sr. et al. . | |
| 4,100,377 | 7/1978 | Flanagan . | |
| 4,107,471 | 8/1978 | Reed . | |
| 4,205,202 | 5/1980 | Kahn | 370/81 |
| 4,284,850 | 8/1981 | Clingenpeel | 370/81 |
| 4,354,273 | 10/1982 | Araseki et al. . | |
| 4,377,860 | 3/1983 | Godbole | 370/84 |
| 4,403,322 | 9/1983 | Kato et al. | 370/110.1 |
| 4,425,661 | 1/1984 | Moses et al. | 375/1 |
| 4,445,213 | 4/1984 | Baugh et al. | 370/94 |
| 4,476,559 | 10/1984 | Brolin et al. | 370/110.1 |
| 4,479,195 | 10/1984 | Herr et al. | 364/900 |
| 4,479,213 | 10/1984 | Galand et al. | 370/118 |
| 4,495,620 | 1/1985 | Steele et al. | 370/118 |
| 4,500,987 | 2/1985 | Hasegawa | 370/60 |
| 4,524,244 | 6/1985 | Faggin et al. | 179/2 |
| 4,534,024 | 8/1985 | Maxemchuk et al. | 370/85 |
| 4,546,212 | 10/1985 | Crowder, Sr. . | |
| 4,578,537 | 3/1986 | Faggin et al. . | |
| 4,587,651 | 5/1986 | Nelson et al. . | |
| 4,593,389 | 6/1986 | Wurzburg et al. | 370/110.1 |
| 4,598,397 | 7/1986 | Nelson et al. | 370/110.1 |
| 4,609,788 | 9/1986 | Miller et al. | 179/170.6 |
| 4,629,829 | 12/1986 | Puhl et al. | 379/58 |
| 4,652,703 | 3/1987 | Lu et al. | 379/339 |
| 4,660,218 | 4/1987 | Hashimoto | 379/93 |
| 4,670,874 | 6/1987 | Sato et al. | 370/110.1 |
| 4,697,281 | 9/1987 | O'Sullivan | 379/59 |
| 4,700,341 | 10/1987 | Huang | 370/80 |
| 4,707,831 | 11/1987 | Weir et al. | 370/94 |
| 4,718,082 | 1/1988 | Parker et al. | 379/98 |
| 4,740,963 | 4/1988 | Eckley | 370/110.1 |
| 4,750,169 | 6/1988 | Carse et al. | 370/109 |
| 4,751,510 | 6/1988 | De Saint Michel et al. | 340/825.07 |
| 4,751,736 | 6/1988 | Gupta et al. | 381/31 |
| 4,757,527 | 7/1988 | Beniston et al. | 379/410 |
| 4,764,955 | 8/1988 | Galand et al. | 379/411 |
| 4,807,250 | 2/1989 | Tanaka | 375/28 |
| 4,809,271 | 2/1989 | Kondo et al. | 370/110.1 |
| 4,813,040 | 3/1989 | Futato | 370/111 |
| 4,827,085 | 5/1989 | Yaniv et al. | 178/18 |
| 4,835,765 | 5/1989 | Bergmans et al. | 370/32.1 |
| 4,839,802 | 6/1989 | Wonak et al. | 364/200 |
| 4,845,746 | 7/1989 | Li | 379/411 |
| 4,847,900 | 7/1989 | Wakim | 379/424 |
| 4,862,449 | 8/1989 | Hoefkens et al. | 370/32.1 |
| 4,866,732 | 9/1989 | Carey et al. | 375/1 |
| 4,887,265 | 12/1989 | Felix | 370/94.1 |
| 4,890,282 | 12/1989 | Lambert et al. | 370/79 |
| 4,890,316 | 12/1989 | Walsh et al. | 379/98 |
| 4,901,333 | 2/1990 | Hodgkiss | 375/98 |
| 4,905,282 | 2/1990 | McGlynn et al. | 380/48 |
| 4,912,758 | 3/1990 | Arbel | 379/388 |
| 4,914,650 | 4/1990 | Sriram | 370/60 |
| 4,926,448 | 5/1990 | Kraul et al. | 375/121 |
| 4,932,048 | 6/1990 | Kenmochi et al. | 379/67 |
| 4,935,954 | 6/1990 | Thompson et al. | 379/89 |
| 4,942,569 | 7/1990 | Maeno | 370/60 |
| 4,953,210 | 8/1990 | McGlynn et al. | 380/48 |
| 4,965,789 | 10/1990 | Bottau et al. | 370/79 |
| 4,972,457 | 11/1990 | O'Sullivan | 379/59 |
| 4,972,462 | 11/1990 | Shibata | 379/89 |
| 4,972,483 | 11/1990 | Carey | 381/31 |
| 4,977,591 | 12/1990 | Chen et al. | 379/410 |
| 4,991,169 | 2/1991 | Davis et al. | 370/77 |
| 4,995,059 | 2/1991 | Ishikawa | 375/27 |
| 4,998,241 | 3/1991 | Brox et al. | 370/32.1 |
| 5,001,710 | 3/1991 | Gawrys et al. | 370/110.1 |
| 5,001,745 | 3/1991 | Pollock | 379/96 |
| 5,005,183 | 4/1991 | Carey et al. | 375/1 |
| 5,008,901 | 4/1991 | Wallach et al. . | |
| 5,008,926 | 4/1991 | Misholi | 379/89 |
| 5,014,232 | 5/1991 | Andre | 364/724.19 |
| 5,020,058 | 5/1991 | Holden et al. | 370/109 |
| 5,025,443 | 6/1991 | Gupta | 370/76 |
| 5,036,513 | 7/1991 | Greenblatt | 370/125 |
| 5,044,010 | 8/1991 | Frenkiel et al. | 379/61 |
| 5,046,188 | 9/1991 | Molnar | 379/94 |
| 5,051,720 | 9/1991 | Kittirutsunetorn | 340/310 |
| 5,062,133 | 10/1991 | Melrose | 379/94 |
| 5,065,395 | 11/1991 | Shenoi et al. | 370/81 |
| 5,065,425 | 11/1991 | Lecomte et al. | 379/93 |
| 5,081,647 | 1/1992 | Bremer | 375/5 |
| 5,083,310 | 1/1992 | Drory | 381/30 |
| 5,086,471 | 2/1992 | Tanaka et al. | 381/36 |
| 5,099,472 | 3/1992 | Townsend et al. | 370/32.1 |
| 5,107,519 | 4/1992 | Ishikawa | 375/27 |
| 5,115,429 | 5/1992 | Hluchyj et al. | 370/84 |
| 5,121,385 | 6/1992 | Tominaga et al. | 370/80 |
| 5,127,001 | 6/1992 | Steagall et al. | 370/62 |
| 5,127,041 | 6/1992 | O'Sullivan | 379/59 |
| 5,132,966 | 7/1992 | Hayano et al. | 370/79 |
| 5,136,586 | 8/1992 | Greenblatt | 370/110.4 |
| 5,138,662 | 8/1992 | Amano et al. | 381/36 |
| 5,146,470 | 9/1992 | Fujii et al. . | |
| 5,150,410 | 9/1992 | Bertrand | 380/28 |
| 5,151,937 | 9/1992 | Chujo et al. | 379/410 |
| 5,153,897 | 10/1992 | Sumiyoshi et al. | 375/8 |
| 5,162,812 | 11/1992 | Aman et al. | 375/34 |
| 5,164,982 | 11/1992 | Davis | 379/96 |
| 5,177,734 | 1/1993 | Cummiskey et al. | 370/32.1 |
| 5,182,762 | 1/1993 | Shirai et al. | 375/122 |
| 5,187,591 | 2/1993 | Guy et al. | 358/425 |
| 5,187,692 | 2/1993 | Haneda et al. | 367/135 |
| 5,193,110 | 3/1993 | Jones et al. | 379/94 |
| 5,195,130 | 3/1993 | Weiss et al. | 379/98 |
| 5,208,812 | 5/1993 | Dudek et al. | 370/100.1 |
| 5,208,850 | 5/1993 | Kino | 379/88 |
| 5,214,656 | 5/1993 | Chung et al. | 371/43 |
| 5,228,026 | 7/1993 | Albrow et al. | 370/29 |
| 5,233,660 | 8/1993 | Chen | 381/38 |
| 5,235,595 | 8/1993 | O'Dowd | 370/94.1 |
| 5,249,218 | 9/1993 | Sainton | 379/59 |
| 5,258,983 | 11/1993 | Lane et al. | 370/118 |
| 5,261,027 | 11/1993 | Taniguchi et al. | 395/2 |
| 5,263,019 | 11/1993 | Chu | 370/32.1 |
| 5,272,695 | 12/1993 | Makino et al. | 370/32.1 |
| 5,276,703 | 1/1994 | Budin et al. . | |
| 5,278,900 | 1/1994 | Van Gerwen et al. | 379/410 |
| 5,282,197 | 1/1994 | Kreitzer | 370/76 |
| 5,283,638 | 2/1994 | Engberg et al. | 348/14 |
| 5,283,819 | 2/1994 | Glick et al. | 379/90 |
| 5,289,539 | 2/1994 | Maruyama | 379/410 |
| 5,295,136 | 3/1994 | Ashley et al. | 370/32.1 |
| 5,305,312 | 4/1994 | Fornek et al. | 370/62 |
| 5,307,413 | 4/1994 | Denzer | 380/49 |
| 5,309,562 | 5/1994 | Li | 395/200 |
| 5,313,498 | 5/1994 | Sano . | |
| 5,317,064 | 5/1994 | Osterweil . | |
| 5,319,682 | 6/1994 | Clark . | |
| 5,327,520 | 7/1994 | Chen | 395/2.28 |
| 5,329,472 | 7/1994 | Sugiyama | 364/724.19 |
| 5,341,374 | 8/1994 | Lewen et al. | 370/85.4 |
| 5,343,473 | 8/1994 | Cidon et al. | 370/85.6 |
| 5,343,521 | 8/1994 | Jullien et al. | 379/410 |
| 5,355,365 | 10/1994 | Bhat et al. | 370/85.13 |
| 5,365,577 | 11/1994 | Davis et al. | 379/96 |
| 5,371,853 | 12/1994 | Kao et al. | 395/2.32 |
| 5,379,340 | 1/1995 | Overend et al. | 379/93 |

| | | |
|---|---|---|
| 5,381,412 | 1/1995 | Otani ............................................ 370/84 |
| 5,384,780 | 1/1995 | Lomp et al. .............................. 370/94.1 |
| 5,390,239 | 2/1995 | Morris et al. ............................... 379/93 |
| 5,390,250 | 2/1995 | Janse et al. .............................. 379/410 |
| 5,402,474 | 3/1995 | Miller et al. ............................... 379/93 |
| 5,406,557 | 4/1995 | Baudoin et al. ........................... 370/61 |
| 5,406,560 | 4/1995 | Kondo et al. ............................ 370/94.1 |
| 5,414,796 | 5/1995 | Jacobs et al. ............................. 395/2.3 |
| 5,416,776 | 5/1995 | Panzarella et al. .................... 370/85.11 |
| 5,438,614 | 8/1995 | Rozman et al. ............................ 379/93 |
| 5,440,547 | 8/1995 | Easki et al. ................................ 370/60 |
| 5,440,698 | 8/1995 | Sindhu et al. ...................... 395/200.08 |
| 5,444,770 | 8/1995 | Davis et al. ................................ 379/99 |
| 5,471,470 | 11/1995 | Sharma et al. ............................ 370/81 |
| 5,472,351 | 12/1995 | Greco et al. ............................. 439/353 |
| 5,473,676 | 12/1995 | Frick et al. ................................ 379/99 |
| 5,479,407 | 12/1995 | Ko et al. ................................. 370/94.1 |
| 5,490,060 | 2/1996 | Malec et al. ............................. 364/401 |
| 5,493,609 | 2/1996 | Winseck, Jr. et al. ................... 379/962 |

FOREIGN PATENT DOCUMENTS

| | | |
|---|---|---|
| 0526104A2 | 2/1993 | European Pat. Off. . |
| 0582537A3 | 2/1994 | European Pat. Off. . |
| 0581528A1 | 2/1994 | European Pat. Off. . |
| 0614305A3 | 9/1994 | European Pat. Off. . |
| 63-054052 | 8/1988 | Japan . |
| 3162052 | 7/1991 | Japan . |
| 2210237 | 1/1989 | United Kingdom . |
| 2260670 | 4/1993 | United Kingdom . |
| 2268663 | 1/1994 | United Kingdom . |
| WO92/06550 | 4/1992 | WIPO . |
| WO93/22869 | 11/1993 | WIPO . |
| WO94/26056 | 11/1994 | WIPO . |

OTHER PUBLICATIONS

S. Casale et al., "Statistical Voice/High–Speed Data Multiplexing on a 64 KBIT/S Channel", *IEEE*, pp. 459–464, dated 1991.

T. Komiya et al, "An Approach to the Multifunction Graphic Terminal for the ISDN Environment", *IEEE*, pp. 32–36, dated 1988.

D. Gulick et al., "Interface for the ISDN to Your PC with A Voice/Data Board", *Electronic Design*, pp. 85–88, dated Dec. 10, 1987.

S. Sasaki et al., "Variable Rate Voice Coding System", *IEEE*, pp. 364–367, dated 1992.

AT&T Microelectronics, "High Speed Data Pump Chip Sets," published in Dec. 1991.

AT&T Microelectronics, "WE DSP16C Digital Signal Processor/CODEC Preliminary Data Sheet," 32 pages, published in May, 1991.

AT&T Microelectronics, "T7540 Digital Telephone CODEC Data Sheet Addendum," pp. 1–4, published in Jul., 1991.

AT&T Microelectronics, "T7540 Digital Telephone CODEC Preliminary Data Sheet," pp. 1–64, published in Jan., 1991.

Zilog Intelligent Peripheral Controllers, "Z84C01 Z80 CPU with Clock Generator/Controller," pp. 43–73, published in 1991.

Zilog Intelligent Peripheral Controllers, "Z84C90 CMOS Z80 KIO Serial/Parallel/counter/timer," pp. 205–224, published in 1991.

U.S. West Caller ID publication, received Jul. 18, 1994, one page.

J. D. Mills, et al., "A Data and Boice System for the General Service Telephone Network," *IECON*, pp. 1143–1148, 1987.

Copy of European Search Report (Application No. EP 94304742), completed Jun. 8, 1995 by Examiner Mikkelsen.

"TechTips—A Periodic Round–up of Technical Applications, Notes, and Information on MultiTech's Data Communications Products" by MultiTech Systems, vol. 2, No. 2, May 1992.

"MultiX25—X.25 PAD, The New MultiX25 PAD 8 Port X.25 Packet Assembler/Disassembler for Public and Private Data Networks," by MultiTech Systems, Mar. 1992.

Y. Akaiwa et al., "An Integrated Voice and Data Radio Access System," 1992, pp. 255–258, IEEE.

CCITT V.42, "Error–Correcting Procedures for DCES Using Asynchronous–to–Synchronous Conversion", vol. VIII, pp. 296–370, dated 1988.

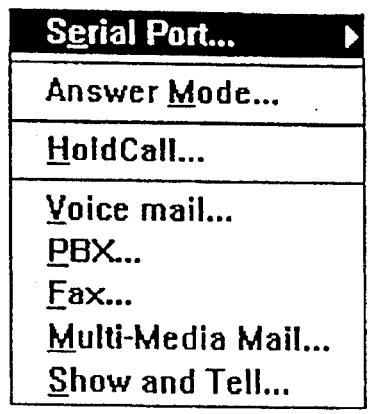
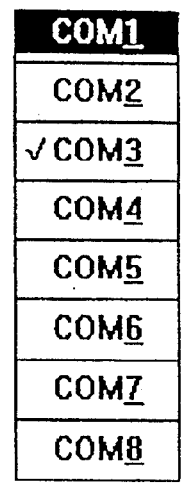
FIG. 40          FIG. 41
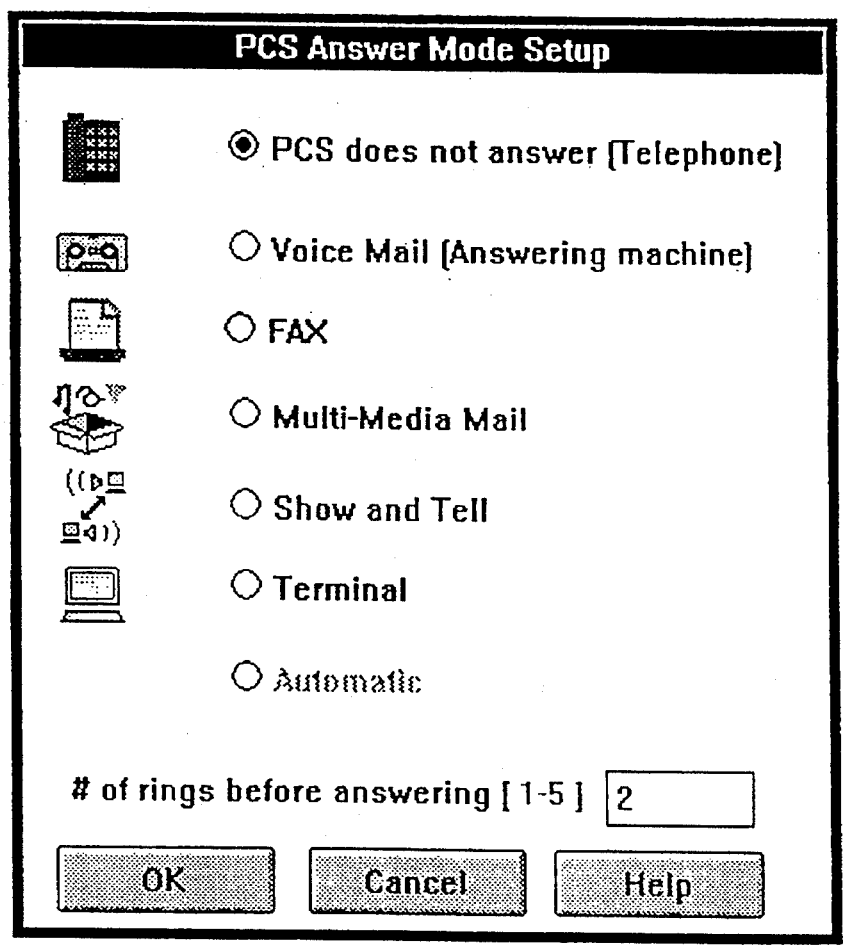
FIG. 42

DIGITAL SIMULTANEOUS VOICE AND DATA MODEM

This is a divisional of application Ser. No. 08/002,467, filed Jan. 8, 1993, U.S. Pat. No. 5,452,289.

The specification includes a microfiche appendix consisting of 14 microfiche films having images of 1,172 pages of software program code and data. Specification, drawings and appendix, Copyright 1995, Multi-Tech Systems, Inc. All rights reserved.

FIELD OF THE INVENTION

The present invention relates to communications systems and in particular to computer assisted digital communications including data, fax and digitized voice.

BACKGROUND OF THE INVENTION

A wide variety of communications alternatives are currently available to telecommunications users. For example, facsimile transmission of printed matter is available through what is commonly referred to as a stand-alone fax machine. Alternatively, fax-modem communication systems are currently available for personal computer users which combine the operation of a facsimile machine with the word processor of a computer to transmit documents held on computer disk. Modem communication over telephone lines in combination with a personal computer is also known in the art where file transfers can be accomplished from one computer to another. Also, simultaneous voice and modem data transmitted over the same telephone line has been accomplished in several ways.

There is a need in the art, however, for a personal communications system which combines a wide variety of communication functions into an integrated hardware-software product such that the user can conveniently choose a mode of communication and have that communication automatically invoked from a menu driven selection system.

SUMMARY OF THE INVENTION

The present disclosure describes a complex computer assisted communications system which contains multiple inventions. The subject of the present multiple inventions is a personal communications system which includes components of software and hardware operating in conjunction with a personal computer. The user interface control software operates on a personal computer, preferably within the Microsoft Windows® environment. The software control system communicates with hardware components linked to the software through the personal computer serial communications port. The hardware components include telephone communication equipment, digital signal processors, and hardware to enable both fax and data communication with a hardware components at a remote site connected through a standard telephone line. The functions of the hardware components are controlled by control software operating within the hardware component and from the software components operating within the personal computer.

Communications between the software components running on the personal computer and the local hardware components over the serial communications link is by a special packet protocol for digital data communications. This bi-directional communications protocol allows uninterrupted bidirectional full-duplex transfer of both control information and data communication.

The major functions of the present system are a telephone function, a voice mail function, a fax manager function, a multi-media mail function, a show and tell function, a terminal function and an address book function. The telephone function allows the present system to operate, from the users perspective, as a conventional telephone using either hands-free, headset or handset operation. The telephone function is more sophisticated than a standard telephone in that the present system converts the voice into a digital signal which can be processed with echo cancellation, compressed, stored as digital data for later retrieval and transmitted as digital voice data concurrent with the transfer of digital information data.

The voice mail function of the present system operates as a telephone answering machine which can receive, compress and store voice messages for later retrieval or reuse in response messaging.

The fax manager function of the present system allows the transmission and reception of facsimile information. The software component of the present system operates in conjunction with other commercially available software programs such as word processors and the like to transmit and receive facsimile pages of digital data stored on a computer system.

The multi-media mail component of the present system allows the operator to create documents that include text, graphics and voice mail messages which can be sent as a combined package over conventional telephone lines for receipt at a like-configured site using the present system.

The show and tell component of the present system enables the operator to simultaneously transmit voice and data communication to a remote site. This voice over data function dynamically allocates data bandwidth over the telephone line depending on the demands of the voice grade digitized signal.

The terminal feature of the present system allows the user to establish a data communications session with another computer system allowing the user's local computer system to operate as a dumb terminal.

The address book function of the present system is a versatile database that is built by the user and operates in conjunction with the other components of the present system to dial and establish communication links with remote sites to enable data communication, voice mail, facsimile, file transfer all in an automated mode without user intervention.

The hardware components of the present system include circuitry to enable digital data communication and facsimile communication over standard telephone lines. The hardware components also include circuitry to convert the voice to digital data and compress that data for transfer to the software component on the personal computer or transfer it over the telephone lines to a remote site.

Many of the functions of the present system are accomplished by including a voice control digital signal processor (DSP) to operate in conjunction with a data/fax modem implemented with a data pump DSP. The data pump DSP and the voice control DSP accomplish the following functions in an integrated hardware arrangement:

A sophisticated telephone apparatus with its attached handset, headset and a built-in hands free telephone operation using the integrated microphone and speaker system. The hands free telephone works in full duplex mode through the use of voice echo cancellation performed by the voice control DSP.

The voice control DSP in conjunction with a telephone CODEC provides voice compression which can be sent to the computer system that is attached the RS232 port for storage and later retrieval. The compressed voice from the voice control DSP can also be multiplexed with the input data stream from the personal computer with dynamic time allocation. Whereas, the input data from the attached computer is transmitted using the error control protocol like MNP or V.42 with or without data compression (e.g., V.42bis), the speech is packetized using a different header defining it as a speech packet and then transmitted through a controller. The speech packets, like the data packets, have the attached CRC codes. However, the speech packets are not sequenced and the like hardware at the receiving end ignores the accompanying CRC codes for voice packets and passes the voice packets to the voice control DSP for decompression. The decompressed speech is played through one of the telephone receiving units, i.e., the headset, handset or the built in speaker.

The voice control DSP allows the compressed speech to be recorded on a recording media, e.g., the hard disc drive of the attached computer system. This provides the function of an answering machine. In addition to the answering machine function, the recorded speech can be provided for the voice mail functions.

The special packet protocol over the RS232 interface between the software component and the hardware component that governs the operation of the hardware component is so designed that it allows various control functions to be intermixed with data over the RS232 serial port. The software component of the present system accepts the generic AT modem commands when not in the special packet mode. When the hardware component is configured to accept the packet level protocol over the RS232 port, it can be made to switch to the generic command mode through the use of a break sequence.

The hardware components of the present system functions as a data/fax modem when the speech compression or telephone mode is not invoked. The packet mode or the generic AT command mode may be used for this purpose.

The hardware components Of the present system incorporate a provision for a special link integrity packet to facilitate the device to work over cellular networks. This scheme allows the modem in one of its plurality of modes to ignore the carrier dropouts (selective fading) inherent in the cellular networks. Such a scheme does not use carrier detect circuitry of the modem. The disconnect of the cellular connection is done through a negotiation scheme using packet interchange between the two ends of the link.

In cellular networks the multiplexed voice data technology of the present system allows a single apparatus to function as a smart telephone, an intelligent data modem as well as a fax modem. These features along with the voice data multiplex mode provides a traveling user complete freedom to use his or her moving vehicle as a true traveling office.

These features of the hardware component of the present system along with the features of the software component of the present system running on a PC provides a user with a complete range of telecommunications functions of a modern office, be it a stationary or mobile.

DESCRIPTION OF THE DRAWINGS

In the drawings, where like numerals describe like components throughout the several views.

FIG. 40 is an initialization screen display compatible with the present invention;

FIG. 41 is a communication port setup screen display compatible with the present invention;

FIG. 42 is an answer mode setup screen display compatible with the present invention;

FIG. 55 is an address book control screen display compatible with the present invention;

FIG. 56 is a voice message destination screen display compatible with the present invention.

DETAILED DESCRIPTION OF THE PREFERRED EMBODIMENTS

The specification for the multiple inventions described herein includes the present description, the drawings and a microfiche appendix. In the following detailed description of the preferred embodiment, reference is made to the accompanying drawings which form a part hereof, and in which is shown by way of illustration specific embodiments in which the inventions may be practiced. These embodiments are described in sufficient detail to enable those skilled in the art to practice the invention, and it is to be understood that other embodiments may be utilized and that Structural changes may be made without departing from the spirit and scope of the present inventions. The following detailed description is, therefore, not to be taken in a limiting sense, and the scope of the present inventions is defined by the appended claims.

Figure 1:
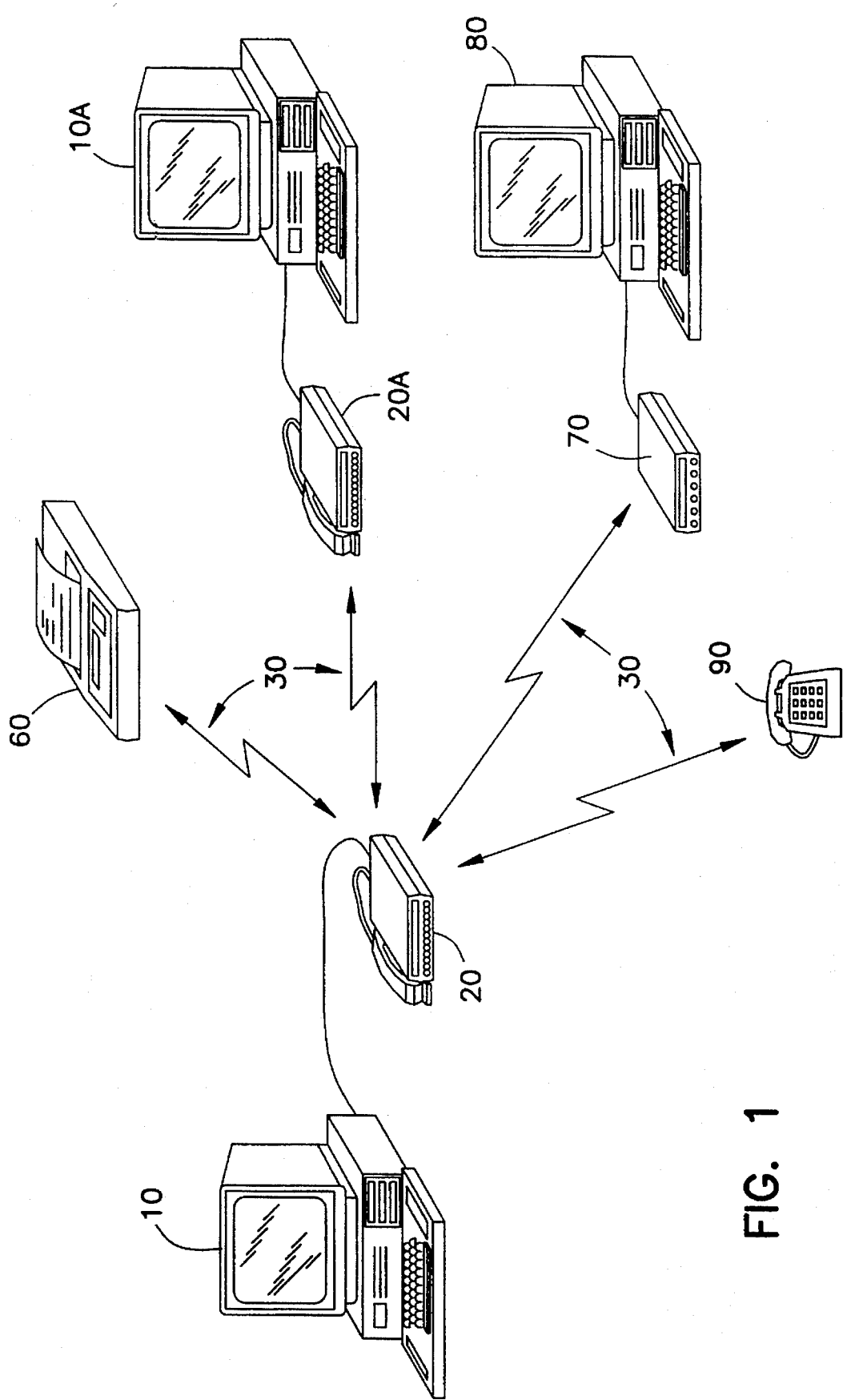
FIG. 1 shows the telecommunications environment within which the present may operate in several of the possible modes of communication.

FIG. 1 shows a typical arrangement for the use of the present system. Personal computer 10 is running the software components of the present system while the hardware components 20 include the data communication equipment and telephone headset. Hardware components 20 communicate over a standard telephone line 30 to one of a variety of remote sites. One of the remote sites may be equipped with the present system including hardware components 20a and software components running on personal computer 10a. In one alternative use, the local hardware components 20 may be communicating over standard telephone line 30 to facsimile machine 60. In another alternative use, the present system may be communicating over a standard telephone line 30 to another personal computer 80 through a remote modem 70. In another alternative use, the present system may be communicating over a standard telephone line 30 to a standard telephone 90. Those skilled in the art will readily recognize the wide variety of communication interconnections possible with the present system by reading and understanding the following detailed description.

The ornamental features of the hardware components 20 of FIG. 1 are claimed as part of Design Patent Application Number 29/001368, filed Nov. 12, 1992 entitled "Telephone/Modem case for a Computer-Based Multifunction Personal Communications System" assigned to the same assignee of the present inventions and hereby incorporated by reference.

General Overview

The present inventions are embodied in a commercial product by the assignee, MultiTech Systems, Inc. The software component operating on a personal computer is sold under the commercial trademark of MultiExpressPCS™ personal communications software while the hardware component of the present system is sold under the commercial name of MultiModemPCS™, Intelligent Personal Communications System Modem. In the preferred embodiment, the software component runs under Microsoft® Windows® however those skilled in the art will readily recognize that the present system is easily adaptable to run under any single or multi-user, single or multi-window operating system.

The present system is a multi-function communication system which includes hardware and software components. The system allows the user to connect to remote locations equipped with a similar system or with modems, facsimile machines or standard telephones over a single analog telephone line. The software component of the present system includes a number of modules which are described in more detail below.

Figure 2:
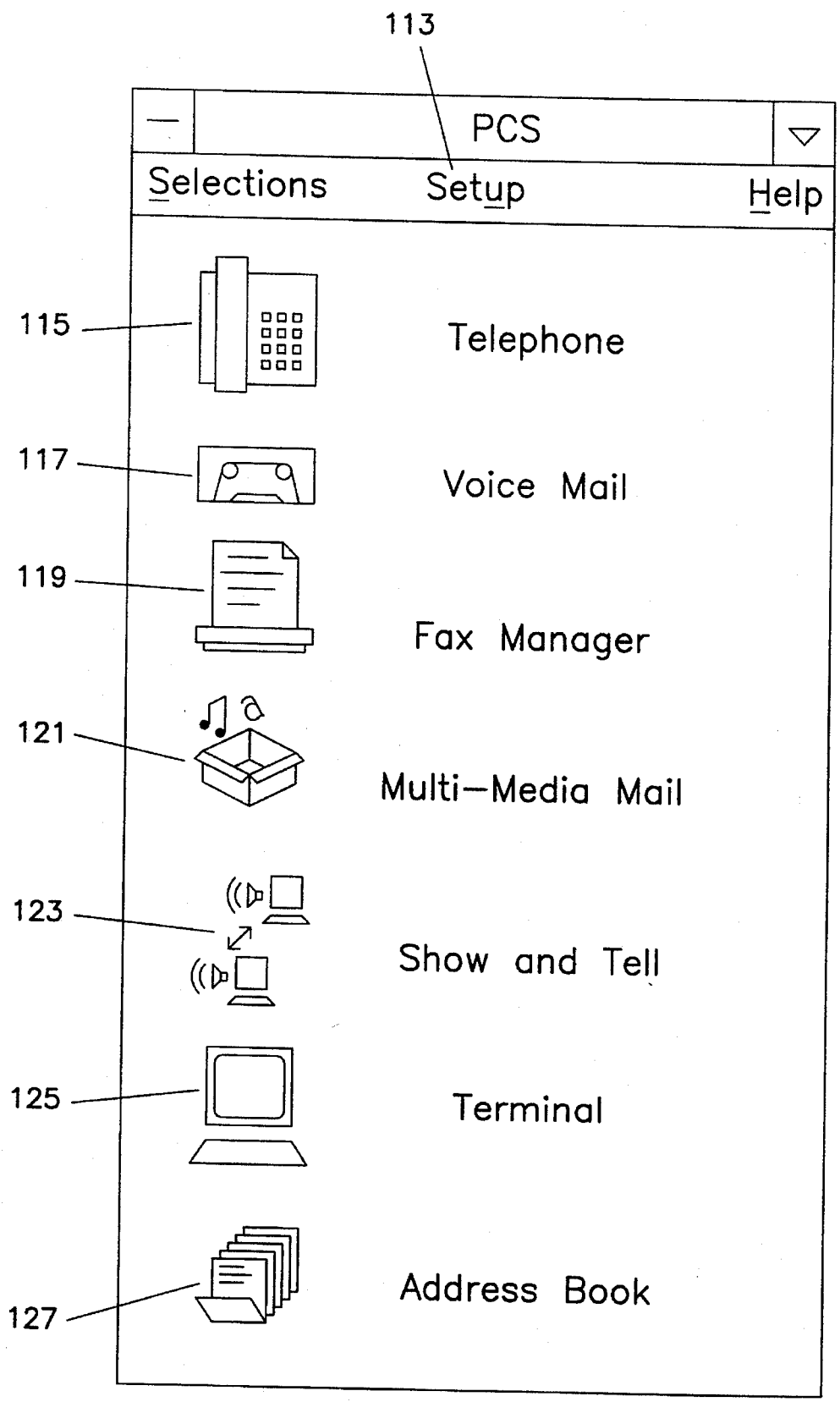
FIG. 2 is the main menu icon for the software components operating on the personal computer.

FIG. 2 is an example of the Windows®-based main menu icon of the present system operating on a personal computer. The functions listed with the icons used to invoke those functions are shown in the preferred embodiment. Those skilled in the art will readily recognize that a wide variety of selection techniques may be used to invoke the various functions of the present system. The icon of FIG. 2 is part of Design Patent Application Number 29/001397, filed Nov. 12, 1992 entitled "Icons for a Computer-Based Multifunction Personal Communications System" assigned to the same assignee of the present inventions and hereby incorporated by reference.

The telephone module allows the system to operate as a conventional or sophisticated telephone system. The system converts voice into a digital signal so that it can be transmitted or stored with other digital data, like computer information. The telephone function supports PBX and Centrex features such a call waiting, call forwarding, caller ID and three-way calling. This module also allows the user to mute, hold or record a conversation. The telephone module enables the handset, headset or hands-free speaker telephone operation of the hardware component. It includes on-screen push button dialing, speed-dial of stored numbers and digital recording of two-way conversations.

The voice-mail portion of the present system allows this system to operate as a telephone answering machine by storing voice messages as digitized voice files along with a time/date voice step. The digitized voice files can be saved and sent to one or more destinations immediately or at a later time using a queue scheduler. The user can also listen to, forward or edit the voice messages which have been received with a powerful digital voice editing component of the present system. This module also creates queues for outgoing messages to be sent at preselected times and allows the users to create outgoing messages with the voice editor.

The fax manager portion of the present system is a queue for incoming and outgoing facsimile pages. In the preferred embodiment of the present system, this function is tied into the Windows "print" command once the present system has been installed. This feature allows the user to create faxes from any Windows®-based document that uses the "print" command. The fax manager function of the present system allows the user to view queued faxes which are to be sent or which have been received. This module creates queues for outgoing faxes to be sent at preselected times and logs incoming faxes with time/date steps.

The multi-media mail function of the present system is a utility which allows the user to compose documents that include text, graphics and voice messages using the message composer function of the present system, described more fully below. The multi-media mail utility of the present system allows the user to schedule messages for transmittal and queues up the messages that have been received so that can be viewed at a later time.

The show and tell function of the present system allows the user to establish a data over voice (DOV) communications session. When the user is transmitting data to a remote location similarly equipped, the user is able to talk to the person over the telephone line while concurrently transferring the data. This voice over data function is accomplished in the hardware components of the present system. It digitizes the voice and transmits it in a dynamically changing allocation of voice data and digital data multiplexed in the same transmission. The allocation at a given moment is selected depending on the amount of voice digital information required to be transferred. Quiet voice intervals allocate greater space to the digital data transmission.

The terminal function of the present system allows the user to establish a data communications session with another computer which is equipped with a modem but which is not equipped with the present system. This feature of the present system is a Windows®-based data communications program that reduces the need for issuing "AT" commands by providing menu driven and "pop-up" window alternatives.

The address book function of the present system is a database that is accessible from all the other functions of the present system. This database is created by the user inputting destination addresses and telephone numbers for data communication, voice mail, facsimile transmission, modem communication and the like. The address book function of the present system may be utilized to broadcast communications to a wide variety of recipients. Multiple linked databases have separate address books for different groups and different destinations may be created by the users. The address book function includes a textual search capability which allows fast and efficient location of specific addresses as described more fully below.

Hardware Components

Figure 3:
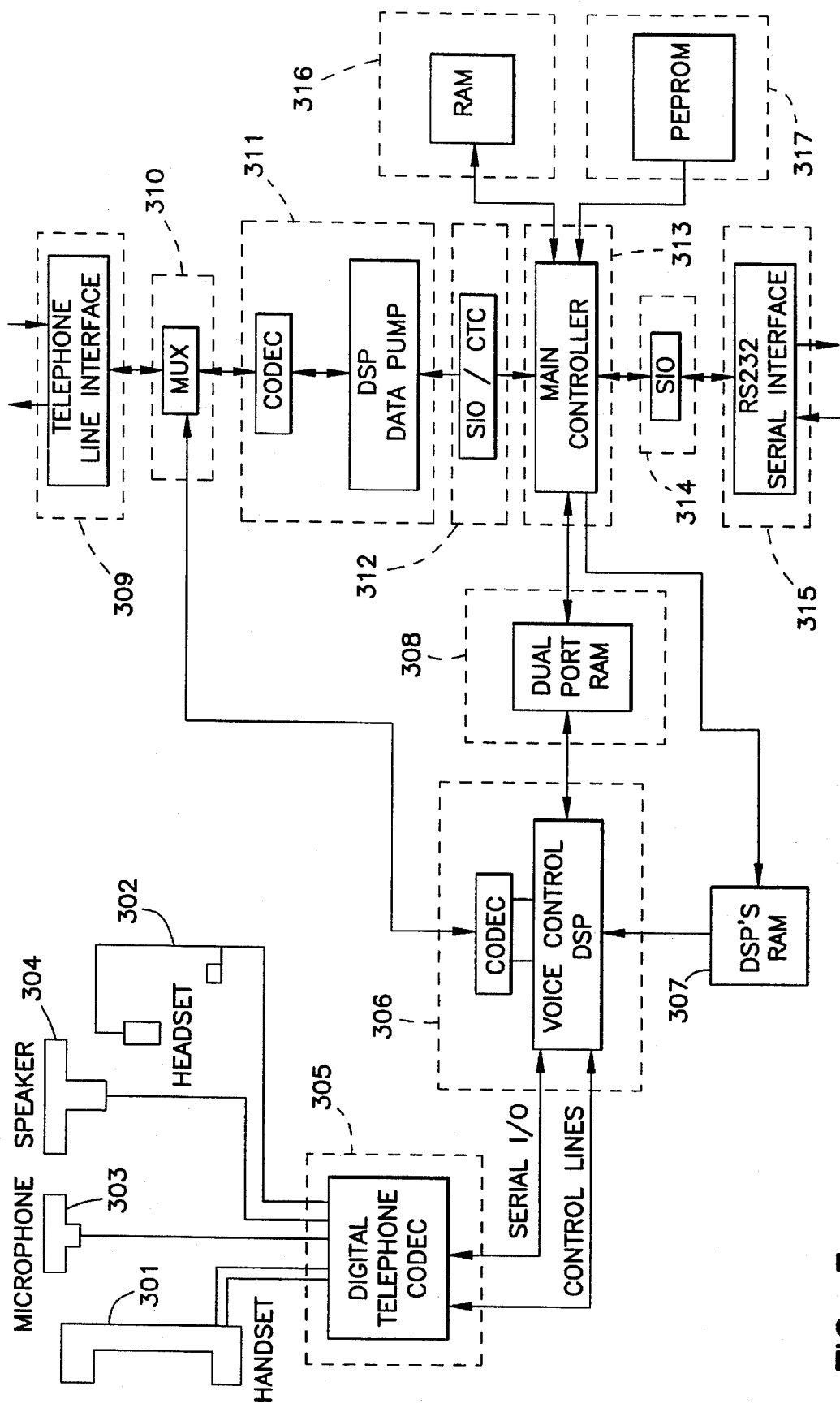
FIG. 3 is a block diagram of the hardware components of the present system.

FIG. 3 is a block diagram of the hardware components of the present system corresponding to reference number 20 of FIG. 1. These components form the link between the user, the personal computer running the software component of the present system and the telephone line interface. As will be more fully described below, the interface to the hardware components of the present system is via a serial communications port connected to the personal computer. The interface protocol is well ordered and defined such that other software systems or programs running on the personal computer may be designed and implemented which would be capable of controlling the hardware components shown in FIG. 3 by using the control and communications protocol defined below.

In the preferred embodiment of the present system three alternate telephone interfaces are available: the telephone handset 301, a telephone headset 302, and a hands-free microphone 303 and speaker 304. Regardless of the telephone interface, the three alternative interfaces connect to the digital telephone coder-decoder (CODEC) circuit 305.

The digital telephone CODEC circuit 305 interfaces with the voice control digital signal processor (DSP) circuit 306 which includes a voice control DSP and CODEC. This circuit does digital to analog (D/A) conversion, analog to digital (A/D) conversion, coding/decoding, gain control and is the interface between the voice control DSP circuit 306 and the telephone interface. The CODEC of the voice control circuit 306 transfers digitized voice information in a compressed format to multiplexor circuit 310 to analog telephone line interface 309.

The CODEC of the voice control circuit 306 is actually an integral component of a voice control digital signal processor integrated circuit, as described more fully below. The voice control DSP of circuit 306 controls the digital telephone CODEC circuit 305, performs voice compression and echo cancellation.

Multiplexor (MUX) circuit 310 selects between the voice control DSP circuit 306 and the data pump DSP circuit 311 for transmission of information on the telephone line through telephone line interface circuit 309.

The data pump circuit 311 also includes a digital signal processor (DSP) and a CODEC for communicating over the telephone line interface 309 through MUX circuit 310. The data pump DSP and CODEC of circuit 311 performs functions such as modulation, demodulation and echo cancellation to communicate over the telephone line interface 309 using a plurality of telecommunications standards including FAX and modem protocols.

The main controller circuit 313 controls the DSP data pump circuit 311 and the voice control DSP circuit 306 through serial input/output and clock timer control (SIO/CTC) circuits 312 and dual port RAM circuit 308 respectively. The main controller circuit 313 communicates with the voice control DSP 306 through dual port RAM circuit 308. In this fashion digital voice data can be read and written simultaneously to the memory portions of circuit 308 for high speed communication between the user (through interfaces 301,302 or 303/304) and the personal computer connected to serial interface circuit 315 and the remote telephone connection connected through the telephone line attached to line interface circuit 309.

As described more fully below, the main controller circuit 313 includes, in the preferred embodiment, a microprocessor which controls the functions and operation of all of the hardware components shown in FIG. 3. The main controller is connected to RAM circuit 316 and an programmable and electrically erasable read only memory (PEROM) circuit 317. The PEROM circuit 317 includes nonvolatile memory in which the executable control programs for the voice control DSP circuits 306 and the main controller circuits 313 operate.

The RS232 Serial interface circuit 315 communicates to the serial port of the personal computer which is running the software components of the present system. The RS232 serial interface circuit 315 is connected to a serial input/output circuit 314 with main controller circuit 313. SIO circuit 314 is in the preferred embodiment, a part of SIO/CTC circuit 312.

Functional Operation of the Hardware Components

Referring once again to FIG. 3, the multiple and selectable functions described in conjunction with FIG. 2 are all implemented in the hardware components of FIG. 3. Each of these functions will be discussed in turn.

The telephone function 115 is implemented by the user either selecting a telephone number to be dialed from the address book 127 or manually selecting the number through the telephone menu on the personal computer. The telephone number to be dialed is downloaded from the personal computer over the serial interface and received by main controller 313. Main controller 313 causes the data pump DSP circuit 311 to seize the telephone line and transmit the DTMF tones to dial a number. Main controller 313 configures digital telephone CODEC circuit 305 to enable either the handset 301 operation, the microphone 303 and speaker 304 operation or the headset 302 operation. A telephone connection is established through the telephone line interface circuit 309 and communication is enabled. The user's analog voice is transmitted in an analog fashion to the digital telephone CODEC 305 where it is digitized. The digitized voice patterns are passed to the voice control circuit 306 where echo cancellation is accomplished, the digital voice signals are reconstructed into analog signals and passed through multiplexor circuit 310 to the telephone line interface circuit 309 for analog transmission over the telephone line. The incoming analog voice from the telephone connection through telephone connection circuit 309 is passed to the integral CODEC of the voice control circuit 306 where it is digitized.

The digitized incoming voice is then passed to digital telephone CODEC circuit 305 where it is reconverted to an analog signal for transmission to the selected telephone interface (either the handset 301, the microphone/speaker 303/304 or the headset 302). Voice Control DSP circuit 306 is programmed to perform echo cancellation to avoid feedback and echoes between transmitted and received signals, as is more fully described below.

In the voice mail function mode of the present system, voice messages may be stored for later transmission or the present system may operate as an answering machine receiving incoming messages. For storing digitized voice, the telephone interface is used to send the analog speech patterns to the digital telephone CODEC circuit 305. Circuit 305 digitizes the voice patterns and passes them to voice control circuit 306 where the digitized voice patterns are digitally compressed. The digitized and compressed voice patterns are passed through dual port ram circuit 308 to the main controller circuit 313 where they are transferred through the serial interface to the personal computer using a packet protocol defined below. The voice patterns are then stored on the disk of the personal computer for later use in multi-media mail, for voice mail, as a pre-recorded answering machine message or for later predetermined transmission to other sites.

For the present system to operate as an answering machine, the hardware components of FIG. 3 are placed in answer mode. An incoming telephone ring is detected through the telephone line interface circuit 309 and the main controller circuit 313 is alerted which passes the information off to the personal computer through the RS232 serial interface circuit 315. The telephone line interface circuit 309 seizes the telephone line to make the telephone connection. A pre-recorded message may be sent by the personal computer as compressed and digitized speech through the RS232 interface to the main controller circuit 313. The compressed and digitized speech from the personal computer is passed from main controller circuit 313 through dual port ram circuit 308 to the voice control DSP circuit 306 where it is uncompressed and converted to analog voice patterns. These analog voice patterns are passed through multiplexor circuit 310 to the telephone line interface 309 for transmission to the caller. Such a message may invite the caller to leave a voice message at the sound of a tone. The incoming voice messages are received through telephone line interface 309 and passed to voice control circuit 306. The analog voice patterns are digitized by the integral CODEC of voice control circuit 306 and the digitized voice patterns are compressed by the voice control DSP of the voice control circuit 306. The digitized and compressed speech patterns are passed through dual port ram circuit 308 to the main controller circuit 313 where they are transferred using packet protocol described below through the RS232 serial interface 315 to the personal computer for storage and later retrieval. In this fashion the hardware components of FIG. 3 operate as a transmit and receive voice mail system for implementing the voice mail function 117 of the present system.

The hardware components of FIG. 3 may also operate to facilitate the fax manager function 119 of FIG. 2. In fax receive mode, an incoming telephone call will be detected by a ring detect circuit of the telephone line interface 309 which will alert the main controller circuit 313 to the incoming call. Main controller circuit 313 will cause line interface circuit 309 to seize the telephone line to receive the call. Main controller circuit 313 will also concurrently alert the operating programs on the personal computer through the RS232 interface using the packet protocol described below. Once the telephone line interface seizes the telephone line, a fax carrier tone is transmitted and a return tone and handshake is received from the telephone line and detected by the data pump circuit 311. The reciprocal transmit and receipt of the fax tones indicates the imminent receipt of a facsimile transmission and the main controller circuit 313 configures the hardware components of FIG. 3 for the receipt of that information. The necessary handshaking with the remote facsimile machine is accomplished through the data pump 311 under control of the main controller circuit 313. The incoming data packets of digital facsimile data are received over the telephone line interface and passed through data pump circuit 311 to main controller circuit 313 which forwards the information on a packet basis (using the packet protocol described more fully below) through the serial interface circuit 315 to the personal computer for storage on disk. Those skilled in the art will readily recognize that the FAX data could be transferred from the telephone line to the personal computer using the same path as the packet transfer except using the normal AT stream mode. Thus, the incoming facsimile is automatically received and stored on the personal computer through the hardware components of FIG. 3.

A facsimile transmission is also facilitated by the hardware components of FIG. 3. The transmission of a facsimile may be immediate or queued for later transmission at a predetermined or preselected time. Control packet information to configure the hardware components to send a facsimile are sent over the RS232 serial interface between the personal computer and the hardware components of FIG. 3 and are received by main controller circuit 313. The data pump circuit 311 then dials the recipient's telephone number using DTMF tones or pulse dialing over the telephone line interface circuit 309. Once an appropriate connection is established with the remote facsimile machine, standard facsimile handshaking is accomplished by the data pump circuit 311. Once the facsimile connection is established, the digital facsimile picture information is received through the data packet protocol transfer over serial line interface circuit 315, passed through main controller circuit 313 and data pump circuit 311 onto the telephone line through telephone line interface circuit 309 for receipt by the remote facsimile machine.

The operation of the multi-media mail function 121 of FIG. 2 is also facilitated by the hardware components of FIG. 3. A multimedia transmission consists of a combination of picture information, digital data and digitized voice information. For example, the type of multimedia information transferred to a remote site using the hardware components of FIG. 3 could be the multimedia format of the MicroSoft® Multimedia Wave® format with the aid of an Intelligent Serial Interface (ISI) card added to the personal computer. The multimedia may also be the type of multimedia information assembled by the software component of the present system which is described more fully below.

The multimedia package of information including text, graphics and voice messages (collectively called the multimedia document) may be transmitted or received through the hardware components shown in FIG. 3. For example, the transmission of a multimedia document through the hardware components of FIG. 3 is accomplished by transferring the multimedia digital information using the packet protocol described below over the RS232 serial interface between the personal computer and the serial line interface circuit 315. The packets are then transferred through main controller circuit 313 through the data pump circuit 311 on to the telephone line for receipt at a remote site through telephone line interface circuit 309. In a similar fashion, the multimedia documents received over the telephone line from the remote site are received at the telephone line interface circuit 309, passed through the data pump circuit 311 for receipt and forwarding by the main controller circuit 313 over the serial line interface circuit 315.

The show and tell function 123 of the present system allows the user to establish a data over voice communication session. In this mode of operation, full duplex data transmission may be accomplished simultaneously with the voice communication between both sites. This mode of operation assumes a like configured remote site. The hardware components of the present system also include a means for sending voice/data over cellular links. The protocol used for transmitting multiplexed voice and data include a supervisory packet described more fully below to keep the link established through the cellular link. This supervisory packet is an acknowledgement that the link is still up. The supervisory packet may also contain link information to be used for adjusting various link parameters when needed. This supervisory packet is sent every second when data is not being sent and if the packet is not acknowledged after a specified number of attempts, the protocol would then give an indication that the cellular link is down and then allow the modem to take action. The action could be for example; change speeds, retrain, or hang up. The use of supervisory packets is a novel method of maintaining inherently intermittent cellular links when transmitting multiplexed voice and data.

The voice portion of the voice over data transmission of the show and tell function is accomplished by receiving the user's voice through the telephone interface 301, 302 or 303 and the voice information is digitized by the digital telephone circuit 305. The digitized voice information is passed to the voice control circuit 306 where the digitized voice information is compressed using a voice compression algorithm described more fully below. The digitized and compressed voice information is passed through dual port RAM circuit 308 to the main controller circuit 313. During quiet periods of the speech, a quiet flag is passed from voice control circuit 306 to the main controller 313 through a packet transfer protocol described below by a dual port RAM circuit 308.

Simultaneous with the digitizing compression and packetizing of the voice information is the receipt of the packetized digital information from the personal computer over interface line circuit 315 by main controller circuit 313. Main controller circuit 313 in the show and tell function of the present system must efficiently and effectively combine the digitized voice information with the digital information for transmission over the telephone line via telephone line interface circuit 309. As described above and as described more fully below, main controller circuit 313 dynamically changes the amount of voice information and digital information transmitted at any given period of time depending upon the quiet times during the voice transmissions. For example, during a quiet moment where there is no speech information being transmitted, main controller circuit 313 ensures that a higher volume of digital data information be transmitted over the telephone line interface in lieu of digitized voice information.

Also, as described more fully below, the packets of digital data transmitted over the telephone line interface with the transmission packet protocol described below, requites 100 percent accuracy in the transmission of the digital data, but a lesser standard of accuracy for the transmission and receipt of the digitized voice information. Since digital information must be transmitted with 100 percent accuracy, a corrupted packet of digital information received at the remote site must be retransmitted. A retransmission signal is communicated back to the local site and the packet of digital information which was corrupted during transmission is retransmitted. If the packet transmitted contained voice data, however, the remote site uses the packets whether they were corrupted or not as long as the packet header was intact. If the header is corrupted, the packet is discarded. Thus, the voice information may be corrupted without requesting retransmission since it is understood that the voice information must be transmitted on a real time basis and the corruption of any digital information of the voice signal is not critical. In contrast to this the transmission of digital data is critical and retransmission of corrupted data packets is requested by the remote site.

The transmission of the digital data follows the CCITT V.42 standard, as is well known in the industry and as described in the CCITT Blue Book, volume VIII entitled Data Communication over the Telephone Network, 1989. The CCITT V.42 standard is hereby incorporated by reference. The voice data packet information also follows the CCITT V.42 standard, but uses a different header format so the receiving site recognizes the difference between a data packet and a voice packet. The voice packet is distinguished from a data packet by using undefined bits in the header (80 hex) of the V.42 standard. The packet protocol for voice over data transmission during the show and tell function of the present system is described more fully below.

Since the voice over data communication with the remote site is full-duplex, incoming data packets and incoming voice packets are received by the hardware components of FIG. 3. The incoming data packets and voice packets are received through the telephone line interface circuit 309 and passed to the main controller circuit 313 via data pump DSP circuit 311. The incoming data packets are passed by the main controller circuit 313 to the serial interface circuit 315 to be passed to the personal computer. The incoming voice packets are passed by the main controller circuit 313 to the dual port RAM circuit 308 for receipt by the voice control DSP circuit 306. The voice packets are decoded and the compressed digital information therein is uncompressed by the voice control DSP of circuit 306. The uncompressed digital voice information is passed to digital telephone CODEC circuit 305 where it is reconverted to an analog signal and retransmitted through the telephone line interface circuits. In this fashion full-duplex voice and data transmission and reception is accomplished through the hardware components of FIG. 3 during the show and tell functional operation of the present system.

Terminal operation 125 of the present system is also supported by the hardware components of FIG. 3. Terminal operation means that the local personal computer simply operates as a "dumb" terminal including file transfer capabilities. Thus no local processing takes place other than the handshaking protocol required for the operation of a dumb terminal. In terminal mode operation, the remote site is assumed to be a modem connected to a personal computer but the remote site is not necessarily a site which is configured according to the present system. In terminal mode of operation, the command and data information from personal computer is transferred over the RS232 serial interface circuit 315, forwarded by main controller circuit 313 to the data pump circuit 311 where the data is placed on the telephone line via telephone line interface circuit 309.

In a reciprocal fashion, data is received from the telephone line over telephone line interface circuit 309 and simply forwarded by the data pump circuit 311, the main controller circuit 313 over the serial line interface circuit 315 to the personal computer.

As described above, and more fully below, the address book function of the present system is primarily a support function for providing telephone numbers and addresses for the other various functions of the present system.

Detailed Electrical Schematic Diagrams

Figure 4:
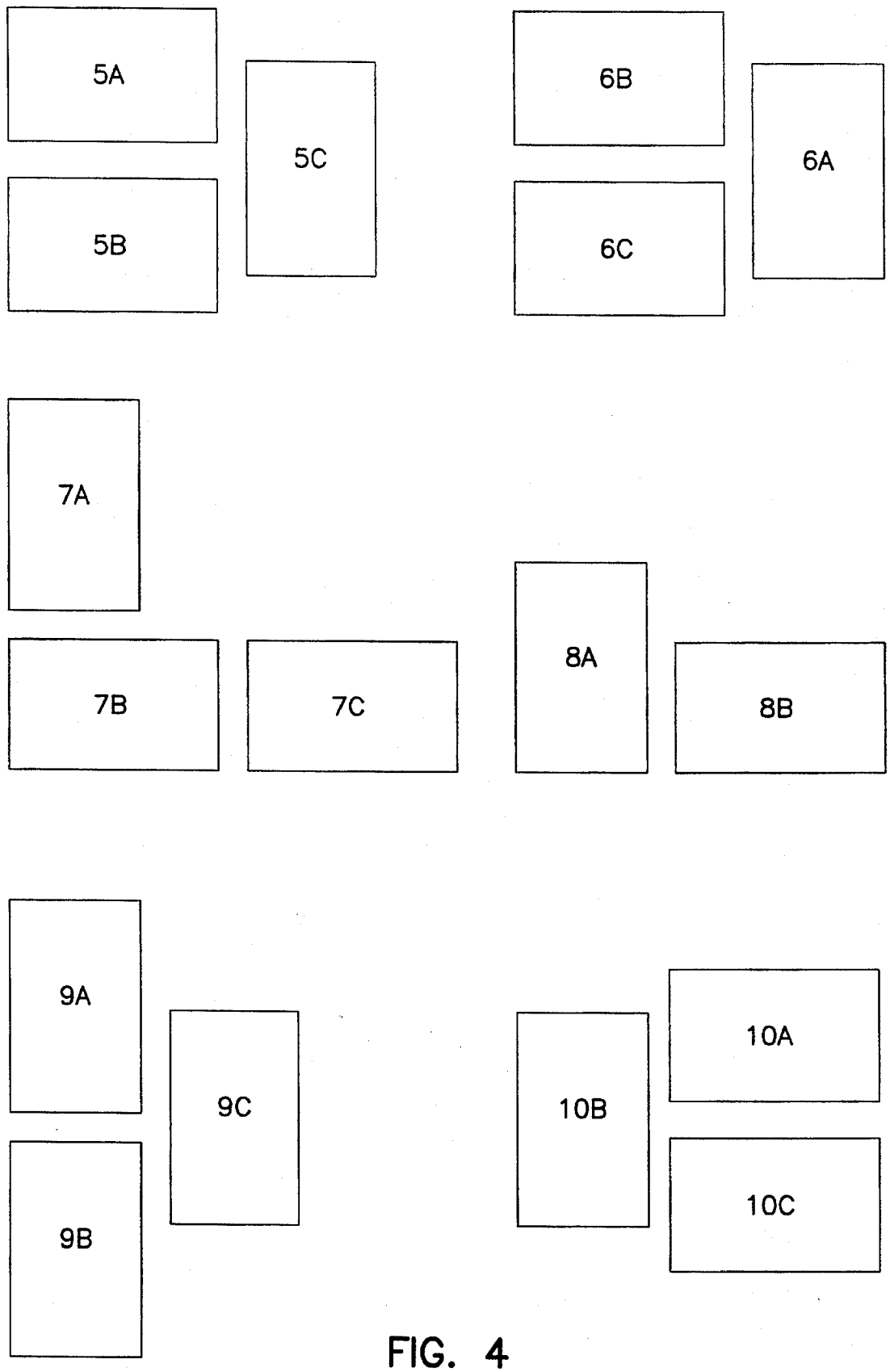
FIG. 4 is a key for viewing the detailed electrical schematic diagrams of FIGS. 5A–10C to facilitate understanding of the interconnect between the drawings.

The detailed electrical schematic diagrams comprise FIGS. 5A–C, 6A–C, 7A–C, 8A–B, 9A–C and 10A–C. FIG. 4 shows a key on how the schematic diagrams may be conveniently arranged to view the passing of signals on the electrical lines between the diagrams. The electrical connections between the electrical schematic diagrams are through the designators listed next to each wire. For example, on the right side of FIG. 5A, address lines A0–A19 are attached to an address bus for which the individual electrical lines may appear on other pages as A0–A19 or may collectively be connected to other schematic diagrams through the designator "A" in the circle connected to the collective bus. In a like fashion, other electrical lines designated with symbols such as RNGL on the lower left-hand side of FIG. 5A may connect to other schematic diagrams using the same signal designator RNGL.

Figure 7A:
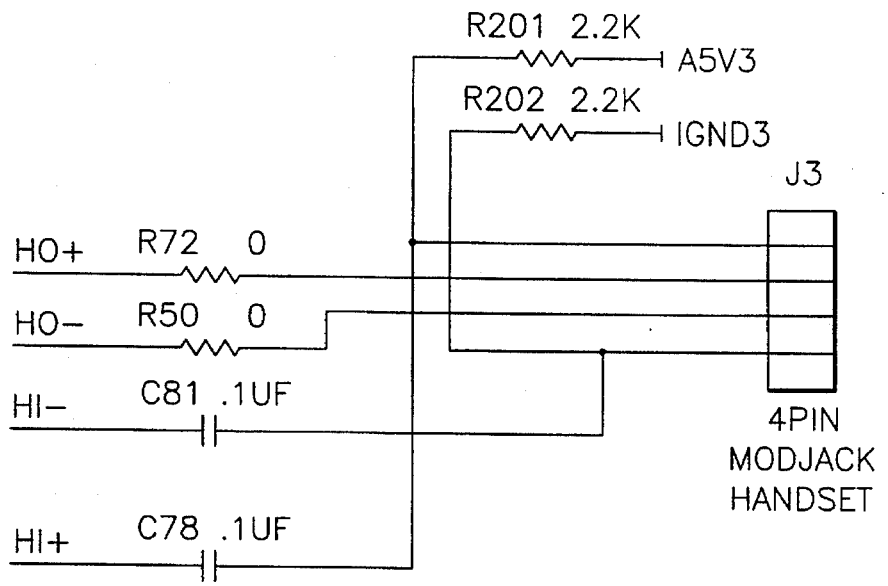
Figure 7A:
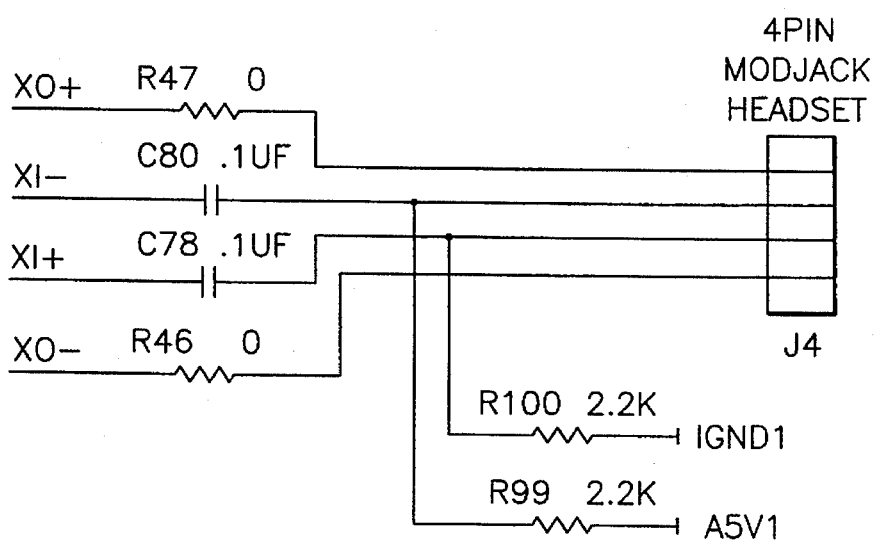
Figure 7A:
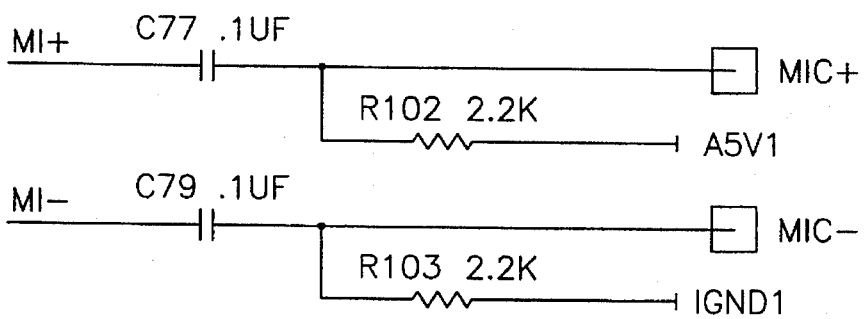
Figure 7B:
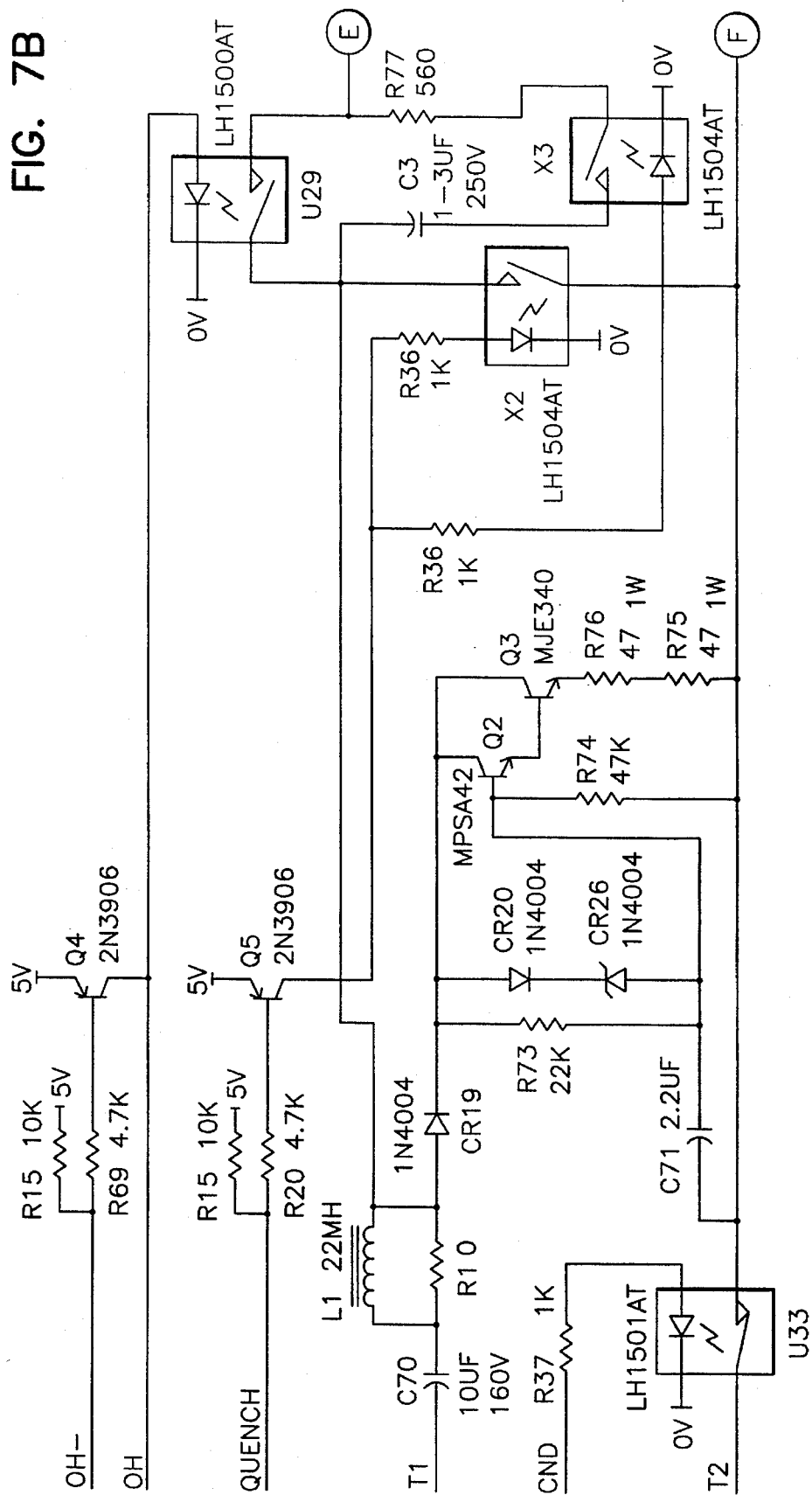
Figure 7C:
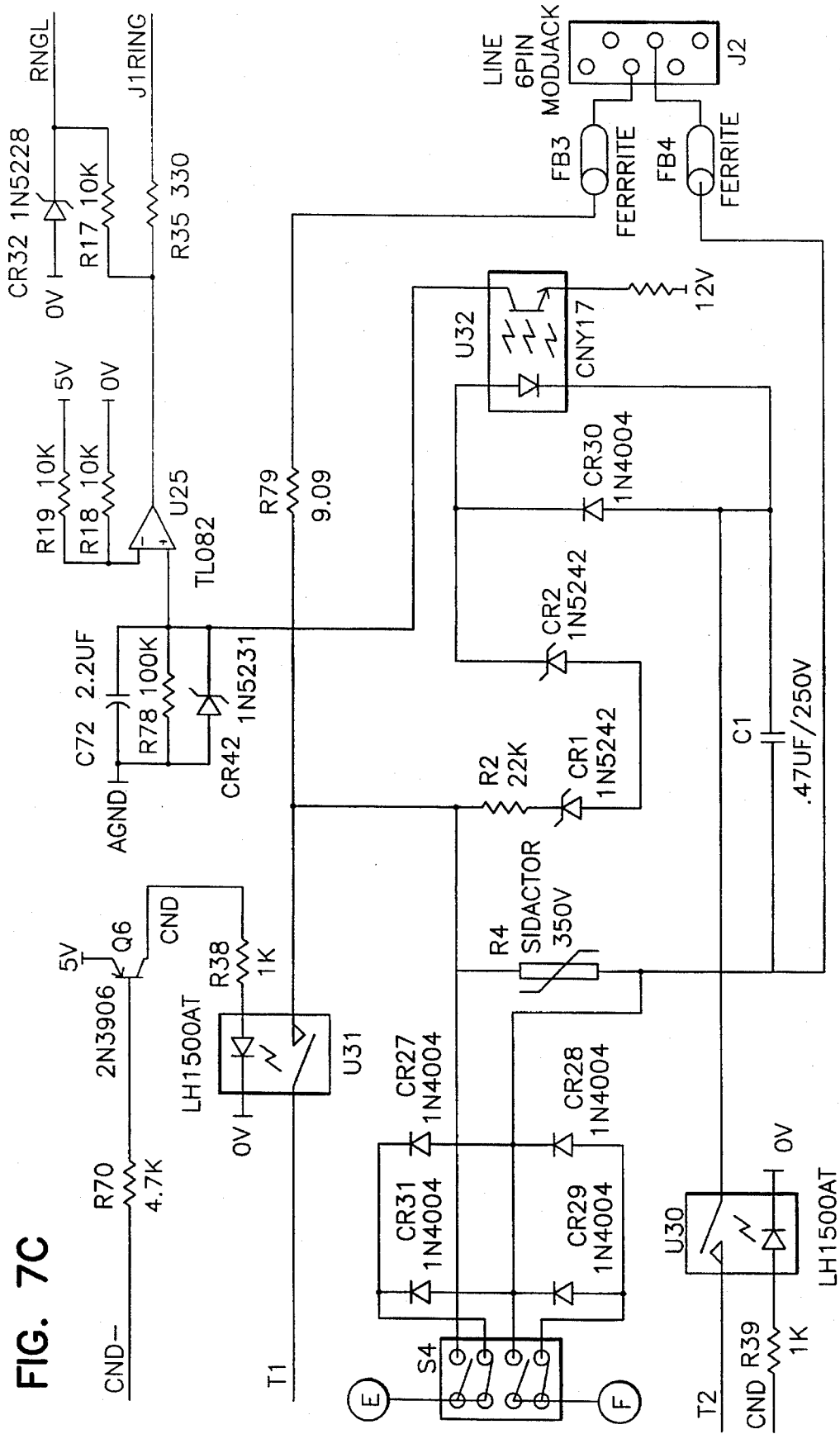

Beginning with the electrical schematic diagram of FIG. 7C, the telephone line connection in the preferred embodiment is through connector J2 which is a standard six-pin modular RJ-11 jack. In the schematic diagram of FIG. 7C, only the tip and ring connections of the first telephone circuit of the RJ-11 modular connector are used. Ferrite beads FB3 and FB4 are placed on the tip and ring wires of the telephone line connections to remove any high frequency or RF noise on the incoming telephone line. The incoming telephone line is also overvoltage protected through SIDACTOR R4. The incoming telephone line may be full wave rectified by the full wave bridge comprised of diodes CR27, CR28, CR29 and CR31. Switch S4 switches between direct connection and full wave rectified connection depending upon whether the line is a non-powered leased line or a standard telephone line. Since a leased line is a "dead" line with no voltage, the full-wave rectification is not needed.

Also connected across the incoming telephone line is a ring detect circuit. Optical isolator U32 (part model number CNY17) senses the ring voltage threshold when it exceeds the breakdown voltages on zener diodes CR1 and CR2. A filtering circuit shown in the upper right corner of FIG. 7C creates a long RC delay to sense the constant presence of an AC ring voltage and buffers that signal to be a binary signal out of operational amplifier U25 (part model number TLO82). Thus, the RNGL and J1RING signals are binary signals for use in the remaining portions of the electrical schematic diagrams to indicate a presence of a ring voltage on the telephone line.

The present system is also capable of sensing the caller ID information which is transmitted on the telephone line between rings. Between the rings, optically isolated relays U30, U31 on FIG. 7C and optically isolated relay U33 on FIG. 7B all operate in the period between the rings so that the FSK modulated caller ID information is connected to the CODEC and data pump DSP in FIGS. 8A and 8B, as described more fully below.

Referring now to FIG. 7B, more of the telephone line filtering circuitry is shown. Some of the telephone line buffering circuitry such as inductor L1 and resistor R1 are optional and are connected for various telephone line standards used around the word to meet local requirements. For example, Switzerland requires a 22 millihenry inductor and 1K resistor in series the line. For all other countries, the 1K resistor is replaced with a 0 ohm resistor.

Relay U29 shown in FIG. 7B is used to accomplish pulse dialing by opening and shorting the tip and ring wires. Optical relay X2 is engaged during pulse dialing so that the tip and ring are shorted directly. Transistors Q2 and Q3 along with the associated discrete resistors comprise a holding circuit to provide a current path or current loop on the telephone line to grab the line.

FIG. 7A shows the telephone interface connections between the hardware components of the present system and the handset, headset and microphone.

Figure 8A:
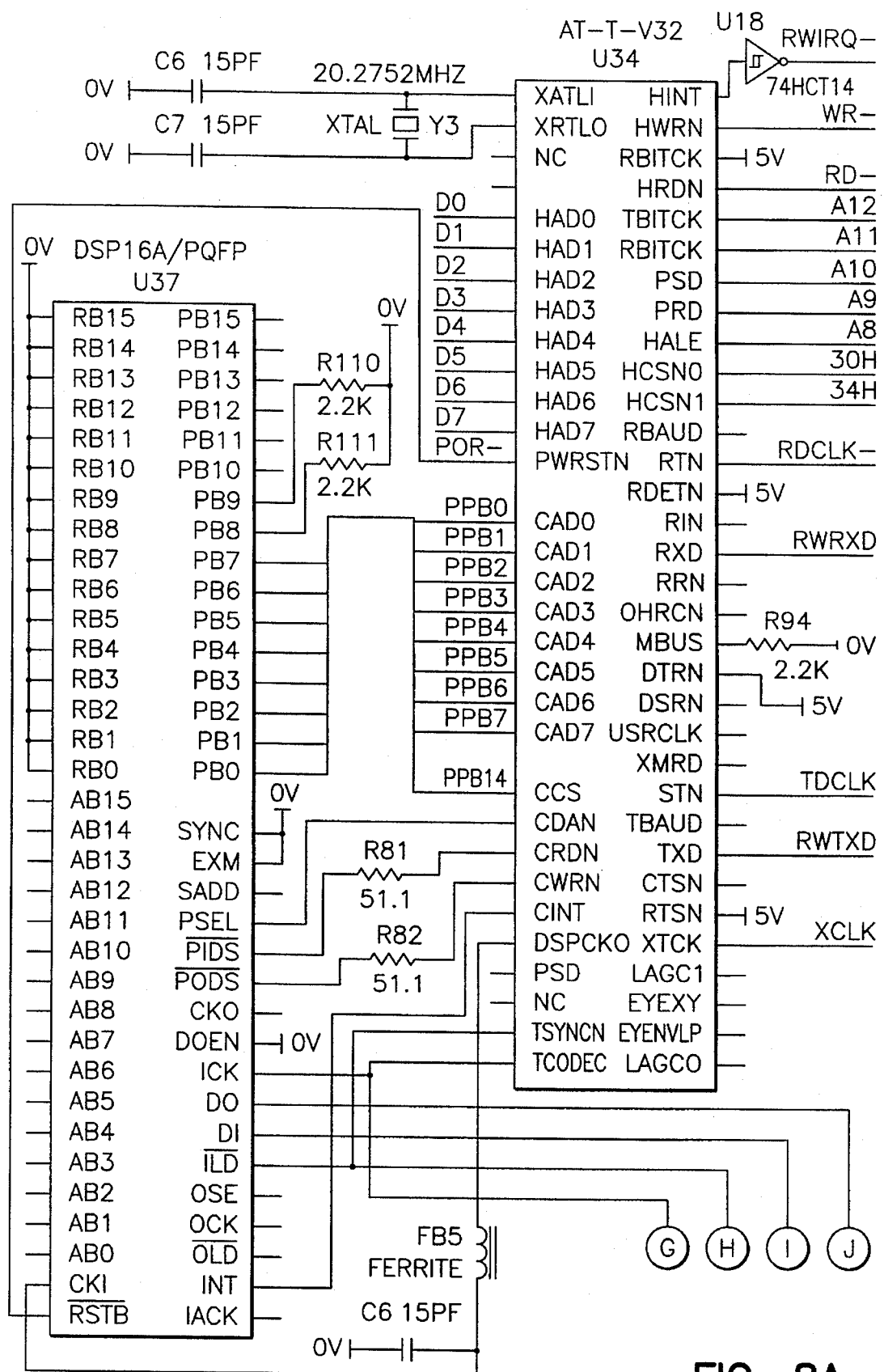
Figure 8B:
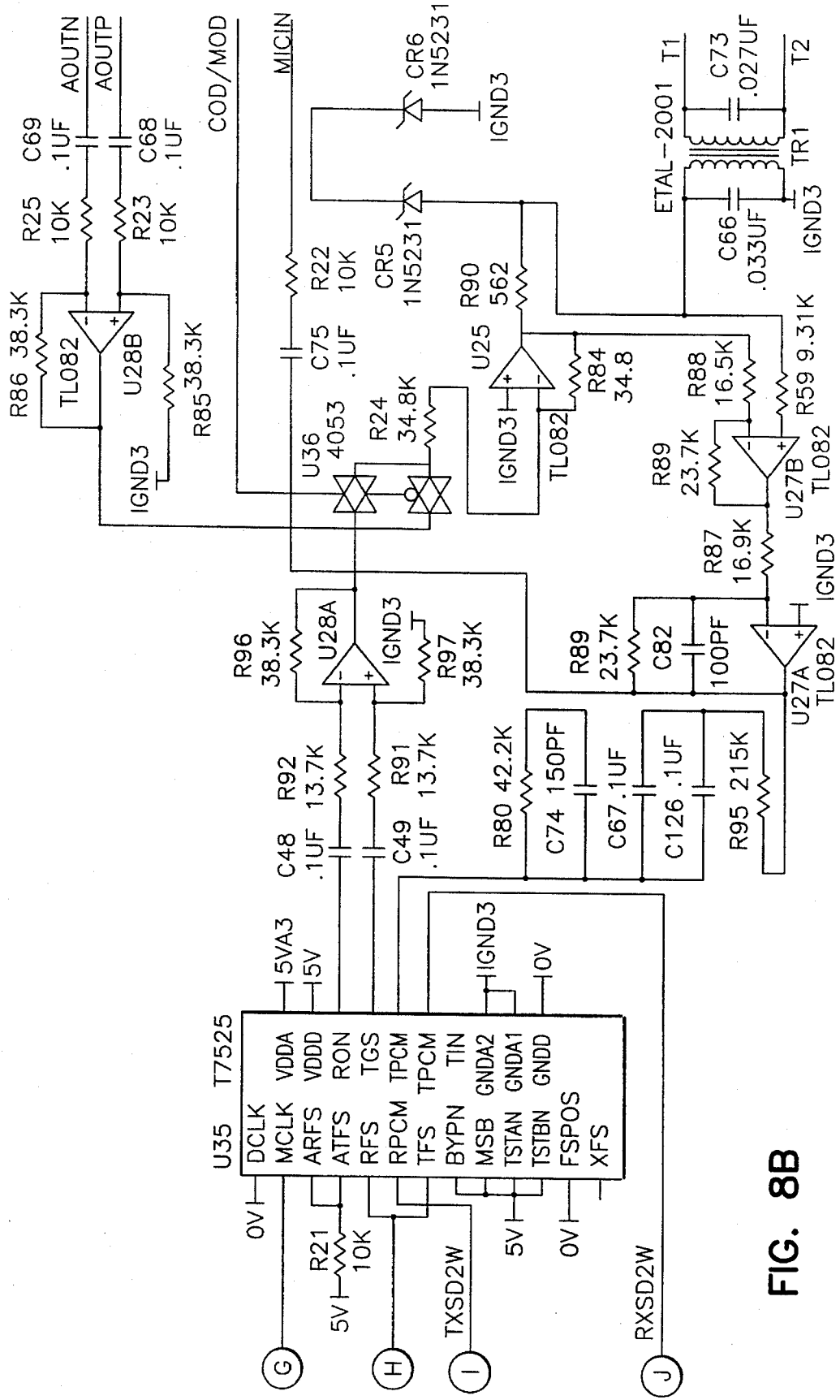

The connections T1 and T2 for the telephone line from FIG. 7B are connected to transformer TR1 shown in the electrical schematic diagram of FIG. 8B. Only the AC components of the signal pass through transformer TR1. The connection of signals attached to the secondary of TR1 is shown for both transmitting and receiving information over the telephone line.

Incoming signals are buffered by operational amplifiers U27A and U27B. The first stage of buffering using operational amplifier U27B is used for echo suppression so that the transmitted-information being placed on the telephone line is not fed back into the receive portion of the present system. The second stage of the input buffering through operational amplifier U27A is configured for a moderate amount of gain before driving the signal into CODEC U35.

CODEC chip U35 on FIG. 8B, interface chip U34 on FIG. 8A and digital signal processor (DSP) chip U37 on FIG. 8A comprise a data pump chip set manufactured and sold by AT&T Microelectronics. A detailed description of the operation of these three chips in direct connection and cooperation with one another is described in the publication entitled "AT&T V.32bis/V.32/FAX High-Speed Data Pump Chip Set Data Book" published by AT&T Microelectronics, December 1991, which is hereby incorporated by reference. This AT&T data pump chip set comprises the core of an integrated, two-wire full duplex modem which is capable of operation over standard telephone lines or leased lines. The data pump chip set conforms to the telecommunications specifications in CCITT recommendations V.32bis, V.32, V.22bis, V.22, V.23, V.21 and is compatible with the Bell 212A and 103 modems. Speeds of 14,400, 9600, 4800, 2400, 1200, 600 and 300 bits per second are supported. This data pump chip set consists of a ROM-coded DSP16A digital signal processor U37, and interface chip U34 and an AT&T T7525 linear CODEC U35. The AT&T V.32 data pump chip set is available from AT&T Microelectronics.

The chip set U34, U35 and U37 on FIGS. 8A and 8B perform all A/D, D/A, modulation, demodulation and echo cancellation of all signals placed on or taken from the telephone line. The CODEC U35 performs DTMF tone generation and detection, signal analysis of call progress tones, etc. The transmission of information on the telephone line from CODEC U35 is through buffer U28A, through CMOS switch U36 and through line buffer U25. The CMOS switch U36 is used to switch between the data pump chip set CODEC of circuit 310 (shown in FIG. 3) and the voice control CODEC of circuit 306 (also shown in FIG. 3). The signal lines AOUTN and AOUTP correspond to signals received from the voice control CODEC of circuit 306. CODEC U35 is part of circuit 311 of FIG. 3.

Figure 5A:
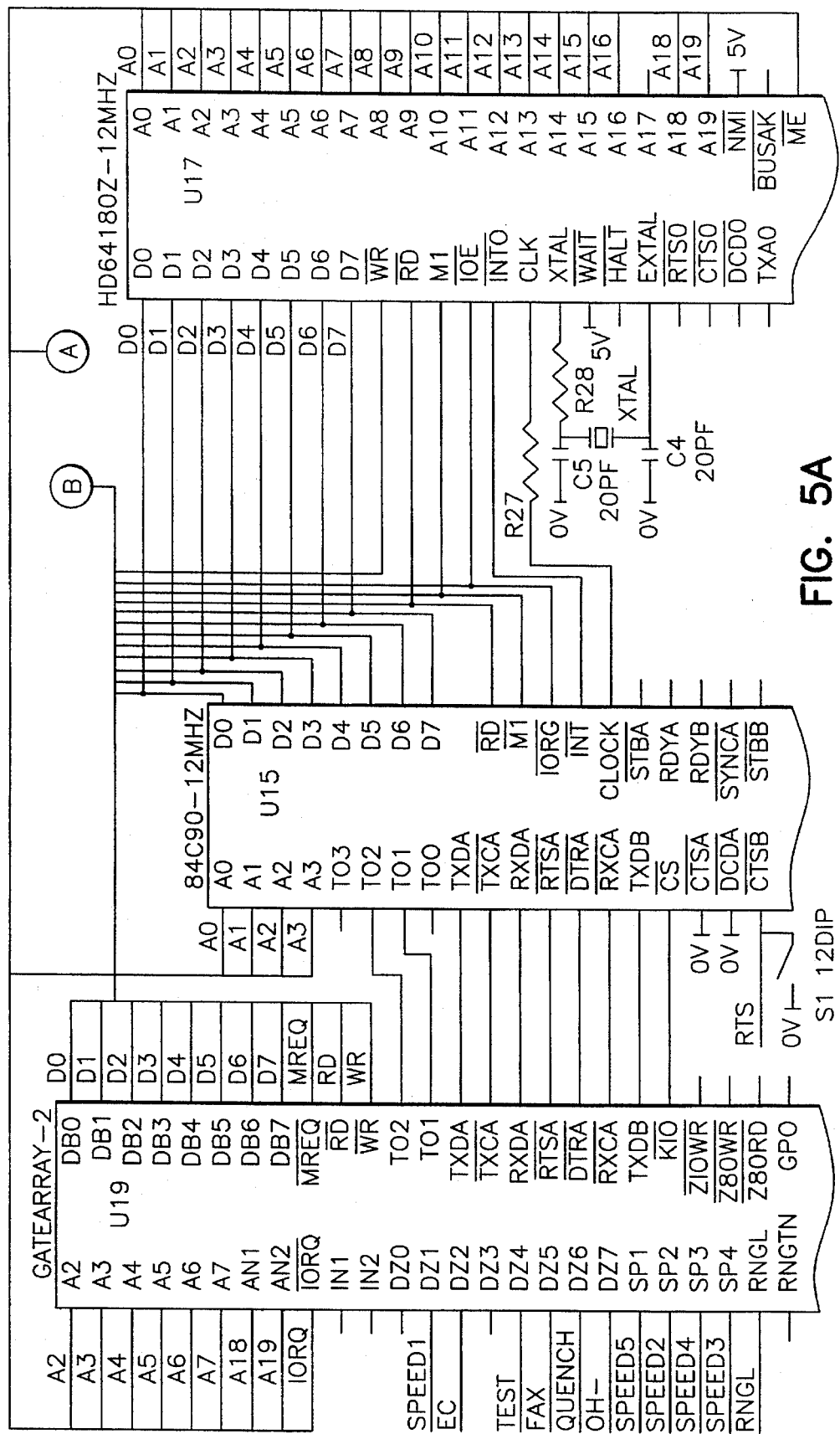
FIGS. 5A–5C, 6A–6C, 7A–7C, 8A–8B, 9A–9C and 10A–10C are detailed electrical schematic diagrams of the circuitry of the hardware components of the present system.
Figure 5B:
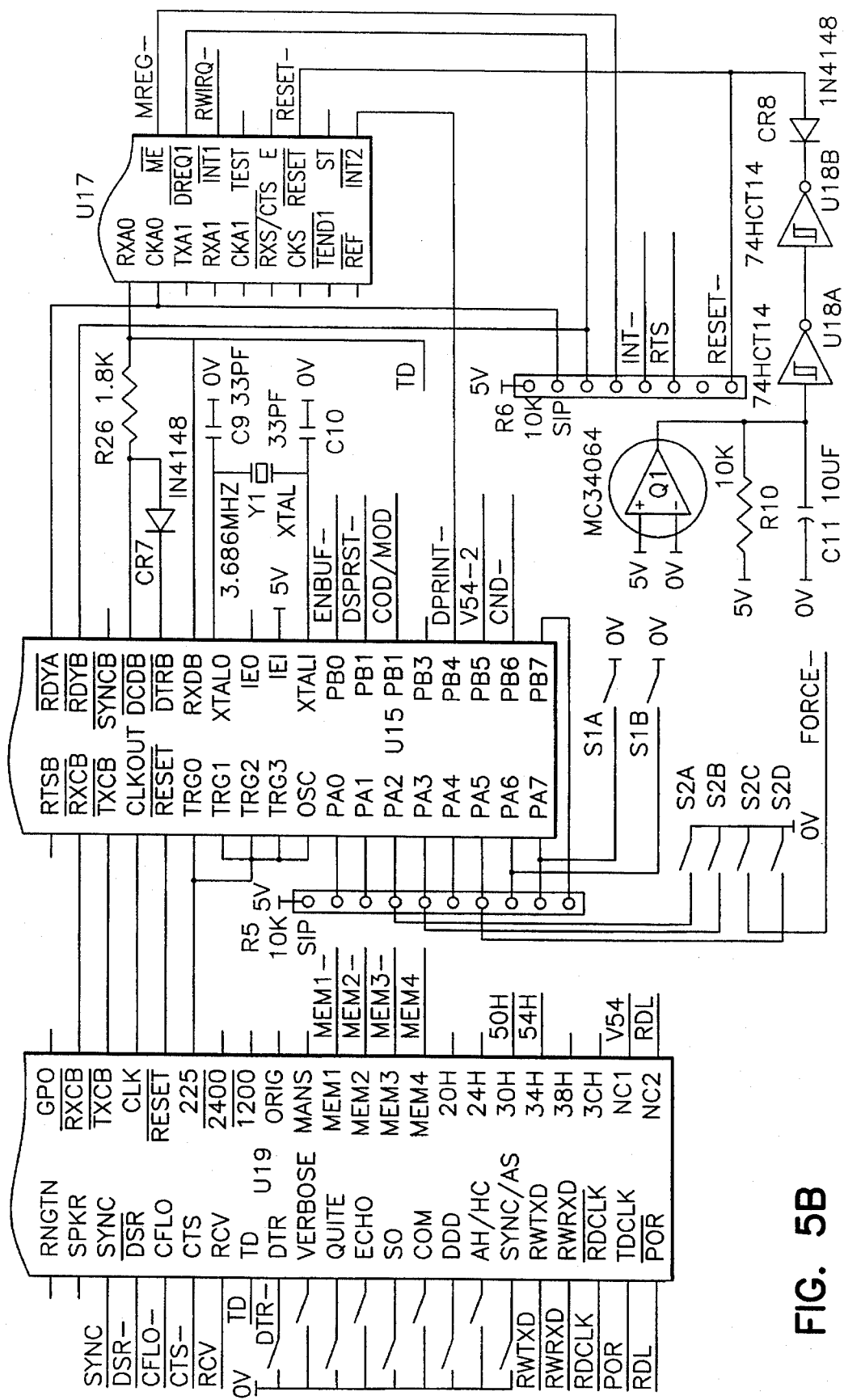
Figure 5C:
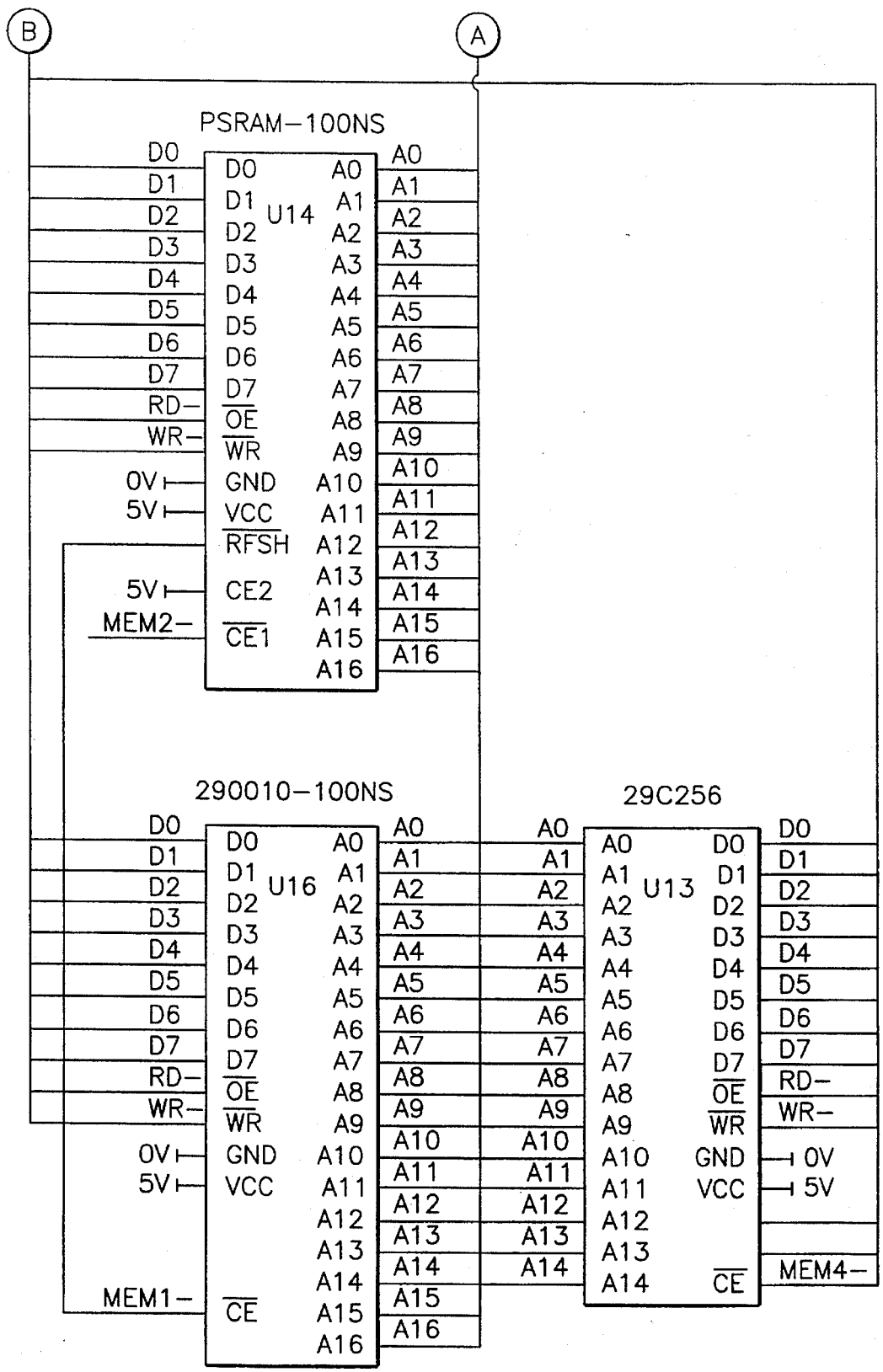

The main controller of controller circuit 313 and the support circuits 312, 314, 316, 317 and 308 are shown in FIGS. 5A–5C. In the preferred embodiment of the present system, the main controller is a Z80180 eight-bit microprocessor chip. In the preferred implementation, microcontroller chip U17 is a Z80180 microprocessor, part number Z84CO1 by Zilog, Inc. of Campbell, Calif. (also available from Hitachi Semiconductor as part number HD64180Z). The Zilog Z80180 eight-bit microprocessor operates at 12 MHz internal clock speed by means of an external crystal XTAL, which in the preferred embodiment, is a 24.576 MHz crystal. The crystal circuit includes capacitors C4 and C5 which are 20 pf capacitors and resistor R28 which is a 33 ohm resistor. The crystal and support circuitry is connected according to manufacturer's specifications found in the Zilog Intelligent Peripheral Controllers Data Book published by Zilog, Inc. The product description for the Z84CO1 Z80180 CPU from the Z84CO1 Z80 CPU Product Specification pgs. 43–73 of the Zilog 1991 Intelligent Peripheral Controllers databook is hereby incorporated by reference.

The Z80180 microprocessor in microcontroller chip U17 is intimately connected to a serial/parallel I/O counter timer chip U15 which is, in the preferred embodiment, a Zilog 84C90 CMOS Z80 KIO serial/parallel/counter/timer integrated circuit available from Zilog, Inc. This multi-function I/O chip U15 combines the functions of a parallel input/output port, a serial input/output port, bus control circuitry, and a clock timer circuit in one chip. The Zilog Z84C90 product specification describes the detailed internal operations of this circuit in the Zilog Intelligent Peripheral Controllers 1991 Handbook available from Zilog, Inc. Z84C90 CMOS Z80 KIO Product specification pgs. 205–224 of the Zilog 1991 Intelligent Peripheral Controllers databook is hereby incorporated by reference.

Data and address buses A and B shown in FIG. 5A connect the Z80180 microprocessor in microcontroller U17 with the Z80 KIO circuit U15 and a gate array circuit U19, and to other portions of the electrical schematic diagrams. The gate array U19 includes miscellaneous latch and buffer circuits for the present system which normally would be found in discrete SSI or MSI integrated circuits. By combining a wide variety of miscellaneous support circuits into a single gate array, a much reduced design complexity and manufacturing cost is achieved. A detailed description of the internal operations of gate array U19 is described more fully below in conjunction with schematic diagrams of FIGS. 10A–10C.

The memory chips which operate in conjunction with the Z80 microprocessor in microcontroller chip U17 are shown in FIG. 5C. The connections A, B correspond to the connections to the address and data buses, respectively, found on FIG. 5A. Memory chips U16 and U13 are read-only memory (ROM) chips which are electrically alterable in place. These programmable ROMs, typically referred to as flash PROMs or Programmable Erasable Read Only Memories (PEROMs) hold the program code and operating parameters for the present system in a non-volatile memory. Upon power-up, the programs and operating parameters are transferred to the voice control DSP RAM U12, shown in FIG. 9B.

In the preferred embodiment, RAM chip U14 is a pseudostatic RAM which is essentially a dynamic RAM with a built-in refresh. Those skilled in the art will readily recognize that a wide variety memory chips may be used and substituted for pseudo-static RAM U14 and flash PROMs U16 and U13.

Referring once again to FIG. 3, the main controller circuit 313 communicates with the voice control DSP of circuit 306 through dual port RAM circuit 308. The digital telephone CODEC circuit 305, the voice control DSP and CODEC circuit 306, the DSP RAM 307 and the dual port RAM 308 are all shown in detailed electrical schematic diagrams of FIGS. 9A–9C.

Figure 9A:
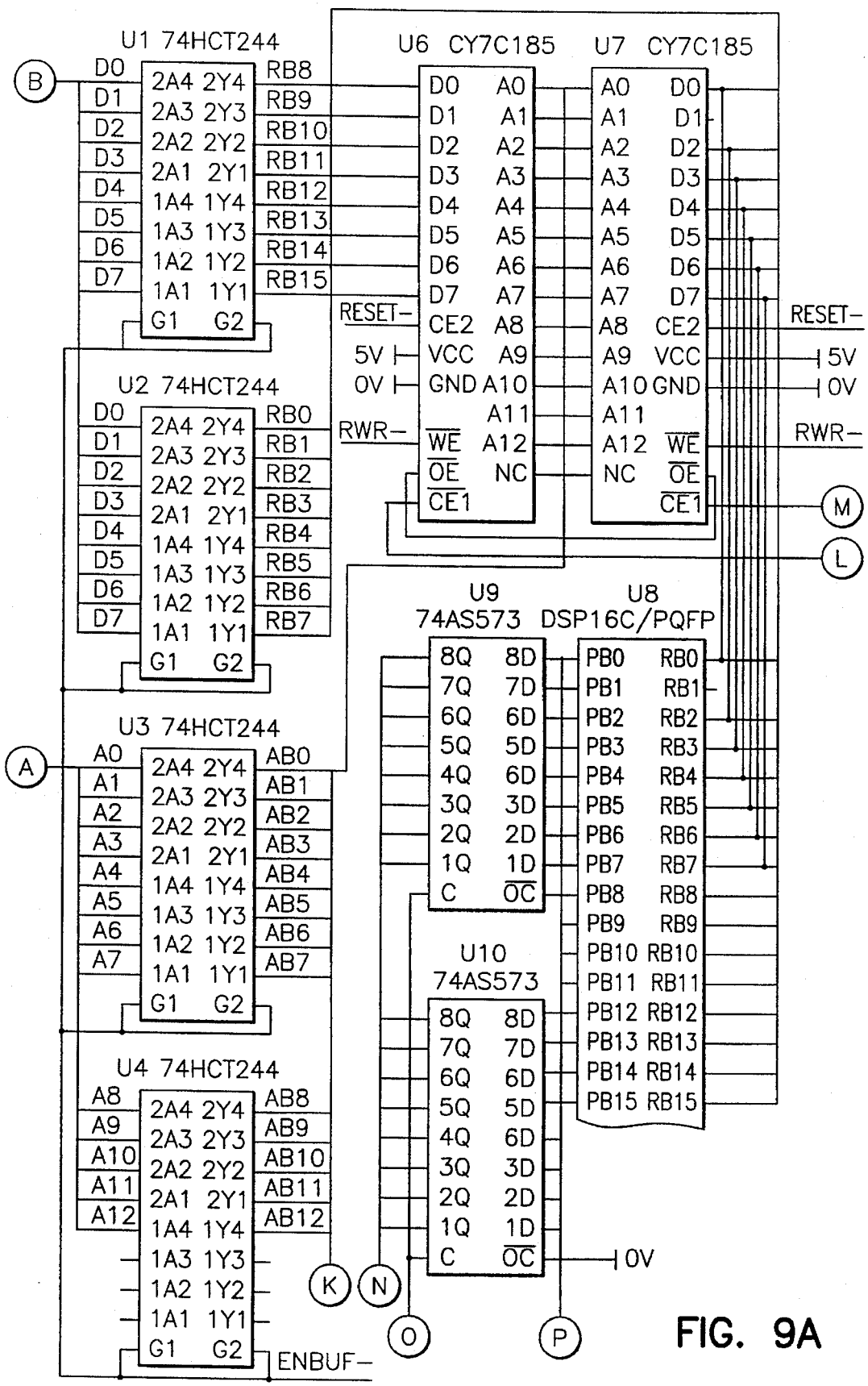

Referring to FIG. 9A, the DSP RAM chips U6 and U7 are shown with associated support chips. Support chips U1 and U2 are in the preferred embodiment part 74HCT244 which are TTL-level latches used to capture data from the data bus and hold it for the DSP RAM chips U6 and U7. Circuits U3 and U4 are also latch circuits for also latching address information to control DSP RAM chips U6 and U7. Once again, the address bus A and data bus B shown in FIG. 9A are multi-wire connections which, for the clarity of the drawing, are shown as a thick bus wire representing a grouping of individual wires.

Figure 9B:
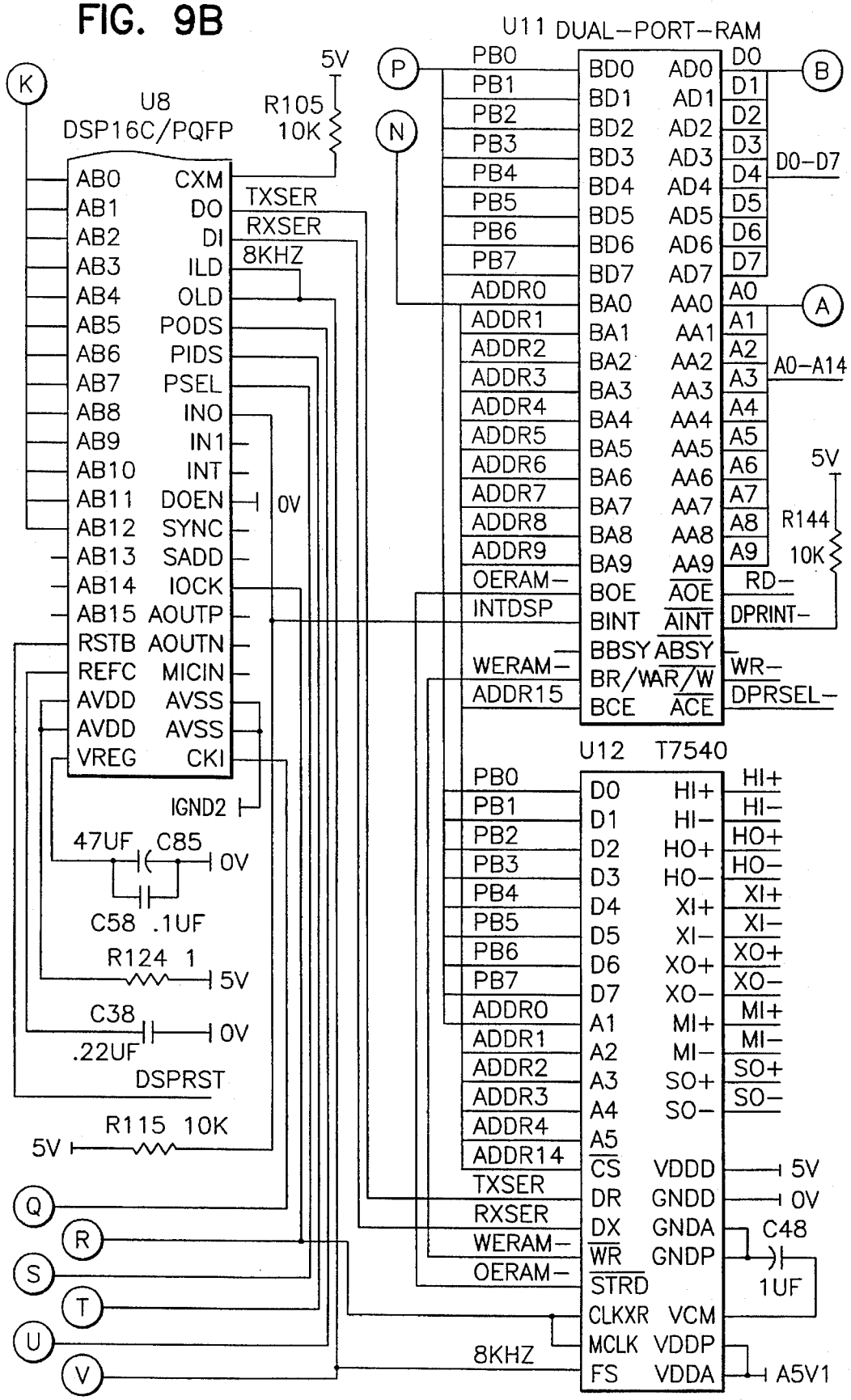

Also in FIG. 9A, the DSP RAMs U6 and U7 are connected to the voice control DSP and CODEC chip U8 as shown split between FIGS. 9A and 9B. DSP/CODEC chip U8 is, in the preferred embodiment, part number WE® DSP16C, digital signal processor and CODEC chip manufactured and sold by AT&T Microelectronics. This is a 16-bit programmable DSP with a voice band sigma-delta CODEC on one chip. Although the CODEC portion of this chip is capable of analog-to-digital and digital-to-analog signal acquisition and conversion system, the actual D/A and A/D functions for the telephone interface occur in digital telephone CODEC chip U12 (corresponding to digital telephone CODEC circuit 305 of FIG. 3). Chip U8 includes circuitry for sampling, data conversion, anti-aliasing filtering and anti-imaging filtering. The programmable control of DSP/CODEC chip U8 allows it to receive digitized voice from the telephone interface (through digital telephone CODEC chip U12) and store it in a digitized form in the dual port RAM chip U11. The digitized voice can then be passed to the main controller circuit 313 where the digitized voice may be transmitted to the personal computer over the RS232 circuit 315. In a similar fashion, digitized voice stored by the main controller circuit 313 in the dual port RAM U11 may be transferred through voice control DSP chip U8, converted to analog signals by telephone CODEC U12 and passed to the user. Digital telephone CODEC chip U12 includes a direct telephone handset interface on the chip.

The connections to DSP/CODEC chip U8 are shown split across FIGS. 9A and 9B. Address/data decode chips U9 and U10 on FIG. 9A serve to decode address and data information from the combined address/data bus for the dual port RAM chip U11 of FIG. 9B. The interconnection of the DSP/CODEC chip U8 shown on FIGS. 9A and 9B is described more fully in the WE® DSP16C Digital Signal Processor/CODEC Data Sheet published May, 1991 by AT&T Microelectronics, which is hereby incorporated by reference.

The Digital Telephone CODEC chip U12 is also shown in FIG. 9B which, in the preferred embodiment, is part number T7540 Digital Telephone CODEC manufactured and sold by AT&T Microelectronics. A more detailed description of this telephone CODEC chip U12 is described in the T7540 Digital Telephone CODEC Data Sheet and Addendum published July, 1991 by AT&T Microelectronics, which is hereby incorporated by reference.

Figure 9C:
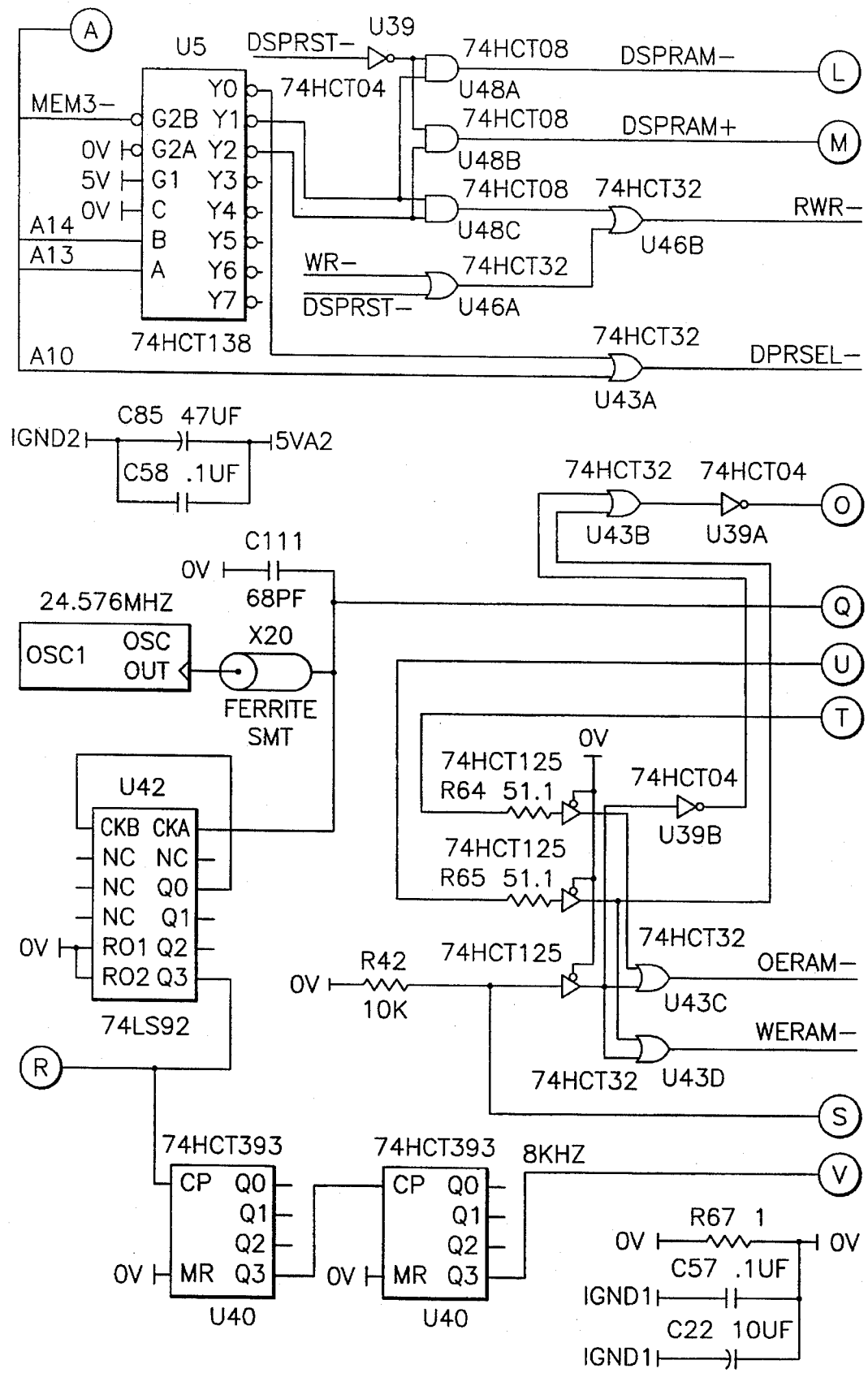

Support circuits shown on FIG. 9C are used to facilitate communication between CODEC chip U12, DSP/CODEC chip U8 and dual port RAM U11. For example, an 8 kHz clock is used to synchronize the operation of CODEC U12 and DSP/CODEC U8.

The operation of the dual port RAM U11 is controlled both by DSP U8 and main controller chip U17. The dual port operation allows writing into one address while reading from another address in the same chip. Both processors can access the exact same memory locations with the use of a contention protocol such that when one is reading the other cannot be writing. In the preferred embodiment, dual port RAM chip U11 is part number CYZC131 available from Cyprus Semiconductor. This chip includes built in contention control so that if two processors try to access the same memory location at the same time, the first one making the request gets control of the address location and the other processor must wait. In the preferred embodiment, a circular buffer is arranged in dual port RAM chip U11 comprising 24 bytes. By using a circular buffer configuration with pointers into the buffer area, both processors will not have a contention problem.

The DSP RAM chips U6 and U7 are connected to the DSP chip U8 and also connected through the data and address buses to the Zilog microcontroller U17. In this configuration, the main controller can download the control programs for DSP U8 into DSP RAMs U6 and U7. In this fashion, DSP control can be changed by the main controller or the operating programs on the personal computer, described more fully below. The control programs stored in DSP chips U6 and U7 originate in the flash PEROM chips U16 and U17. The power-up control routine operating on controller chip U17 downloads the DSP control routines into DSP RAM chips U6 and U7.

Figure 6A:
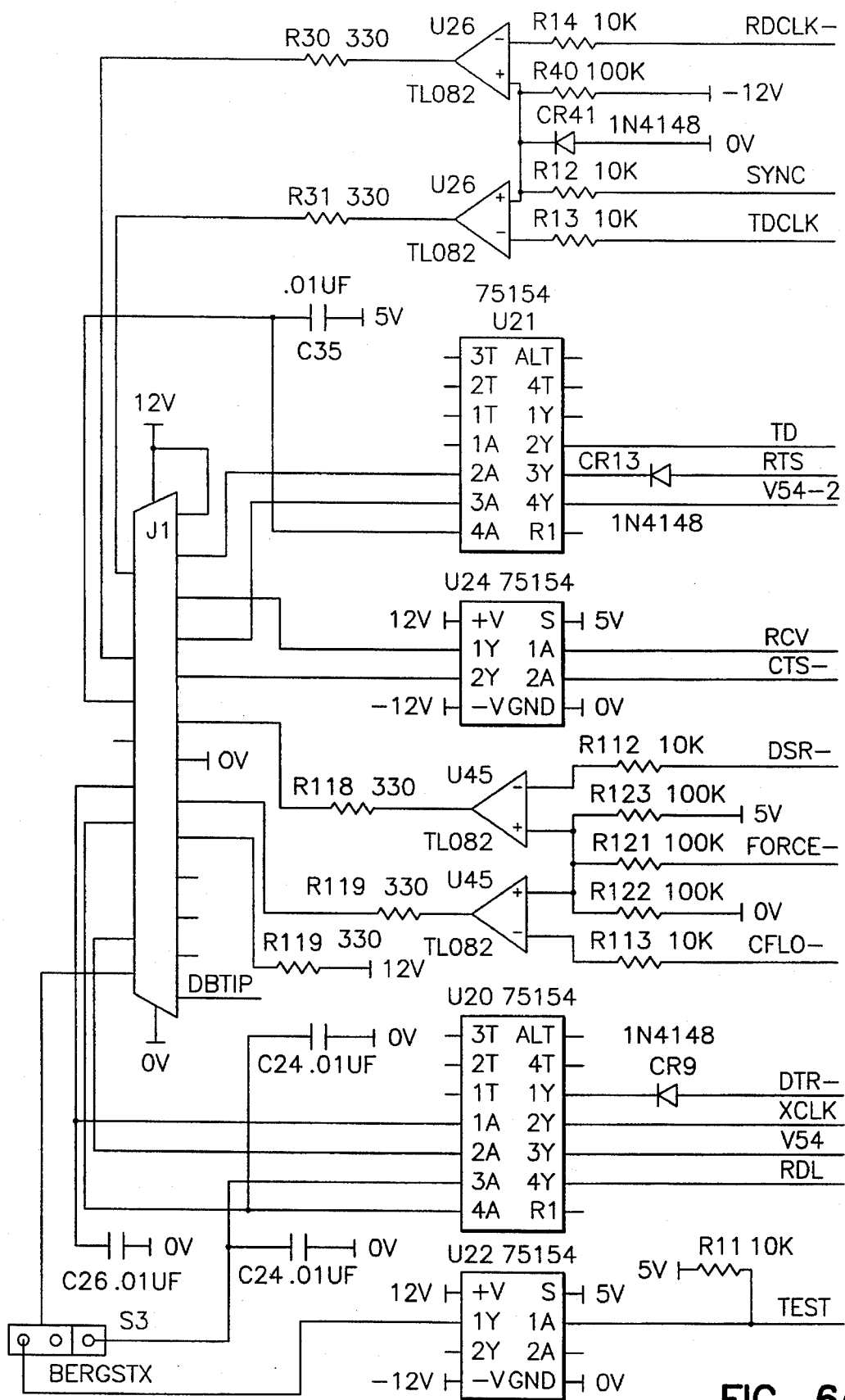
Figure 6B:
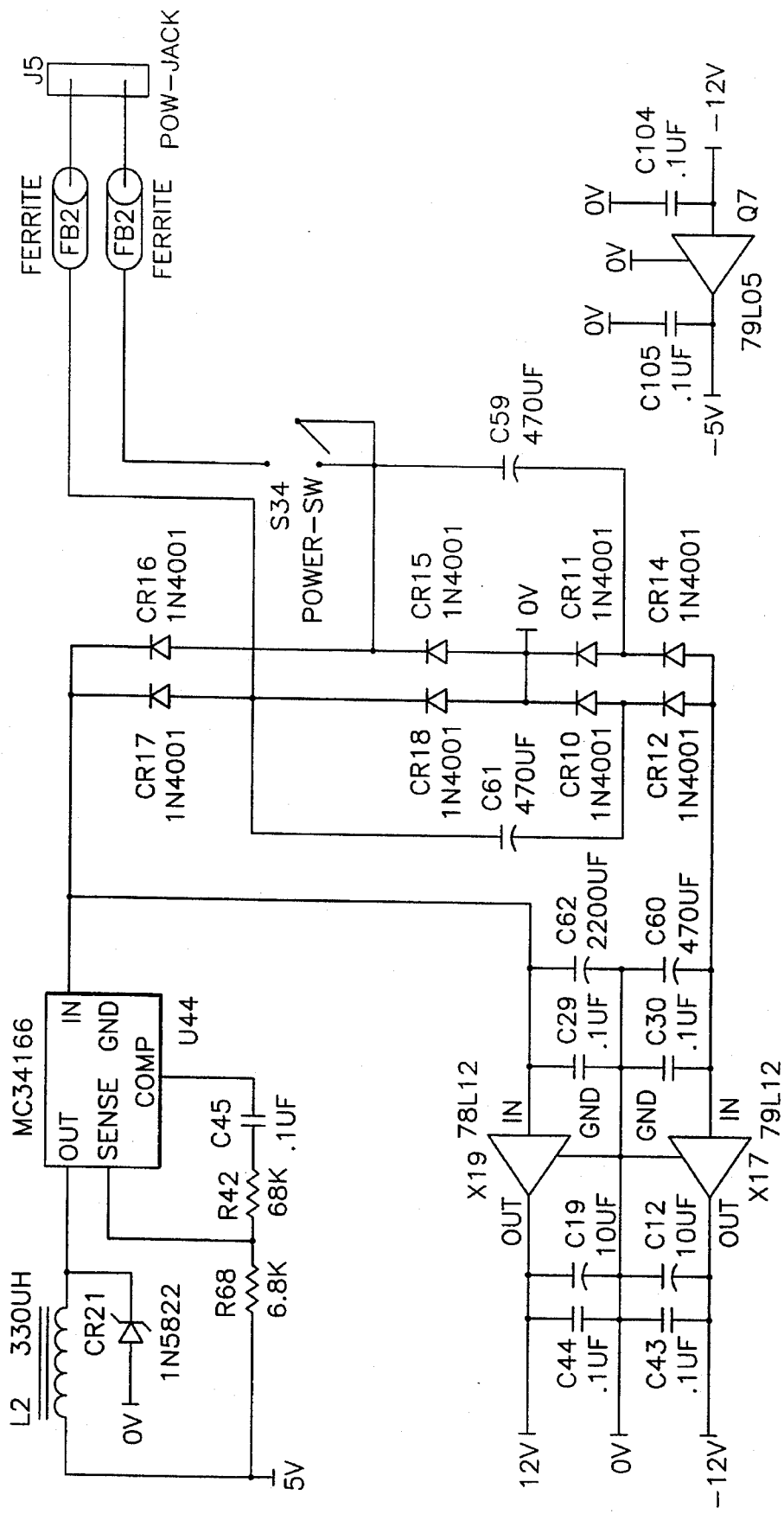
Figure 6C:
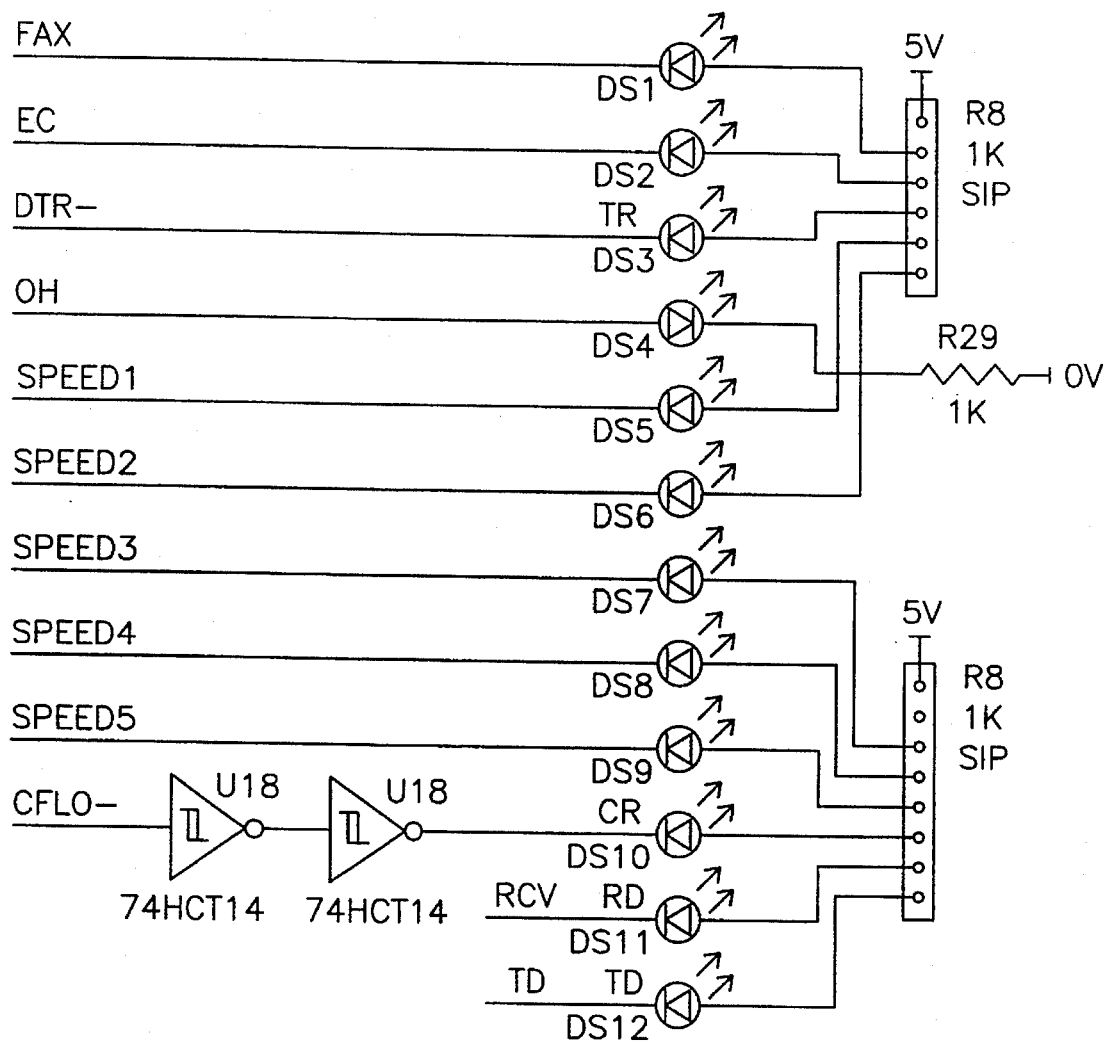

The interface between the main controller circuit 313 and the personal computer is through SIO circuit 314 and RS232 serial interface 315. These interfaces are described more fully in conjunction with the detailed electrical schematic diagrams of FIG. 6A–6C. RS232 connection J1 is shown on FIG. 6A with the associated control circuit and interface circuitry used to generate and receive the appropriate RS232 standard signals for a serial communications interface with a personal computer. FIG. 6B is a detailed electrical schematic diagram showing the generation of various voltages for powering the hardware components of the electrical schematic diagrams of hardware components 20. The power for the present hardware components is received on connector J5 and controlled by power switch S34. From this circuitry of FIG. 6B, plus and minus 12 volts, plus five volts and minus five volts are derived for operating the various RAM chips, controller chips and support circuitry of the present system. FIG. 6C shows the interconnection of the status LED's found on the front display of the box 20.

Figure 10A:
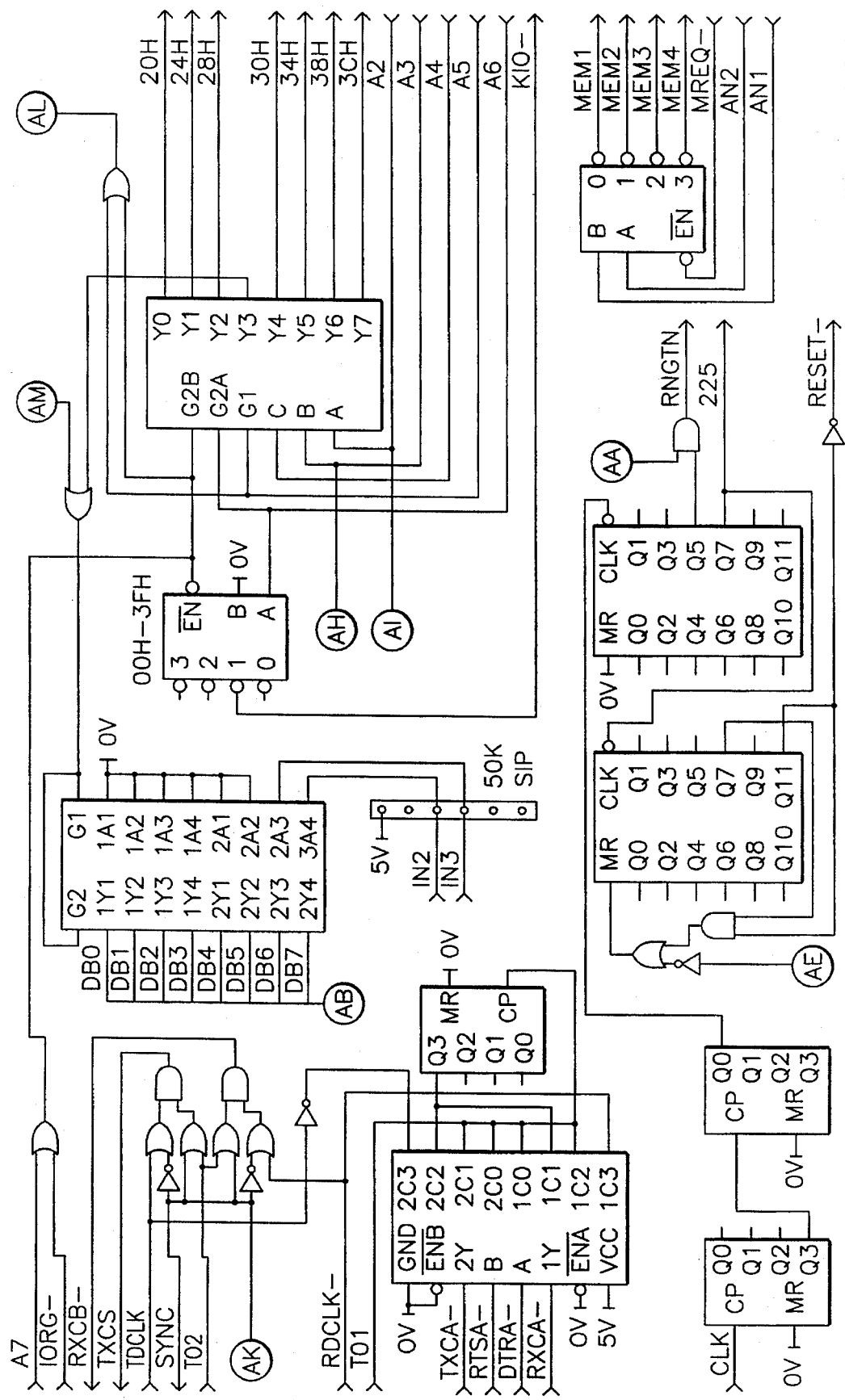
Figure 10B:
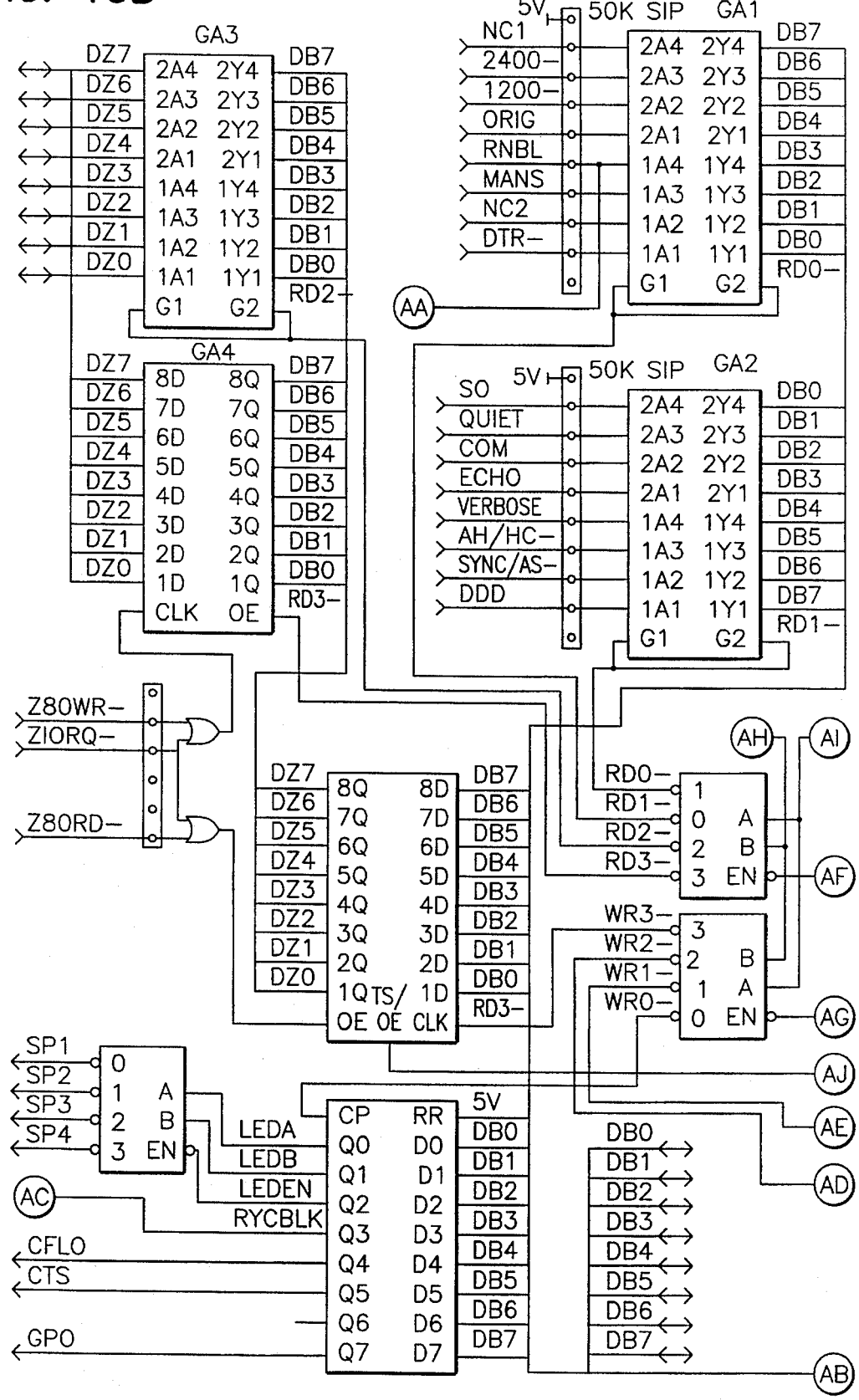
Figure 10C:
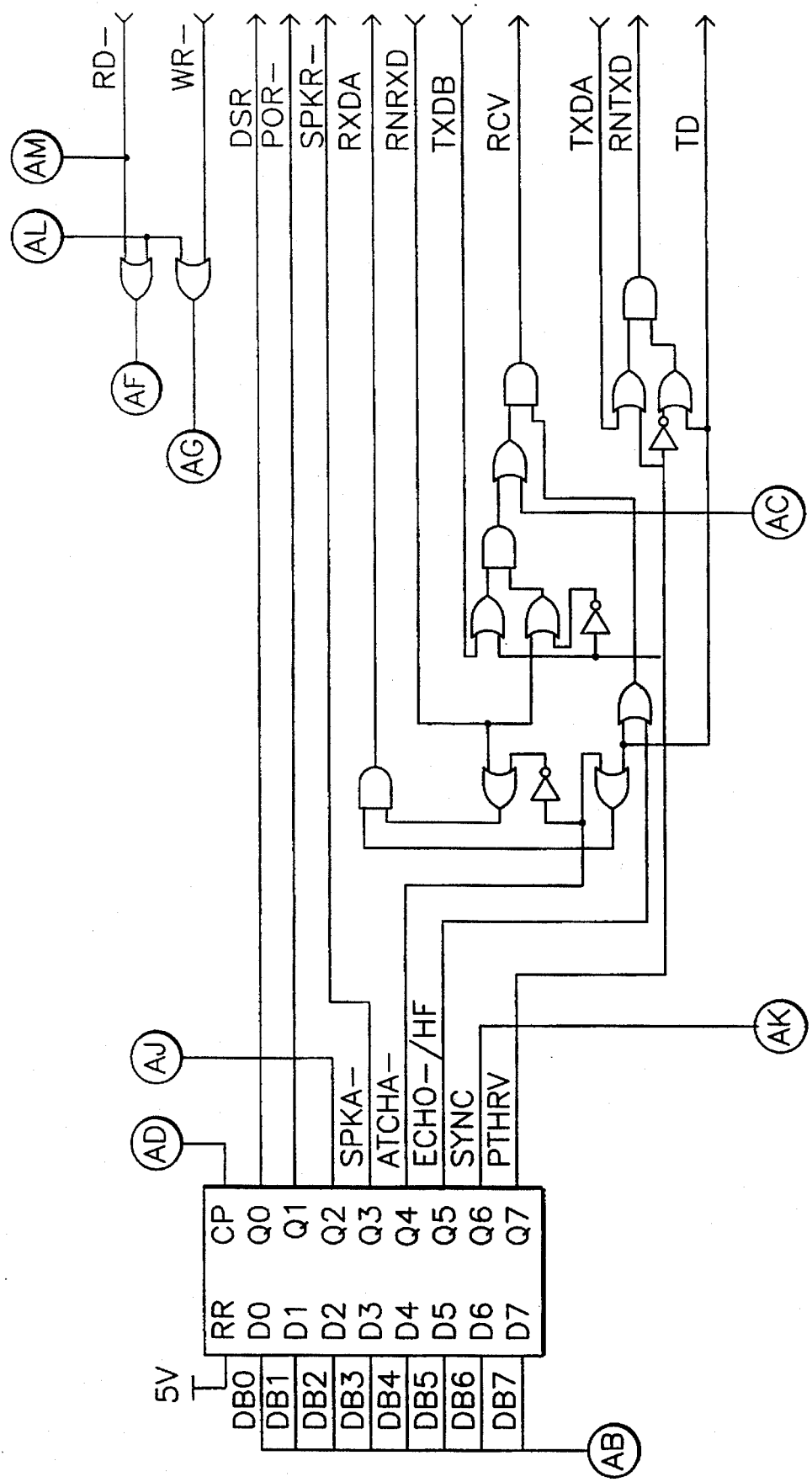

Finally, the "glue logic" used to support various functions in the hardware components 20 are described in conjunction with the detailed electrical schematic diagrams of FIGS. 10A–10C. The connections between FIGS. 10A and 10C and the previous schematic diagrams is made via the labels for each of the lines. For example, the LED status lights are controlled and held active by direct addressing and data control of latches GA1 and GA2. For a more detailed description of the connection of the glue logic of FIGS. 10A–10C, the gate array U19 is shown connected in FIGS. 5A and 5B.

Packet Protocol Between the PC and the Hardware Component

A special packet protocol is used for communication between the hardware components 20 and the personal computer (PC) 10. The protocol is used for transferring different types of information between the two devices such as the transfer of DATA, VOICE, and QUALIFIED information. The protocol also uses the BREAK as defined in CCITT X.28 as a means to maintain protocol synchronization. A description of this BREAK sequence is also described in the Statutory Invention Registration entitled "ESCAPE METHODS FOR MODEM COMMUNICATIONS", to Timothy D. Gunn filed Jan. 8, 1993, which is hereby incorporated by reference.

The protocol has two modes of operation. One mode is packet mode and the other is stream mode. The protocol allows mixing of different types of information into the data stream without having to physically switch modes of operation. The hardware component 20 will identify the packet received from the computer 10 and perform the appropriate action according to the specifications of the protocol. If it is a data packet, then the controller 313 of hardware component 20 would send it to the data pump circuit 311. If the packet is a voice packet, then the controller 313 of hardware component 20 would distribute that information to the Voice DSP 306. This packet transfer mechanism also works in the reverse, where the controller 313 of hardware component 20 would give different information to the computer 10 without having to switch into different modes. The packet protocol also allows commands to be sent to either the main controller 313 directly or to the Voice DSP 306 for controlling different options without having to enter a command state.

Packet mode is made up of 8 bit asynchronous data and is identified by a beginning synchronization character (01 hex) followed by an ID/LI character and then followed by the information to be sent. In addition to the ID/LI character codes defined below, those skilled in the art will readily recognize that other ID/LI character codes could be defined to allow for additional types of packets such as video data, or alternate voice compression algorithm packets such as Codebook Excited Linear Predictive Coding (CELP) algorithm, GSM, RPE, VSELP, etc.

Stream mode is used when large amounts of one type of packet (VOICE, DATA, or QUALIFIED) is being sent. The transmitter tells the receiver to enter stream mode by a unique command. Thereafter, the transmitter tells the receiver to terminate stream mode by using the BREAK command followed by an "AT" type command. The command used to terminate the stream mode can be a command to enter another type of stream mode or it can be a command to enter back into packet mode.

Currently there are 3 types of packets used: DATA, VOICE, and QUALIFIED. Table 1 shows the common packet parameters used for all three packet types. Table 2 shows the three basic types of packets with the sub-types listed.

TABLE 1

Packet Parameters

1. Asynchronous transfer
2. 8 bits, no parity
3. Maximum packet length of 128 bytes
    - IDentifier byte = 1
    - InFormation = 127
4. SPEED
    - variable from 9600 to 57600
    - default to 19200

TABLE 2

Packet Types

1. Data
2. Voice
3. Qualified:
    a. COMMAND
    b. RESPONSE
    C. STATUS
    d. FLOW CONTROL
    e. BREAK
    f. ACK
    g. NAK
    h. STREAM A Data Packet is shown in Table 1 and is used for normal data transfer between the controller 313 of hardware component 20 and the computer 10 for such things as text, file transfers, binary data and any other type of information presently being sent through modems. All packet transfers begin with a synch character 01 hex (synchronization byte). The Data Packet begins with an ID byte which specifies the packet type and packet length. Table 3 describes the Data Packet byte structure and Table describes the bit structure of the ID byte of the Data Packet. Table 5 is an example of a Data Packet with a byte length of 6. The value of the LI field is the actual length of the data field to follow, not counting the ID byte.

TABLE 3

Data Packet Byte Structure byte 1 = 01h (sync byte)
byte 2 = ID/LI (ID byte/length indicator)
bytes 3–127 = data (depending on LI)

| 01 SYNC | ID LI | data | data | data | data | ----- | data |

TABLE 4

ID Byte of Data Packet

Bit 7 identifies the type of packet
Bits 6–0 contain the LI or length indicator portion of the ID byte

| 7 | 6 | 5 | 4 | 3 | 2 | 1 | 0 |
|---|---|---|---|---|---|---|---|
| 0 | LI (Length Indicator) = 1 to 127 | | | | | | |

TABLE 5

Data Packet Example

LI (length inicator) = 6

| 01 SYNC | 06 ID | data | data | data | data | data | data |

The Voice Packet is used to transfer compressed VOICE messages between the controller 313 of hardware component 20 and the computer 10. The Voice Packet is similar to the Data Packet except for its length which is, in the preferred embodiment, currently fixed at 23 bytes of data. Once again, all packets begin with a synchronization character chosen in the preferred embodiment to be 01 hex (01H). The ID byte of the Voice Packet is completely a zero byte: all bits are set to zero. Table 6 shows the ID byte of the Voice Packet and Table 7 shows the Voice Packet byte structure.

TABLE 6

ID Byte of Voice Packet

| 7 | 6 | 5 | 4 | 3 | 2 | 1 | 0 |
|---|---|---|---|---|---|---|---|
| 0 | LI (Length Indicator) = 0 | | | | | | |

TABLE 7

Voice Packet Byte Structure

LI (length indicator) = 0
23 bytes of data

| 01 SYNC | 00 ID | data | data | data | data | ----- | data |

The Qualified Packet is used to transfer commands and other non-data/voice related information between the controller 313 of hardware component 20 and the computer 10.

The various species or types of the Qualified Packets are described below and are listed above in Table 2. Once again, all packets start with a synchronization character chosen in the preferred embodiment to be 01 hex (01H). A Qualified Packet starts with two bytes where the first byte is the ID byte and the second byte is the QUALIFIER type identifier. Table 8 shows the ID byte for the Qualified Packet, Table 9 shows the byte structure of the Qualified Packet and Tables 10–12 list the Qualifier Type byte bit maps for the three types of Qualified Packets.

TABLE 8

ID Byte of Qualified Packet

| 7 | 6 | 5 | 4 | 3 | 2 | 1 | 0 |
|---|---|---|---|---|---|---|---|
| 0 | LI (Length Indicator) = 1 to 127 | | | | | | |

The Length Identifier of the ID byte equals the amount of data which follows including the QUALIFIER byte (QUAL byte+DATA). If LI=1, then the Qualifier Packet contains the Q byte only.

TABLE 9

Qualifier Packet Byte Structure

| 01 SYNC | 85 ID | QUAL BYTE | data | data | data | - - - | data |
|---|---|---|---|---|---|---|---|

The bit maps of the Qualifier Byte (QUAL BYTE) of the Qualified Packet are shown in Tables 10–12. The bit map follows the pattern whereby if the QUAL byte=0, then the command is a break. Also, bit 1 of the QUAL byte designates ack/nak, bit 2 designates flow control and bit 6 designates stream mode command. Table 10 describes the Qualifier Byte of Qualified Packet, Group 1 which are immediate commands. Table 11 describes the Qualifier Byte of Qualified Packet, Group 2 which are stream mode commands in that the command is to stay in the designated mode until a BREAK+INIT command string is sent. Table 12 describes the Qualified Byte of Qualified Packet, Group 3 which are information or status commands.

TABLE 10

Qualifier Byte of Qualified Packet: Group 1

| 7 | 6 | 5 | 4 | 3 | 2 | 1 | 0 | |
|---|---|---|---|---|---|---|---|---|
| x | x | x | x | x | x | x | x | |
| 0 | 0 | 0 | 0 | 0 | 0 | 0 | 0 | = break |
| 0 | 0 | 0 | 0 | 0 | 0 | 1 | 0 | = ACK |
| 0 | 0 | 0 | 0 | 0 | 0 | 1 | 1 | = NAK |
| 0 | 0 | 0 | 0 | 0 | 1 | 0 | 0 | = xoff or stop sending data |
| 0 | 0 | 0 | 0 | 0 | 1 | 0 | 1 | = xon or resume sending data |
| 0 | 0 | 0 | 0 | 1 | 0 | 0 | 0 | = cancel fax |

TABLE 11

Qualifier Byte of Qualified Packet: Group 2

| 7 | 6 | 5 | 4 | 3 | 2 | 1 | 0 | |
|---|---|---|---|---|---|---|---|---|
| x | x | x | x | x | x | x | x | |
| 0 | 1 | 0 | 0 | 0 | 0 | 0 | 1 | = stream command mode |
| 0 | 1 | 0 | 0 | 0 | 0 | 1 | 0 | = stream data |
| 0 | 1 | 0 | 0 | 0 | 0 | 1 | 1 | = stream voice |
| 0 | 1 | 0 | 0 | 0 | 1 | 0 | 0 | = stream video |

TABLE 11-continued

Qualifier Byte of Qualified Packet: Group 2

| 7 | 6 | 5 | 4 | 3 | 2 | 1 | 0 | |
|---|---|---|---|---|---|---|---|---|
| x | x | x | x | x | x | x | x | |
| 0 | 1 | 0 | 0 | 0 | 1 | 0 | 1 | = stream A |
| 0 | 1 | 0 | 0 | 0 | 1 | 1 | 0 | = stream B |
| 0 | 1 | 0 | 0 | 0 | 1 | 1 | 1 | = stream C |

The Qualifier Packet indicating stream mode and BREAK attention is used when a large of amount of information is sent (voice, data . . . ) to allow the highest throughput possible. This command is mainly intended for use in DATA mode but can be used in any one of the possible modes. To change from one mode to another, a break-init sequence would be given. A break "AT . . . <cr>" type command would cause a change in state and set the serial rate from the "AT" command.

TABLE 12

Qualifier Byte of Qualified Packet: Group 3

| 7 | 6 | 5 | 4 | 3 | 2 | 1 | 0 | |
|---|---|---|---|---|---|---|---|---|
| x | x | x | x | x | x | x | x | |
| 1 | 0 | 0 | 0 | 0 | 0 | 0 | 0 | = commands |
| 1 | 0 | 0 | 0 | 0 | 0 | 0 | 1 | = responses |
| 1 | 0 | 0 | 0 | 0 | 0 | 1 | 0 | = status |

Cellular Supervisory Packet

In order to determine the status of the cellular link, a supervisory packet shown in Table 13 is used. Both sides of the cellular link will send the cellular supervisory packet every 3 seconds. Upon receiving the cellular supervisory packet, the receiving side will acknowledge it using the ACK field of the cellular supervisory packet. If the sender does not receive an acknowledgement within one second, it will repeat sending the cellular supervisory packet up to 12 times. After 12 attempts of sending the cellular supervisory packet without an acknowledgement, the sender will disconnect the line. Upon receiving an acknowledgement, the sender will restart its 3 second timer. Those skilled in the art will readily recognize that the timer values and wait times selected here may be varied without departing from the spirit or scope of the present invention.

TABLE 13

Cellular Supervisory Packet Byte Structure

| 8F | ID | LI | ACK | data | data | - - - | data |
|---|---|---|---|---|---|---|---|

Speech Compression

The Speech Compression algorithm described above for use in the voice mail function, the multimedia mail function and the show and tell function of the present system is all accomplished via the voice control circuit 306. Referring once again to FIG. 3, the user is talking either through the handset, the headset or the microphone/speaker telephone interface. The analog voice signals are received and digitized by the telephone CODEC circuit 305. The digitized voice information is passed from the digital telephone CODEC circuit 305 to the voice control circuits 306. The digital signal processor (DSP) of the voice control circuit 306 is programmed to do the voice compression algorithm. The source code programmed into the voice control DSP is attached in the microfiche appendix. The DSP of the voice control circuit 306 compresses the speech and places the compressed digital representations of the speech into special packets described more fully below. As a result of the voice compression algorithm, the compressed voice information is passed to the dual port ram circuit 308 for either forwarding and storage on the disk of the personal computer via the RS232 serial interface or for multiplexing with conventional modem data to be transmitted over the telephone line via the telephone line interface circuit 309 in the voice-over-data mode of operation Show and Tell function 123).

Speech Compression Algorithm

To multiplex high-fidelity speech with digital data and transmit both over the over the telephone line, a high available bandwidth would normally be required. In the present invention, the analog voice information is digitized into 8-bit PCM data at an 8 kHz sampling rate producing a serial bit stream of 64,000 bps serial data rate. This rate cannot be transmitted over the telephone line. With the Speech Compression algorithm described below, the 64 kbs digital voice data is compressed into a 9200 bps encoding bit stream using a fixed-point (non-floating point) DSP such that the compressed speech can be transmitted over the telephone line using a 9600 baud modem transmission. This is an approximately 7 to one compression ratio. This is accomplished in an efficient manner such that enough machine cycles remain during real time speech compression to allow real time acoustic and line echo cancellation in the same fixed-point DSP.

Even at 9200 bps serial data rate for voice data transmission, this bit rate leaves little room for concurrent conventional data transmission. A silence detection function is used to detect quiet intervals in the speech signal and substitute conventional data packets in lieu of voice data packets to effectively time multiplex the voice and data transmission. The allocation of time for conventional data transmission is constantly changing depending upon how much silence is on the voice channel.

The voice compression algorithm of the present system relies on a model of human speech which shows that human speech contains redundancy inherent in the voice patterns. Only the incremental innovations (changes) need to be transmitted. The algorithm operates on 160 digitized speech samples (20 milliseconds), divides the speech samples into time segments of 5 milliseconds each, and uses predictive coding on each segment. With this algorithm, the current segment is predicted as best as possible based on the past recreated segments and a difference signal is determined. The difference value is compared to the stored difference values in a lookup table or code book, and the address of the closest value is sent to the remote site along with the predicted gain and pitch values for each segment. In this fashion, four 5 ms speech segments can be reduced to a packet of 23 bytes or 184 bits (46 bits per sample segment). By transmitting 184 bits every 20 milliseconds, an effective serial data transmission rate of 9200 bps is accomplished.

To produce this compression, the present system includes a unique Vector Quantization (vQ) speech compression algorithm designed to provide maximum fidelity with minimum compute power and bandwidth. The vQ algorithm has two major components. The first section reduces the dynamic range of the input speech signal by removing short term and long term redundancies. This reduction is done in the waveform domain, with the synthesized part used as the reference for determining the incremental "new" content. The second section maps the residual signal into a code book optimized for preserving the general spectral shape of the speech signal.

Figure 11:
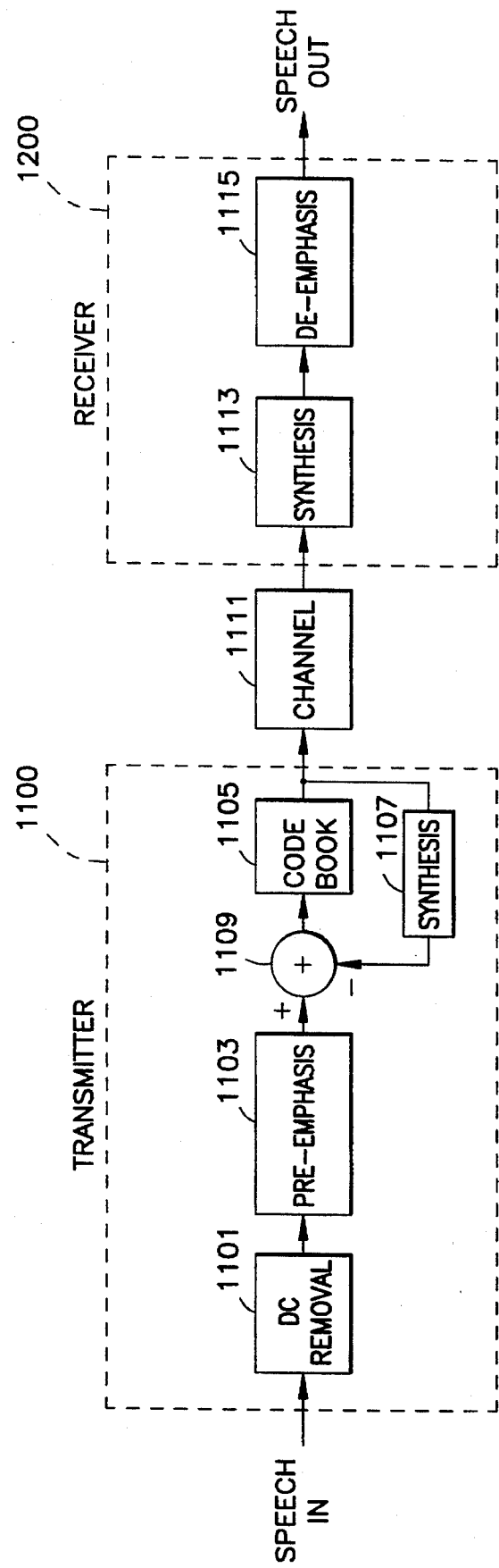
FIG. 11 is a signal flow diagram of the speech compression algorithm.

FIG. 11 is a high level signal flow block diagram of the speech compression algorithm used in the present system to compress the digitized voice for transmission over the telephone line in the voice over data mode of operation or for storage and use on the personal computer. The transmitter and receiver components are implemented using the programmable voice control DSP/CODEC circuit 306 shown in FIG. 3.

The DC removal stage 1101 receives the digitized speech signal and removes the D.C. bias by calculating the long-term average and subtracting it from each sample. This ensures that the digital samples of the speech are centered about a zero mean value. The pre-emphasis stage 1103 whitens the spectral content of the speech signal by balancing the extra energy in the low band with the reduced energy in the high band.

The system finds the innovation in the current speech segment by subtracting 1109 the prediction from reconstructed past samples synthesized from synthesis stage 1107. This process requires the synthesis of the past speech samples locally (analysis by synthesis). The synthesis block 1107 at the transmitter performs the same function as the synthesis block 1113 at the receiver. When the reconstructed previous segment of speech is subtracted from the present segment (before prediction), a difference term is produced in the form of an error signal. This residual error is used to find the best match in the code book 1105. The code book 1105 quantizes the error signal using a code book generated from a representative set of speakers and environments. A minimum mean squared error match is determined in 5 ms segments. In addition, the code book is designed to provide a quantization error with spectral rolloff (higher quantization error for low frequencies and lower quantization error for higher frequencies). Thus, the quantization noise spectrum in the reconstructed signal will always tend to be smaller than the underlying speech signal.

The channel corresponds to the telephone line in which the compressed speech bits are multiplexed with data bits using a packet format described below. The voice bits are sent in 100 ms packets of 5 frees each, each frame corresponding to 20 ms of speech in 160 samples. Each frame of 20 ms is further divided into 4 sub-blocks or segments of 5 ms each. In each sub-block of the data consists of 7 bits for the long term predictor, 3 bits for the long term predictor gain, 4 bits for the sub-block gain, and 32 bits for each code book entry for a total 46 bits each 5 ms. The 32 bits for code book entries consists of four 8-bit table entries in a 256 long code book of 1.25 ms duration. In the code book block, each 1.25 ms of speech is looked up in a 256 word code book for the best match. The 8-bit table entry is transmitted rather than the actual samples. The code book entries are pre-computed from representative speech segments. (See the DSP Source Code in the microfiche appendix.)

On the receiving end 1200, the synthesis block 113 at the receiver performs the same function as the synthesis block 1107 at the transmitter. The synthesis block 1113 reconstructs the original signal from the voice data packets by using the gain and pitch values and code book address corresponding to the error signal most closely matched in the code book. The code book at the receiver is similar to the code book 1105 in the transmitter. Thus the synthesis block recreates the original pre-emphasized signal. The de-emphasis stage 1115 inverts the pre-emphasis operation by restoring the balance of original speech signal.

The complete speech compression algorithm is summarized as follows:

a) Remove any D.C. bias in the speech signal.

b) Pre-emphasize the signal.

c) Find the innovation in the current speech segment by subtracting the prediction from reconstructed past samples. This step requires the synthesis of the past speech samples locally (analysis by synthesis) such that the residual error is fed back into the system.

d) Quantize the error signal using a code book generated from a representative set of speakers and environments. A minimum mean squared error match is determined in 5 ms segments. In addition, the code book is designed to provide a quantization error with spectral rolloff (higher quantization error for low frequencies and lower quantization error for higher frequencies). Thus, the quantization noise spectrum in the reconstructed signal will always tend to be smaller than the underlying speech signal.

e) At the transmitter and the receiver, reconstruct the speech from the quantized error signal fed into the inverse of the function in step c above. Use this signal for analysis by synthesis and for the output to the reconstruction stage below.

f) Use a de-emphasis filter to reconstruct the output.

The major advantages of this approach over other low-bit-rate algorithms are that there is no need for any Complicated calculation of reflection coefficients (no matrix inverse or lattice filter computations). Also, the quantization noise in the output speech is hidden under the speech signal and there are no pitch tracking artifacts: the speech sounds "natural", with only minor increases of background hiss at lower bit-rates. The computational load is reduced significantly compared to a VSELP algorithm and variations of the same algorithm provide bit rates of 8, 9.2 and 16 Kbit/s. The total delay through the analysis section is less than 20 milliseconds in the preferred embodiment. The present algorithm is accomplished completely in the waveform domain and there is no spectral information being computed and there is no filter computations needed.

Detailed Description of the Speech Compression Algorithm

The speech compression algorithm is described in greater detail with reference to FIGS. 11 through 13, and with reference to the block diagram of the hardware components of the present system shown at FIG. 3. Also, reference is made to the detailed schematic diagrams in FIGS. 9A–9C. The voice compression algorithm operates within the programmed control of the voice control DSP circuit 306. In operation, the speech or analog voice signal is received through the telephone interface 301, 302 or 303 and is digitized by the digital telephone CODEC circuit 305. The CODEC for circuit 305 is a companding μ-law CODEC. The analog voice signal from the telephone interface is band-limited to about 3,500 Hz and sampled at 8 kHz by digital telephone CODEC 305. Each sample is encoded into 8-bit PCM data producing a serial 64 kb/s signal. The digitized samples are passed to the voice control DSP/CODEC of circuit 306. There, the 8-bit μ-law PCM data is converted to 13-bit linear PCM data. The 13-bit representation is necessary to accurately represent the linear version of the logarithmic 8-bit μ-law PCM data. With linear PCM data, simpler mathematics may be performed on the PCM data.

The voice control DSP/CODEC of circuit 306 correspond to the single integrated circuit U8 shown in FIGS. 9A and 9B as a WE® DSP16C Digital Signal Processor/CODEC from AT&T Microelectronics which is a combined digital signal processor and a linear CODEC in a single chip as described above. The digital telephone CODEC of circuit 305 corresponds to integrated circuit U12 shown in FIG. 9(b) as a T7540 companding μ-law CODEC.

The sampled and digitized PCM voice signals from the telephone μ-law CODEC U12 shown in FIG. 9B are passed to the voice control DSP/CODEC U8 via direct data lines clocked and synchronized to an 8 KHz clocking frequency. The digital samples are loaded into the voice control DSP/ CODEC U8 one at a time through: the serial input and stored into an internal queue held in RAM and converted to linear PCM data. As the samples are loaded into the end of the queue in the RAM of the voice control DSP U8, the samples at the head of the queue are operated upon by the voice compression algorithm. The voice compression algorithm then produces a greatly compressed representation of the speech signals in a digital packet form. The compressed speech signal packets are then passed to the dual port RAM circuit 308 shown in FIG. 3 for use by the main controller circuit 313 for either transferring in the voice-over-data mode of operation or for transfer to the personal computer for storage as compressed voice for functions such as telephone answering machine message data, for use in the multi-media documents and the like.

In the voice-over-data mode of operation, voice control DSP/CODEC circuit 306 of FIG. 3 will be receiving digital voice PCM data from the digital telephone CODEC circuit 305, compressing it and transferring it to dual port RAM circuit 308 for multiplexing and transfer over the telephone line. This is the transmit mode of operation of the voice control DSP/CODEC circuit 306 corresponding to transmitter block 1100 of FIG. 11 and corresponding to the compression algorithm of FIG. 12.

Concurrent with this transmit operation, the voice control DSP/CODEC circuit 306 is receiving compressed voice data packets from dual port RAM circuit 308, uncompressing the voice data and transferring the uncompressed and reconstructed digital PCM voice data to the digital telephone CODEC 305 for digital to analog conversion and eventual transfer to the user through the telephone interface 301, 302, 304. This is the receive mode of operation of the voice control DSP/CODEC circuit 306 corresponding to receiver block 1200 of FIG. 11 and corresponding to the decompression algorithm of FIG. 13. Thus the voice-control DSP/ CODEC circuit 306 is processing the voice data in both directions in a full-duplex fashion.

The voice control DSP/CODEC circuit 306 operates at a clock frequency of approximately 24.576 MHz while processing data at sampling rates of approximately 8 KHz in both directions. The voice compression/decompression algorithms and packetization of the voice data is accomplished in a quick and efficient fashion to ensure that all processing is done in real-time without loss of voice information. This is accomplished in an efficient manner such that enough machine cycles remain in the voice control DSP circuit 306 during real time speech compression to allow real time acoustic and line echo cancellation in the same fixed-point DSP.

In programmed operation, the availability of an eight-bit sample of PCM voice data from the μ-law digital telephone CODEC circuit 305 causes an interrupt in the voice control DSP/CODEC circuit 306 where the sample is loaded into internal registers for processing. Once loaded into an internal register it is transferred to a RAM address which holds a queue of samples. The queued PCM digital voice samples are converted from 8-bit μ-law data to a 13-bit linear data format using table lookup for the conversion. Those skilled in the art will readily recognize that the digital telephone CODEC circuit 305 could also be a linear CODEC.

Referring to FIG. 11, the digital samples are shown as speech entering the transmitter block 1100. The transmitter block, of course, is the mode of operation of the voice-control DSP/CODEC circuit 306 operating to receive local digitized voice information, compress it and packetize it for transfer to the main controller circuit 313 for transmission on the telephone line. The telephone line connected to telephone line interface 309 of FIG. 3 corresponds to the channel 1111 of FIG. 11.

A frame rate for the voice compression algorithm is 20 milliseconds of speech for each compression. This correlates to 160 samples to process per frame. When 160 samples are accumulated in the queue of the internal DSP RAM, the compression of that sample frame is begun.

The voice-control DSP/CODEC circuit 306 is programmed to first remove the DC component 1101 of the incoming speech. The DC removal is an adaptive function to establish a center base line on the voice signal by digitally adjusting the values of the PCM data. The formula for removal of the DC bias or drift is as follows:

$$S(n) = x(n) - x(n-1) + \alpha * S(n-1) \text{ where } \alpha = \frac{32735}{32768}$$

The removal of the DC is for the 20 millisecond frame of voice which amounts to 160 samples. The selection of $\alpha$ is based on empirical observation to provide the best result.

Figure 12:
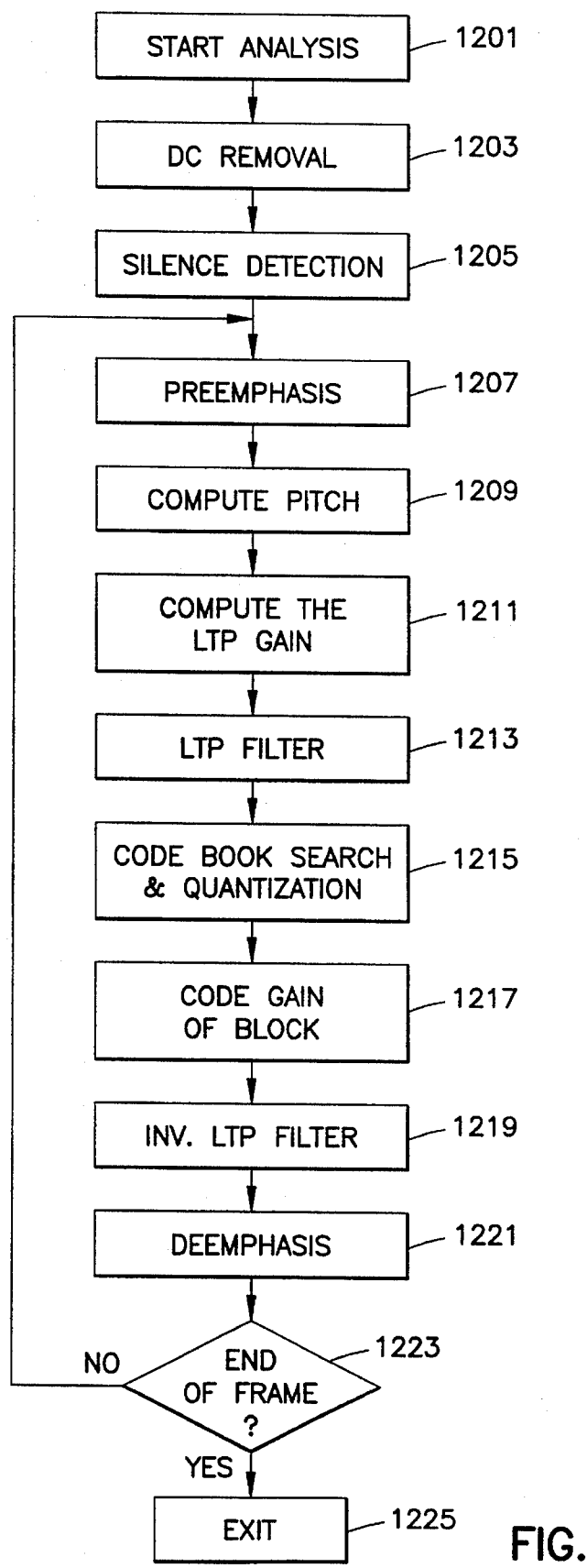
FIG. 12 is a detailed function flow diagram of the speech compression algorithm.

Referring to FIG. 12, the voice compression algorithm in a control flow diagram is shown which will assist in the understanding of the block diagram of FIG. 11. The analysis and compression begin at block 1201 where the 13-bit linear PCM speech samples are accummulated until 160 samples representing 20 milliseconds of voice or one frame of voice is passed to the DC removal portion of code operating within the programmed voice control DSP/CODEC circuit 306. The DC removal portion of the code described above approximates the base line of the frame of voice by using an adaptive DC removal technique.

A silence detection algorithm 1205 is also included in the programmed code of the DSP/CODEC 306. The silence detection function is a summation of the square of each sample of the voice signal over the frame. If the power of the voice frame falls below a preselected threshold, this would indicate a silent free. The detection of a silence frame of speech is important for later multiplexing of the V-data and C-data described below. During silent portions of the speech, the main controller circuit 313 will transfer conventional digital data (C-data) over the telephone line in lieu of voice data (V-data). The formula for computing the power is $$PWR = \sum_{n=0}^{160-1} S(n) * S(n)$$

If the power PWR is lower than a preselected threshold, then the present voice frame is flagged as containing silence (See Table 15). The 160-sample silent frame is still processed by the voice compression algorithm; however, the silent frame packets are discarded by the main controller circuit 313 so that digital data may be transferred in lieu of voice data.

The rest of the voice compression is operated upon in segments where there are four segments per frame amounting to 40 samples of data per segment. It is only the DC removal and silence detection which is accomplished over an entire 20 millisecond frame. The pre-emphasis 1207 of the voice compression algorithm shown in FIG. 12 is the next step. The formula for the pre-emphasis is $$S(n)=S(n)-\tau*S(n-1) \text{ where } \tau=0.55$$

Each segment thus amounts to five milliseconds of voice which is equal to 40 samples. Pre-emphasis then is done on each segment. The selection of is $\tau$ based on empirical observation to provide the best result.

The pre-emphasis essentially flattens the signal by reducing the dynamic range of the signal. By using pre-emphasis to flatten the dynamic range of the signal, less of a signal range is required for compression making the compression algorithm operate more efficiently.

The next step in the speech compression algorithm is the long-term predictor (LTP). The long-term prediction is a method to detect the innovation in the voice signal. Since the voice signal contains many redundant voice segments, we can detect these redundancies and only send information about the changes in the signal from one segment to the next. This is accomplished by comparing the linear PCM data of the current segment on a sample by sample basis to the reconstructed linear PCM data from the previous segments to obtain the innovation information and an indicator of the error in the prediction.

The first step in the long term prediction is to predict the pitch of the voice segment and the second step is to predict the gain of the patch. For each segment of 40 samples, a long-term correlation lag PITCH and associated LTP gain factor $\beta_j$ (where J=0, 1, 2, 3 corresponding to each of the four segments of the frame) are determined at 1209 and 1211, respectively. The computations are done as follows.

From MINIMUM PITCH (40) to MAXIMUM PITCH (120) for indices 40 through 120 (the pitch values for the range of previous speech viewed), the voice control DSP circuit 306 computes the cross correlation between the current speech segment and the previous speech segment by comparing the samples of the current speech segment against the reconstructed speech samples of the previous speech segment using the following formula:

$$Sxy(j) = \sum_{i=0}^{39} S(n_k + i) * S'(n_k + i - j)$$

where

J=40, ... 120

S=current sample of current segment

S'=past sample of reconstructed previous segment $n_k$=0, 40, 80, 120 (the subframe index)

and where the best fit is $$Sxy=MAX\{Sxy(j)\} \text{ where } j=40, \ldots 120.$$

The value of j for which the peak occurs is the PITCH. This is a 7 bit value for the current segment calculated at 1209. The value of j is an indicator of the delay or lag at which the cross correlation matches the best between the past reconstructed segment and the current segment. This indicates the pitch of the voice in the current frame. The maximum computed value of j is used to reduce the redundancy of the new segment compared to the previous reconstructed segments in the present algorithm since the value of j is a measure of how close the current segment is to the previous reconstructed segments.

Next, the voice control DSP circuit 306 computes the LTP gain factor β at 1211 using the following formula in which Sxy is the current segment and Sxx is the previous reconstructed segment:

$$\beta_{segment} = \frac{Sxy(j)}{Sxx(j)}$$

where $$Sxx = \sum_{i=0}^{39} S'^2(i + \text{MAX\_PITCH} - \text{best\_pitch})$$

The value of the LTP gain factor β is a normalized quantity between zero and unity for this segment where β is an indicator of the correlation between the segments. For example, a perfect sine wave would produce a β which would be close to unity since the correlation between the current segments and the previous reconstructed segments should be almost a perfect match so the LTP gain factor is one.

The LTP gain factor is quantized from a LTP Gain Table. This table is characterized in Table 14.

TABLE 14

LTP Gain Quantization

```
      0.1    0.3    0.5    0.7    0.9
<──┼──┼──┼──┼──┼──>
  β=0  β=1  β=2  β=3  β=4  β=5
```

The gain value of β is then selected from this table depending upon which zone or range $\beta_{segment}$ was found as depicted in Table 14. For example, if $\beta_{segment}$ is equal to 0.45, then β is selected to be 2. This technique quantizes the β into a 3-bit quantity.

Next, the LTP (Long Term Predictor) filter function 1213 is computed. The pitch value computed above is used to perform the long-term analysis filtering to create an error signal e(n). The normalized error signals will be transmitted to the other site as an indicator of the original signal on a per sample basis. The filter function for the current segment is as follows:

$$e(n) = S(n) - \beta * S'(n - \text{pitch})$$

where n=0, 1, ... 39

Next, the code book search and vector quantization function 1215 is performed. First, the voice control DSP circuit 306 computes the maximum sample value in the segment with the formula:

$$\text{GAIN} = \text{MAX } \{|e(n)|\}$$

where n=0, 1, ... 39

This gain different than the LTP gain. This gain is the maximum amplitude in the segment. This gain is quantized using the GAIN table described in the DSP Source Code attached in the microfiche appendix. Next, the voice control DSP circuit 306 normalizes the LTP filtered speech by the quantized GAIN value by using the maximum error signal |e(n)| (absolute value for e(n)) for the current segment and dividing this into every sample in the segment to normalize the samples across the entire segment. Thus the e(n) values are all normalized to have values between zero and one using the following:

$$e(n) = e(n)/\text{GAIN} \quad n=0 \ldots 39$$

Each segment of 40 samples is comprised of four subsegments 2 of 10 samples each. The voice control DSP circuit 306 quantities 10 samples of e(n) with an index into the code book. The code book consists of 256 entries (256 addresses) with each code book entry consisting of ten sample values. Every entry of 10 samples in the code book is compared to the 10 samples of each subsegment. Thus, for each subsegment, the code book address or index is chosen based on a best match between the 10-sample subsegment and the closest 10-sample code book entry. The index chosen has the least difference according to the following minimization formula:

$$\text{Min} \left\{ \sum_{i=0}^{10-1} (x_i - y_i)^2 \right\}$$

where $x_1$ = the input vector of 10 samples, and $y_1$ = the code book vector of 10 samples This comparison to find the best match between the subsegment and the code book entries is computationally intensive. A brute force comparison may exceed the available machine cycles if real time processing is to be accomplished. Thus, some shorthand processing approaches are taken to reduce the computations required to find the best fit. The above formula can be computed in a shorthand fashion by precomputing and storing some of the values of this equation. For example, by expanding out the above formula, some of the unnecessary terms may be removed and some fixed terms may be precomputed:

$$\begin{aligned} (x_i - y_i)^2 &= (x_i - y_i) * (x_i - y_i) \\ &= (x_i^2 - x_i y_i - x_i y_i + y_i^2) \\ &= (x_i^2 - 2 x_i y_i + y_i^2) \end{aligned}$$

where $x_i^2$ is a constant so it may be dropped from the formula, and where the value of ½ Σ $y_i^2$ may be precomputed and stored as the eleventh value in the code book so that the only real-time computation involved is the following formula:

$$\text{Min} \left\{ \sum_{i=0}^{10-1} (x_i y_i) \right\}$$

Thus, for a segment of 40 samples, we will transmit 4 code book indexes corresponding to 4 subsegments of 10 samples each. After the appropriate index into the code book is chosen, the LTP filtered speech samples are replaced with the code book samples. These samples are then multiplied by the quantized GAIN in block 1217.

Next, the inverse of the LTP filter function is computed at 1219:

$$e(n) = e(n) + \beta * S'(n - \text{pitch}) \quad n=0, \ldots, 39$$

$$S'(i) = S'(n) \quad n=40, \ldots 120; \quad i=0, \ldots (120-40)$$

$$S'(i) = e(i) \quad i=0, \ldots 40$$

Figure 13:
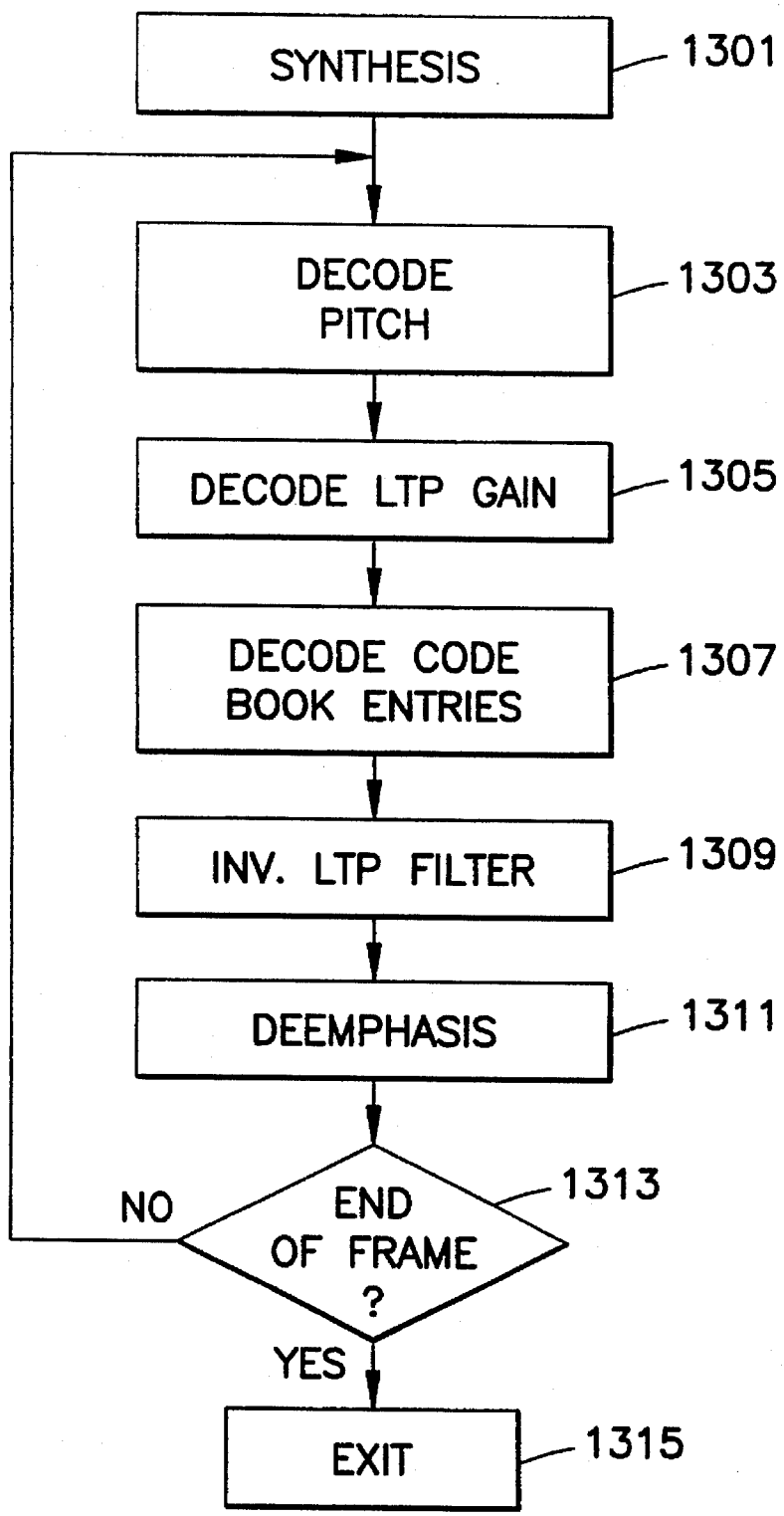
FIG. 13 is a detailed function flow diagram of the speech decompression algorithm.

The voice is reconstructed at the receiving end of the voice-over-data link according to the reverse of the compression algorithm as shown as the decompression algorithm in FIG. 13. The synthesis of FIG. 13 is also performed in the compression algorithm of FIG. 12 since the past segment must be synthesized to predict the gain and pitch of the current segment.

Echo Cancellation Algorithm

The use of the speaker 304 and the microphone 303 necessitates the use of an acoustical echo cancellation algorithm to prevent feedback from destroying the voice signals. In addition, a line echo cancellation algorithm is needed no matter which telephone interface 301, 302 or 303/304 is used. The echo cancellation algorithm used is an adaptive echo canceler which operates in any of the modes of operation of the present system whenever the telephone interface is operational. In particular the echo canceller is operational in a straight telephone connection and it is operational in the voice-over-data mode of operation.

In the case of a straight telephone voice connection between the telephone interface 301, 302, 303/304 and the telephone line interface 309 in communication with an analog telephone on the other end, the digitized PCM voice data from digital telephone CODEC 305 is transferred through the voice control DSP/CODEC circuit 306 where it is processed in the digital domain and converted back from a digital form to an analog form by the internal linear CODEC of voice-control DSP/CODEC circuit 306. Since digital telephone CODEC circuit 305 is a µ-law CODEC and the internal CODEC to the voice-control DSP/CODEC circuit 306 is a linear CODEC, a µ-law-to-linear conversion must be accomplished by the voice control DSP/CODEC circuit 306.

In addition, the sampling rate of digital telephone CODEC 305 is slightly less than the sampling rate of the linear CODEC of voice control DSP/CODEC circuit 306 so a slight sampling conversion must also be accomplished. The sampling rate of digital telephone µ-law CODEC 305 is 8000 samples per second and the sampling rate of the linear CODEC of voice control DSP/CODEC circuit 306 is 8192 samples per second.

Figure 14:
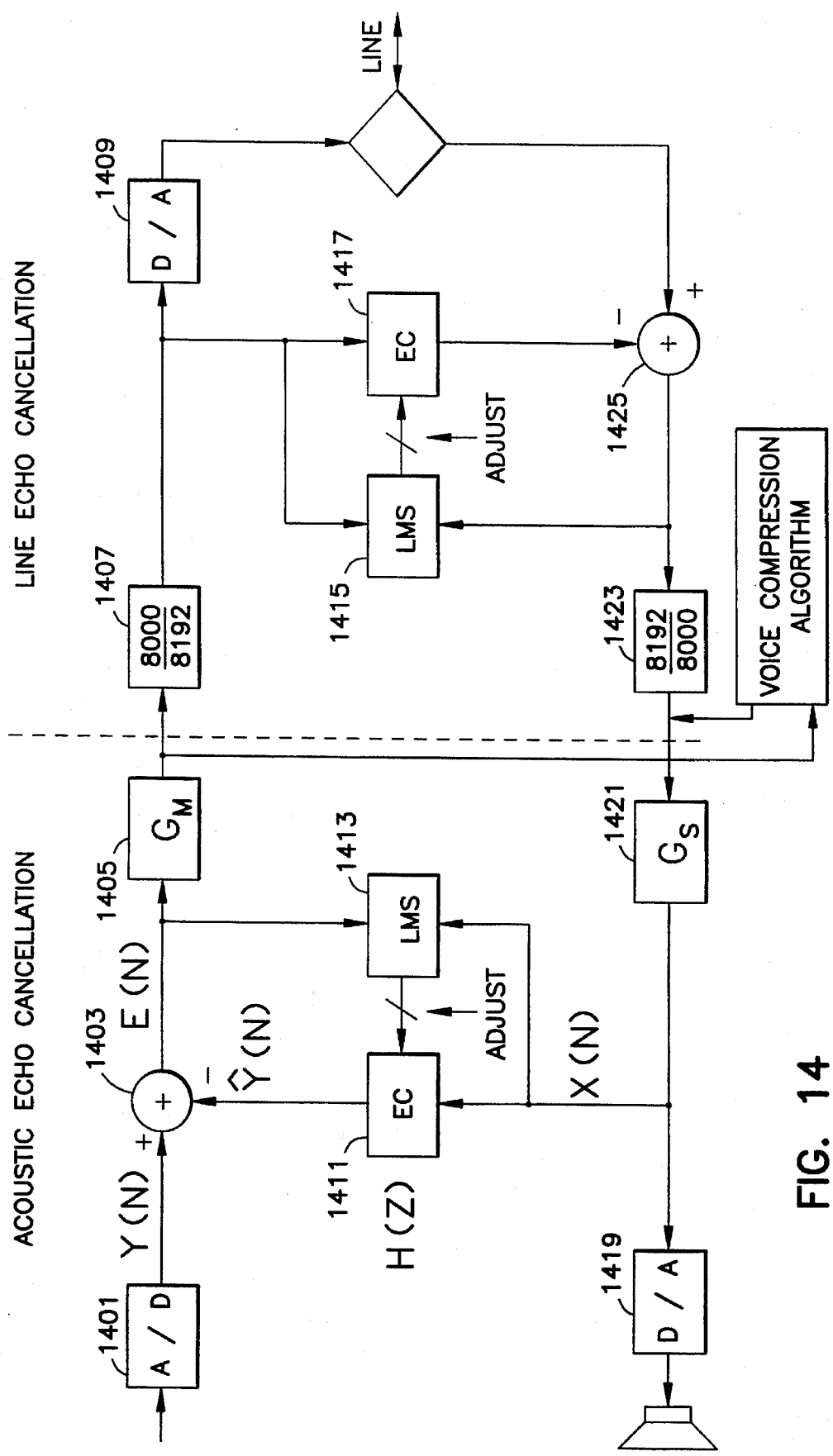
FIG. 14 is a detailed function flow diagram of the echo cancellation algorithm.

Referring to FIG. 14 in conjunction with FIG. 3, the speech or analog voice signal is received through the telephone interface 301, 302 or 303 and is digitized by the digital telephone CODEC circuit 305 in an analog to digital conversion 1401. The CODEC for circuit 305 is a companding µ-law CODEC. The analog voice signal from the telephone interface is band-limited to about 3,500 Hz and sampled at 8 kHz with each sample encoded into 8-bit PCM data producing a serial 64 kb/s signal. The digitized samples are passed to the voice control DSP of circuit 306 where they are immediately converted to 13-bit linear PCM samples.

Referring again to FIG. 14, the PCM digital voice data y(n) from telephone CODEC circuit 305 is passed to the voice control DSP/CODEC circuit 306 where the echo estimate signal ŷ(n) in the form of digital data is subtracted from it. The substration is done on each sample on a per sample basis.

Figure 49:
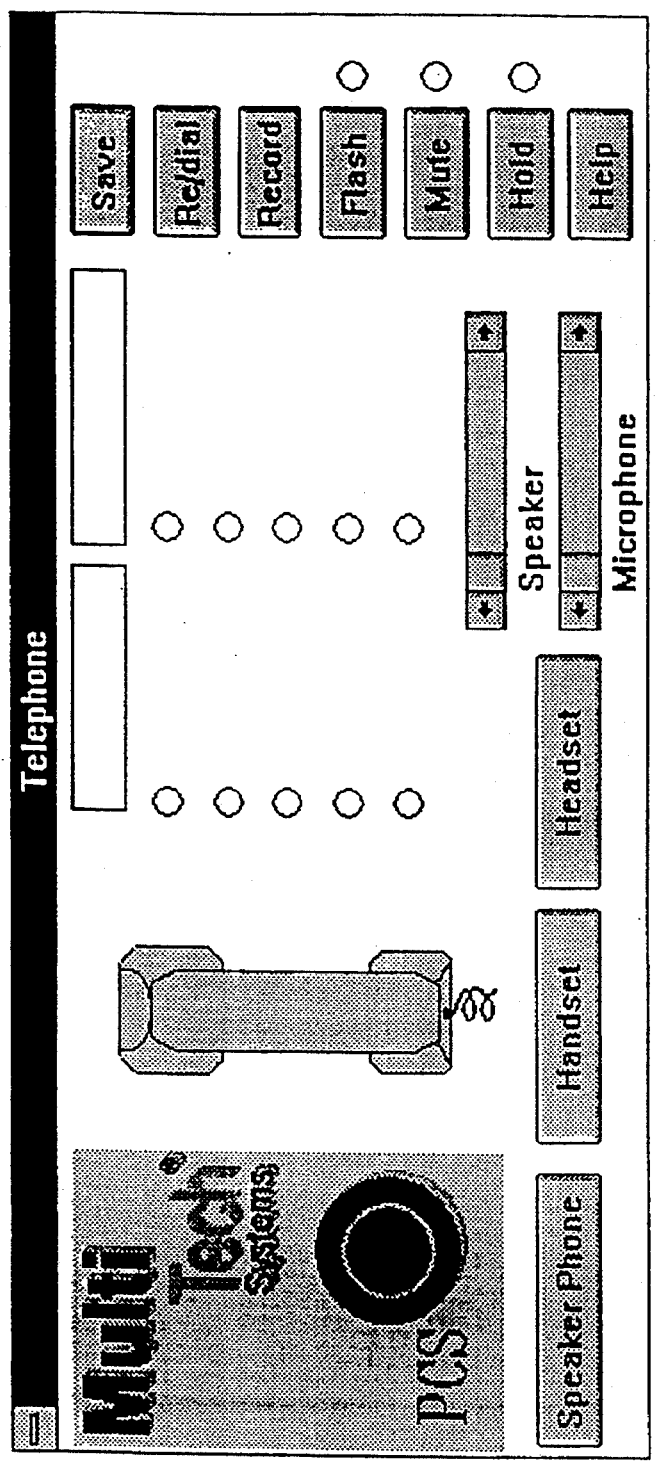
FIG. 49 is a telephone control screen display compatible with the present invention.

Blocks 1405 and 1421 are gain control blocks g. and $g_a$, respectfully. These digital gain controls are derived from tables for which the gain of the signal may be set to different levels depending upon the desired level for the voice signal. These gain levels can be set by the user through the level controls in the software as shown in FIG. 49. The gain on the digitized signal is set by multiplying a constant to each of the linear PCM samples.

In an alternate embodiment, the gain control blocks $g_m$ and $g_a$ may be controlled by sensing the level of the speaker's voice and adjusting the gain accordingly. This automatic gain control facilitates the operation of the silence detection described above to assist in the time allocation between multiplexed data and voice in the voice over data mode of operation.

In voice over data mode, the output of gain control block $g_m$ is placed in a buffer for the voice compression/decompression algorithm 1425 instead of sample rate converter 1407. The samples in this mode are accumulated, as described above, and compressed for multiplexing and transmission by the main controller 313. Also in voice over data mode, the gain control block 1421 receives decompressed samples from the voice compression/decompression algorithm 1425 instead of sample rate converter 1423 for output.

The echo canceler of FIG. 14 uses a least mean square (LMS) method of adaptive echo cancellation. The echo estimate signal subtracted from the incoming signal at 1403 is determined by function 1411. Function 1411 is a an FIR (finite impulse response) filter having in the preferred embodiment an impulse response which is approximately the length of delay though the acoustic path. The coefficients of the FIR filter are modeled and tailored after the acoustic echo path of the echo taking into account the specific physical attributes of the box that the speaker 304 and microphone 303 are located in and the proximity of the speaker 304 to the microphone 303. Thus, any signal placed on to the speaker is sent through the echo cancellation function 1411 to be subtracted from the signals received by the microphone 303 after an appropriate delay to match the delay in the acoustic path. The formula for echo replication of function box 1411 is:

$$\hat{y}(n) = \sum_{i=0}^{N-1} h_i x(n-i)$$

and the result of the subtraction of the echo cancellation signal y(n) from the microphone signal y(n) is $$e(n) = y(n) - \hat{y}(n).$$

The LMS coefficient function 1413 provides adaptive echo cancellation coefficients for the FIR filter of 1411. The signal is adjusted based on the following formula:

$$h_i(n+1) = h_i(n) + \frac{\beta * e(n)}{K + \sum_{j=0}^{N-1} x^2(n-j)} x(n-i)$$

where
i=0, . . . N−1
N=#of TAPS
n=Time Index
$\beta = 2^{-7}$
k=1000

The echo cancellation of functions 1415 and 1417 are identical to the functions of 1413 and 1411, respectively. The functions 1407 and 1423 of FIG. 14 are sample rate conversions as described above due to the different sampling rates of the digital telephone CODEC circuit 305 and the voice control CODEC of circuit 306.

Voice Over Data Packet Protocol

Figure 15:
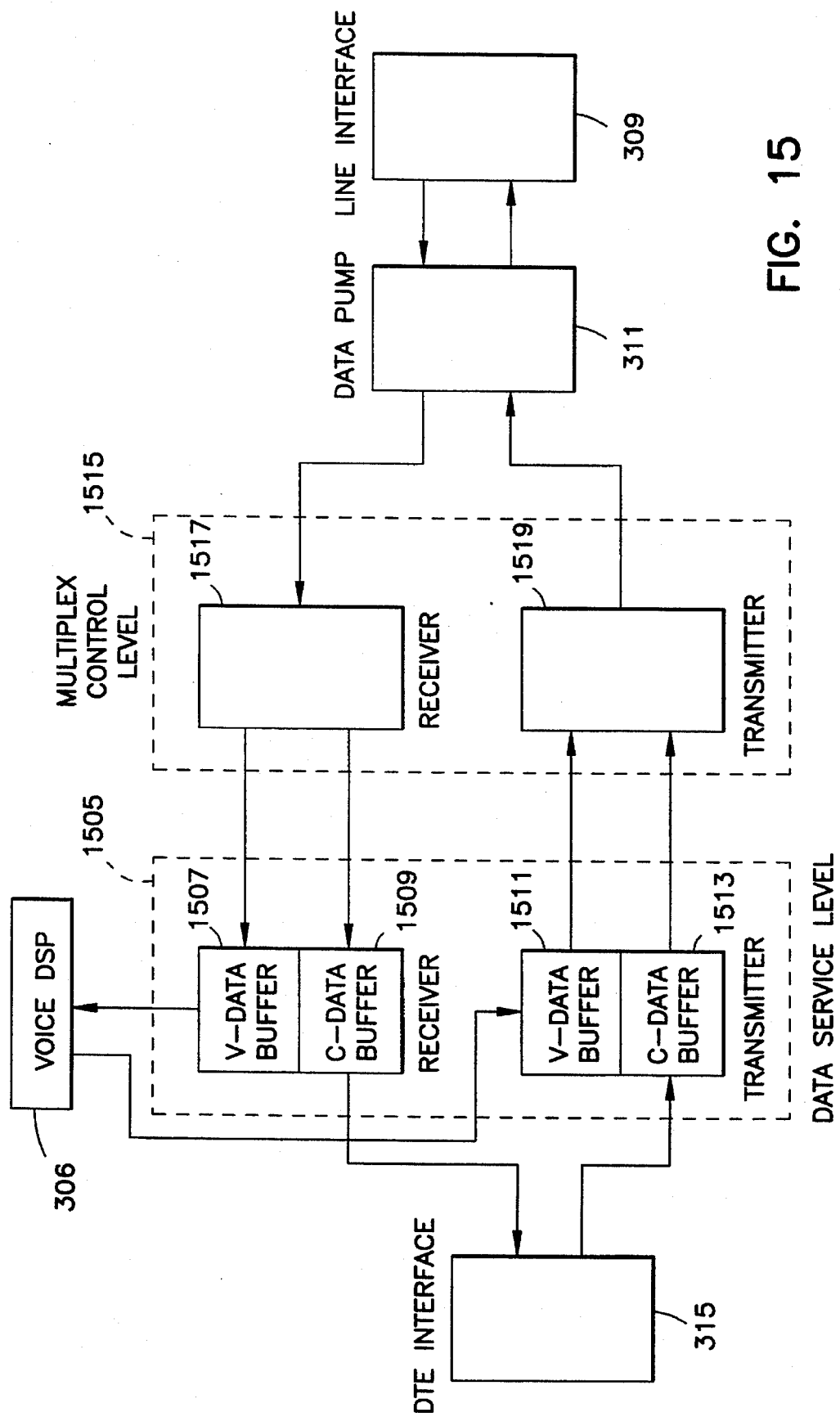
FIG. 15 is a detailed function flow diagram of the voice/data multiplexing function.

As described above, the present system can transmit voice data and conventional data concurrently by using time multiplex technology. The digitized voice data, called V-data carries the speech information. The conventional data is referred to as C-data. The V-data and C-data multiplex transmission is achieved in two modes at two levels: the transmit and receive modes and data service level and multiplex control level. This operation is shown diagrammatically in FIG. 15.

In transmit mode, the main controller circuit 313 of FIG. 3 operates in the data service level 1505 to collect and buffer data from both the personal computer 10 (through the RS232 port interface 315) and the voice control DSP 306. In multiplex control level 1515, the main controller circuit 313 multiplexes the data and transmits that data out over the phone line 1523. In the receive mode, the main controller circuit 313 operates in the multiplex control level 1515 to de-multiplex the V-data packets and the C-data packets and then operates in the data service level 1505 to deliver the appropriate data packets to the correct destination: the personal computer 10 for the C-data packets or the voice control DSP circuit 306 for V-data.

Transmit Mode

In transmit mode, there are two data buffers, the V-data buffer 1511 and the C-data buffer 1513, implemented in the main controller RAM 316 and maintained by main controller 313. When the voice control DSP circuit 306 engages voice operation, it will send a block of V-data every 20 ms to the main controller circuit 313 through dual port RAM circuit 308. Each V-data block has one sign byte as a header and 23 bytes of V-data, as described in Table 15 below.

TABLE 15

Compressed Voice Packet Structure

| 7 | 6 | 5 | 4 | 3 | 2 | 1 | 0 | byte |
|---|---|---|---|---|---|---|---|---|
| 0 | 0 | 0 | 0 | 0 | 0 | 0 | 0 | sign |
| | | | $P_0$ | | | | $\beta_0^0$ | 1 |
| | | | $P_1$ | | | | $\beta_0^1$ | 2 |
| | | | $P_2$ | | | | $\beta_0^2$ | 3 |
| | | | $P_3$ | | | | $\beta_1^0$ | 4 |
| $\beta_3$ | | $\beta_2$ | | $\beta_1^2$ | | $\beta_1^1$ | | 5 |
| $G_1$ | | | | $G_0$ | | | | 6 |
| $G_3$ | | | | $G_2$ | | | | 7 |
| $Vd_0$ | | | | | | | | 8 |
| $Vd_1$ | | | | | | | | 9 |
| . | | | | | | | | |
| . | | | | | | | | |
| $Vd_{15}$ | | | | | | | | 23 |

Where
$P_n$ = pitch (7 bits) where n = subframe number
$\beta_n^m$ = Beta (3 bits)
$G_n$ = Gain (4 bits)
Vd = Voice data (4 × 8 bits)
Effective Bit Rate = 184 bits/20 msec = 9200 bps The sign byte header is transferred every frame from the voice control DSP to the controller 313. The sign byte header contains the sign byte which identifies the contents of the voice packet. The sign byte is defined as follows:

00 hex=the following V-data contains silent sound 01 hex=the following V-data contains speech information If the main controller 313 is in transmit mode for V-data/C-data multiplexing, the main controller circuit 313 operates at the data service level to perform the following tests. When the voice control DSP circuit 306 starts to send the 23-byte V-data packet through the dual port RAM to the main controller circuit 313, the main controller will check the V-data buffer to see if the buffer has room for 23 bytes. If there is sufficient room in the V-data buffer, the main controller will check the sign byte in the header preceding the V-data packet. If the sign byte is equal to one (indicating voice information in the packet), the main controller circuit 313 will put the following 23 bytes of V-data into the V-data buffer and clear the silence counter to zero. Then the main controller 313 sets a flag to request that the V-data be sent by the main controller at the multiplex control level.

If the sign byte is equal to zero (indicating silence in the V-data packet), the main controller circuit 313 will increase the silence counter by 1 and check if the silence counter has reached 5. When the silence counter reaches 5, the main controller circuit 313 will not put the following 23 bytes of V-data into the V-data buffer and will stop increasing the silence counter. By this method, the main controller circuit 313 operating at the service level will only provide non-silence V-data to the multiplex control level, while discarding silence V-data packets and preventing the V-data buffer from being overwritten.

The operation of the main controller circuit 313 in the multiplex control level is to multiplex the V-data and C-data packets and transmit them through the same channel. At this control level, both types of data packets are transmitted by the HDLC protocol in which data is transmitted in synchronous mode and checked by CRC error checking. If a V-data packet is received at the remote end with a bad CRC, it is discarded since 100% accuracy of the voice channel is not ensured. If the V-data packets were re-sent in the event of corruption, the real-time quality of the voice transmission would be lost. In addition, the C-data is transmitted following a modem data communication protocol such as CCITT V.42.

In order to identify the V-data block to assist the main controller circuit 313 to multiplex the packets for transmission at his level, and to assist the remote site in recognizing and de-multiplexing the data packets, a V-data block is defined which includes a maximum of five V-data packets. The V-data block size and the maximum number of blocks are defined as follows:

The V-data block header=80h;

The V-data block size=23;

The maximum V-data block size=5;

The V-data block has higher priority to be transmitted than C-data to ensure the integrity of the real-time voice transmission. Therefore, the main controller circuit 313 will check the V-data buffer first to determine whether it will transmit V-data or C-data blocks. If V-data buffer has V-data of more than 69 bytes, a transmit block counter is set to 5 and the main controller circuit 313 starts to transmit V-data from the V-data buffer through the data pump circuit 311 onto the telephone line. Since the transmit block counter indicates 5 blocks of V-data will be transmitted in a continuous stream, the transmission will stop either at finish the 115 bytes of V-data or if the V-data buffer is empty. If V-data buffer has V-data with number more than 23 bytes, the transmit block counter is set 1 and starts transmit V-data. This means that the main controller circuit will only transmit one block of V-data. If the V-data buffer has V-data with less than 23 bytes, the main controller circuit services the transmission of C-data.

During the transmission of a C-data block, the V-data buffer condition is checked before transmitting the first C-data byte. If the V-data buffer contains more than one V-data packet, the current transmission of the C-data block will be terminated in order to handle the V-data.

Receive Mode

On the receiving end of the telephone line, the main controller circuit 313 operates at the multiplex control level to de-multiplex received data to V-data and C-data. The type of block can be identified by checking the first byte of the incoming data blocks. Before receiving a block of V-data, the main controller circuit 313 will initialize a receive V-data byte counter, a backup pointer and a temporary V-data buffer pointer. The value of the receiver V-data byte counter is 23, the value of the receive block counter is 0 and the backup pointer is set to the same value as the V-data receive buffer pointer. If the received byte is not equal to 80 hex (80h indicating a V-data packet), the receive operation will follow the current modem protocol since the data block must contain C-data. If the received byte is equal to 80h, the main controller circuit 313 operating in receive mode will process the V-data. For a V-data block received, when a byte of V-data is received, the byte of V-data is put into the V-data receive buffer, the temporary buffer pointer is increased by I and the receive V-data counter is decreased by 1. If the V-data counter is down to zero, the value of the temporary V-data buffer pointer is copied into the backup pointer buffer. The value of the total V-data counter is added with 23 and the receive V-data counter is reset to 23. The value of the receive block counter is increased by 1. A flag to request service of V-data is then set. If the receive block counter has reached 5, the main controller circuit 313 will not put the incoming V-data into the V-data receive buffer but throw it away. If the total V-data counter has reached its maximum value, the receiver will not put the incoming V-data into the V-data receive buffer but throw it away.

At the end of the block which is indicated by receipt of the CRC check bytes, the main controller circuit 313 operating in the multiplex control level will not check the result of the CRC but instead will check the value of the receive V-data counter. If the value is zero, the check is finished, otherwise the value of the backup pointer is copied back into the current V-data buffer pointer. By this method, the receiver is insured to demultiplex the V-data from the receiving channel 23 bytes at a time. The main controller circuit 313 operating at the service level in the receive mode will monitor the flag of request service of V-data. If the flag is set, the main controller circuit 313 will get the V-data from the V-data buffer and transmit it to the voice control DSP circuit 306 at a rate of 23 bytes at a time. After sending a block of V-data, it decreases 23 from the value in the total V-data counter.

User Interface Description

The hardware components of the present system are designed to be controlled by an external computing device such as a personal computer. As described above, the hardware components of the present system may be controlled through the use of special packets transferred over the serial line interface between the hardware components and the personal computer. Those skilled in the art will readily recognize that the hardware components of the present systems may be practiced independent of the software components of the present systems and that the preferred software description described below is not to be taken in a limiting sense.

The combination of the software components and hardware components described in the present patent application may conveniently be referred to as a Personal Communication System (PCS). The present system provides for the following functions:

1. The control and hands-off operation of a telephone with a built-in speaker and microphone.

2. Allowing the user to create outgoing voice mail messages with a voice editor, and logging incoming voice mail messages with a time and date stamp.

3. Creating queues for outgoing faxes including providing the ability for a user to send faxes from unaware applications through a print command; also allowing the user the user to receive faxes and logging incoming faxes with a time and date step.

4. Allowing a user to create multi-media messages with the message composer. The message can contain text, graphics, picture, and sound segments. A queue is created for the outgoing multi-media messages, and any incoming multi-media messages are logged with a time and date stamp.

5. Providing a way for-a user to have a simultaneous data and voice connection over a single communication line.

6. Providing terminal emulation by invoking an external terminal emulation program.

7. Providing address book data bases for all outbound calls and queues for the telephone, voice mail, fax manager, multi-media mail and show-and-tell functions. A user may also search through the data base using a dynamic pruning algorithm keyed on order insensitive matches.

Figure 16:
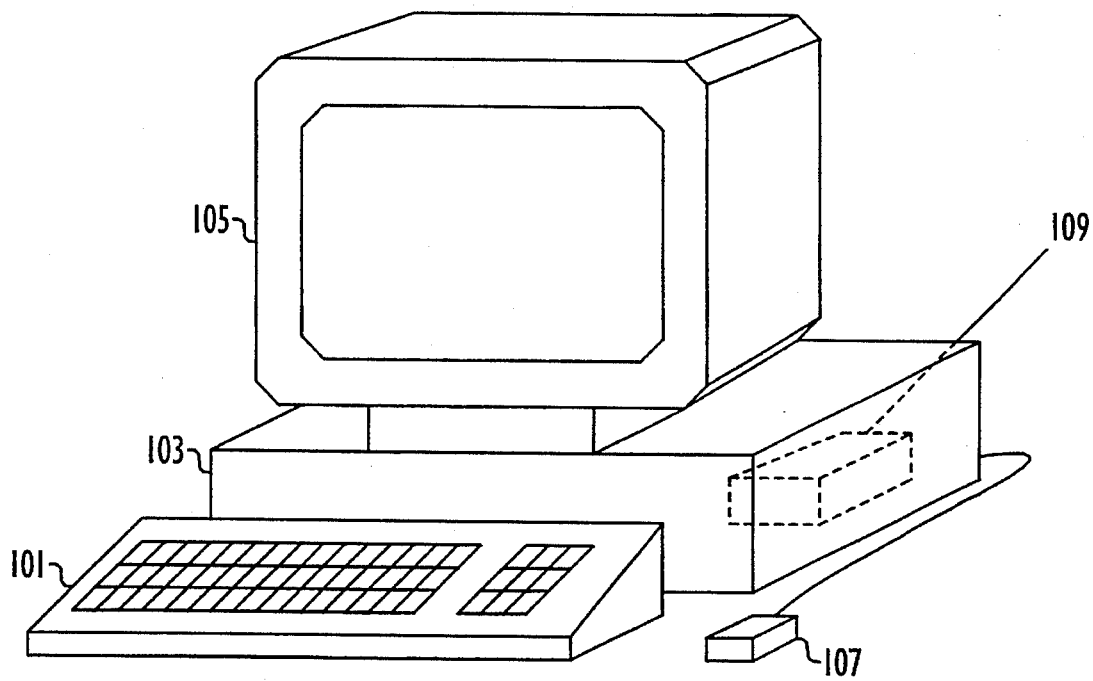
FIG. 16 is a perspective view of the components of a digital computer compatible with the present invention.

FIG. 16 shows the components of a computer system that may be used with the PCS. The computer includes a keyboard 101 by which a user may input data into a system, a computer chassis 103 which holds electrical components and peripherals, a screen display 105 by which information is displayed to the user, and a pointing device 107, typically a mouse, with the system components logically connected to each other via internal system bus within the computer. The PCS software runs on a central processing unit 109 within the computer.

Figure 17:
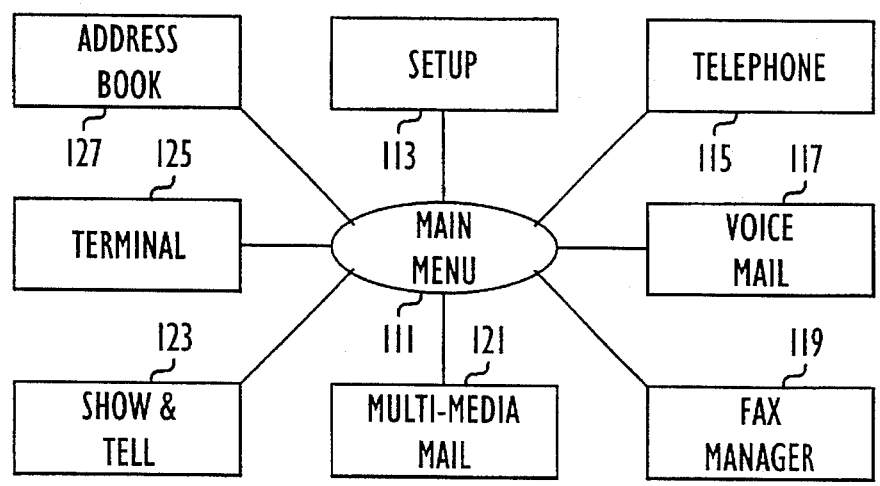
FIG. 17 is a block diagram of the software structure compatible with the present invention.

FIG. 17 reveals the high-level structure of the PCS software. A main menu function 111 is used to select the following subfunctions: setup 113, telephone 115, voice mail 117, fax manager 119, multi-media mail 121, show & tell 123, terminal 125, and address book 127.

The preferred embodiment of the present system currently runs under Microsoft Windows® software running on an IBM® personal computer or compatible. However, it will be recognized that other implementations of the present inventions are possible on other computer systems and windowing software without loss of scope or generality.

Figure 18:
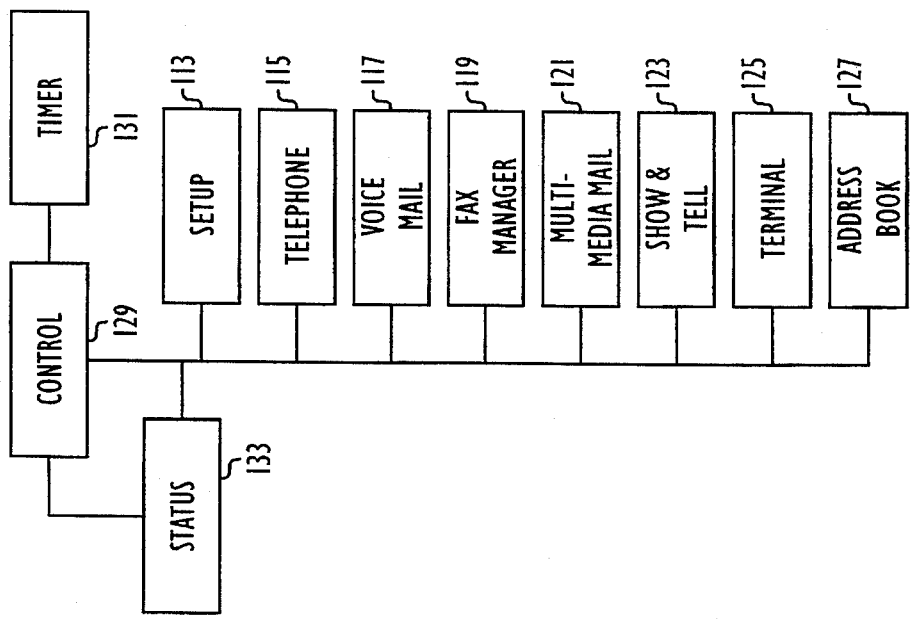
FIG. 18 is a block diagram of the control structure of software compatible with the present invention.

FIG. 18 describes the control structure of the main menu 111 in greater detail. A timer 131 sends a timing signal to a control block 129 in order to make the control block 129 active substantially once every 10 seconds. It will be recognized that other timing intervals may be used as appropriate to the windowing system being used without loss of generality. A status 133 is used to preclude other applications or program blocks from taking control of a communications port by indicating that the port is currently being used by the PCS. The controller 129 looks at all outbound queues in voice mail 117, fax manager 119, and multi-media mail 121, and if there is an outgoing message in one of the outbound queues, initiates a dispatch. A signal is then sent to the status box in order to preclude other applications or program blocks from using the serial communications port.

The control block 129 also monitors incoming calls and invokes the appropriate program block, either voice mail 117, fax manager 119, multi-media mail 121, or show & tell 123, in order to further process the incoming call. Additionally, the control block 129 is used to invoke telephone functions 115, terminal emulation functions 125, and allow users to edit the data base of addresses with the address book function 127. The control block 129 further provides for the initialization of PCS parameters via the setup function 113. The main menu, as it is displayed to the user, is shown in FIG. 2.

Figure 19:
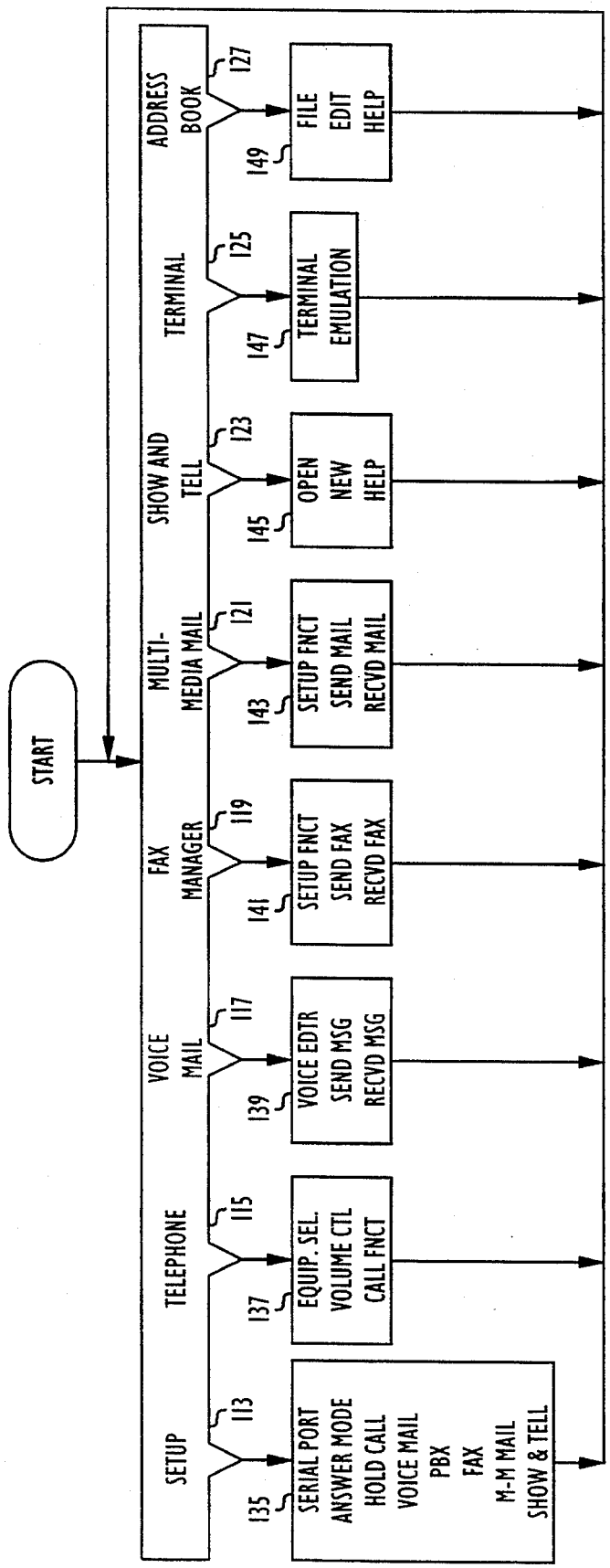
FIG. 19 is a block diagram of the main menu structure of software compatible with the present invention.

FIG. 19 illustrates the structure of control block 129. Upon selecting the setup function 113, the user has access to initialization functions 135 which include serial port, answer mode, hold call, voice mail, PBX, fax, multi-media mail, and show & tell initializations. Upon selecting telephone 115, the user has access to telephone functions 137 which include equipment select, volume control, and call functions as shown in the screen display of FIG. 49. Upon selecting voice mail 117, voice mail functions 139 are provided which include a voice editor, voice messages to be sent, and voice messages received as shown in the screen display of FIG. 50. Upon selecting fax manager 119, fax manager functions 141 are provided which include setup functions, faxes to be sent, and faxes to be received as shown in the screen display of FIG. 52. If multi-media mail 121 is selected, multi-media mail functions 143 are provided which include the setup function, multi-media messages to be sent, and multi-media messages received function as illustrated by the screen display shown in FIG. 53. If show & tell 123 is selected, show & tell functions 145 are provided to the user which include open, select new, and help as illustrated in the screen display of FIG. 54. If the terminal function 125 is selected by the user, the terminal emulation function 147 is provided to the user via a terminal emulation block. If address book 127 is selected, address book functions 149 are provided to the user which include file functions, edit functions, and help functions as shown in the screen display of FIG. 55.

Figure 20:
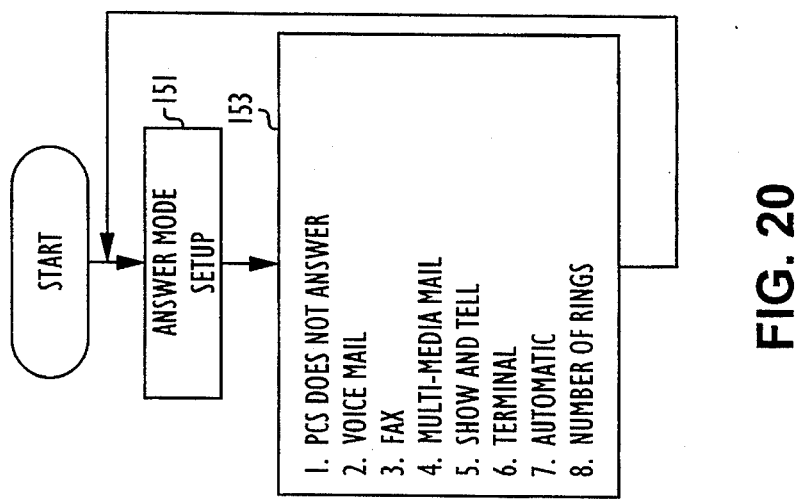
FIG. 20 is a flow diagram of answer mode software compatible with the present invention.

The setup functions 135 are accessed by an initialization menu as shown in the screen display of FIG. 40. The PCS software provides support for any communications port that is contained within the personal computer. FIG. 41 shows the screen display shown to a user to enable a user to select a specific communications port to be used by the PCS software. A user may also specify what action is to be taken by the PCS software when an incoming call arrives. The screen display of FIG. 42 is shown to the user while FIG. 20 describes the full control of the answer mode setup initialization procedure. Upon selecting answer mode setup 151, the user is presented with eight answer mode choices 153 and described as follows:

1. PCS does not answer. The PCS software does not answer an incoming call and the telephone equipment acts as normal.

2. Voice mail. The PCS software answers the incoming call and acts as an answering machine to record messages.

3. Fax. The PCS software answers the incoming calls and acts as a fax machine.

4. Multi-media mail. The PCS software answers the incoming call and receives multi-media mail that is being sent by a remote caller.

5. Show & tell. The PCS software enables simultaneous data and voice communication using the same communication line.

6. Terminal. The PCS provides terminal emulation through a terminal emulation block, or optionally transfers control to a third party terminal emulation program.

7. Automatic. The incoming call is analyzed and the appropriate mode is automatically entered.

The user may additionally enter a numeric value which represents the number of rings to wait before the PCS software answers an incoming call.

Figure 44:
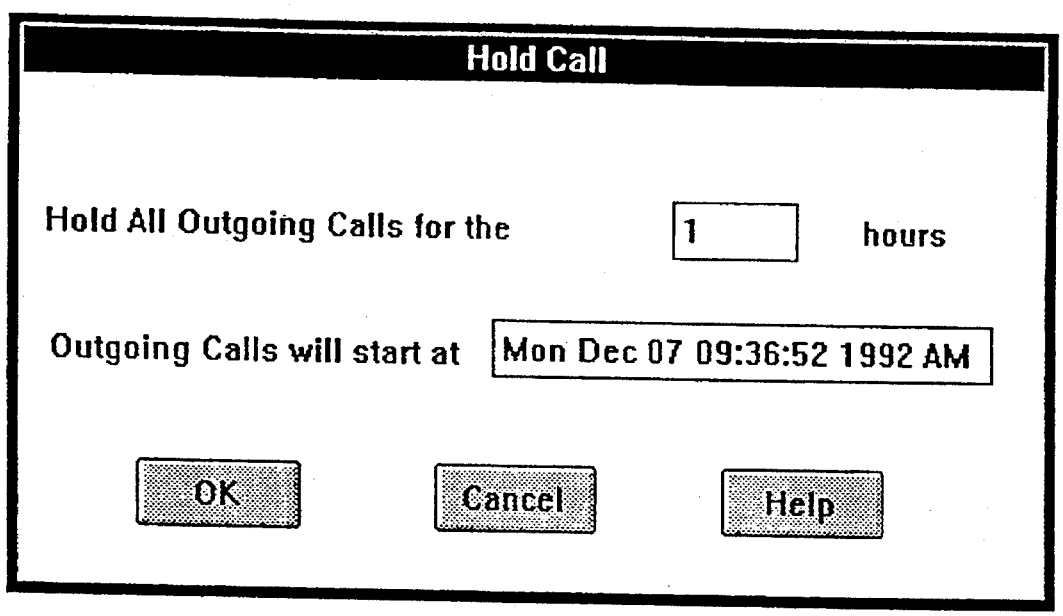
FIG. 44 is a voice mail setup screen display compatible with the present invention.
Figure 43:
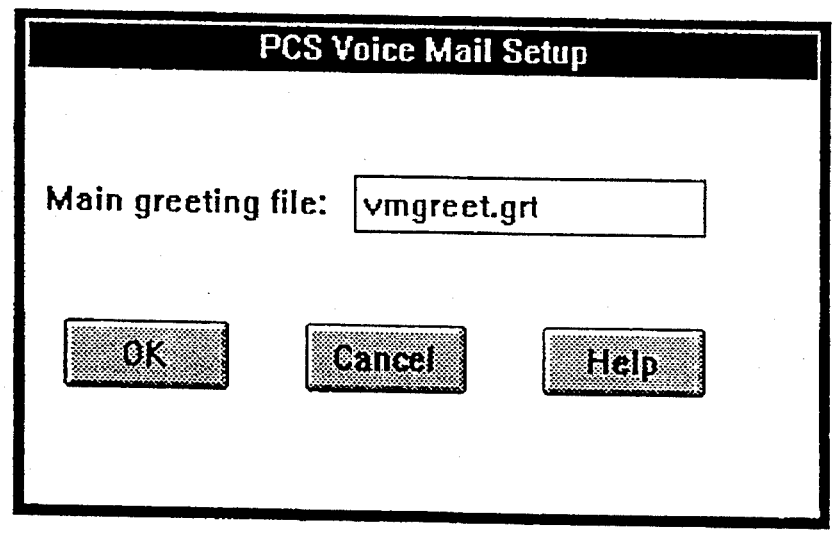
FIG. 43 is a hold call setup screen display compatible with the present invention.
Figure 45:
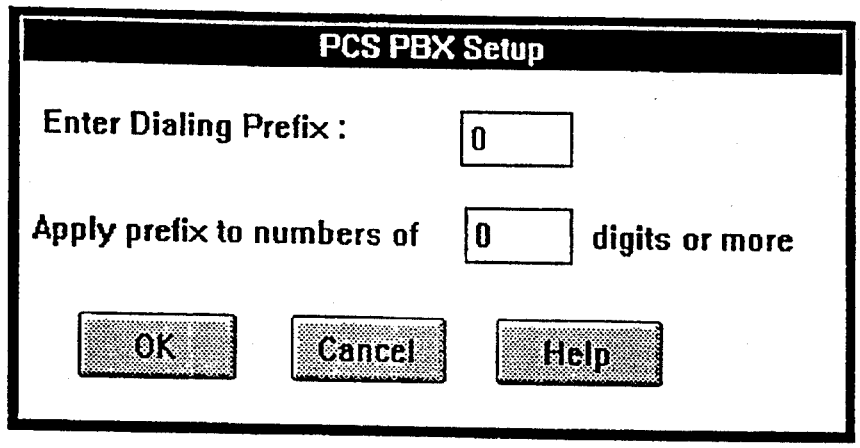
FIG. 45 is a PBX setup screen display compatible with the present invention.
Figure 46:
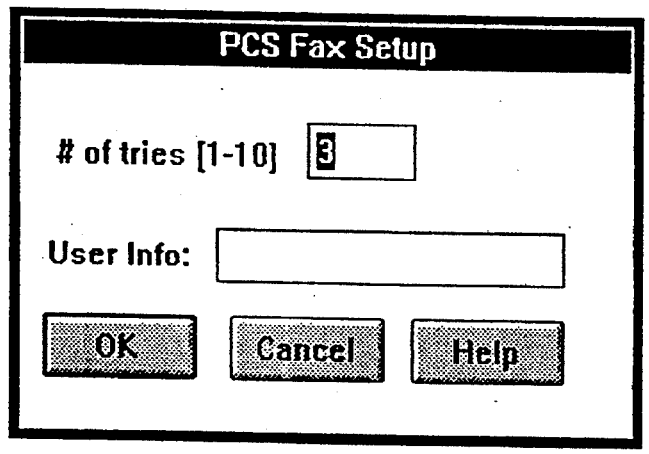
FIG. 46 is a fax setup screen display compatible with the present invention.
Figure 47:
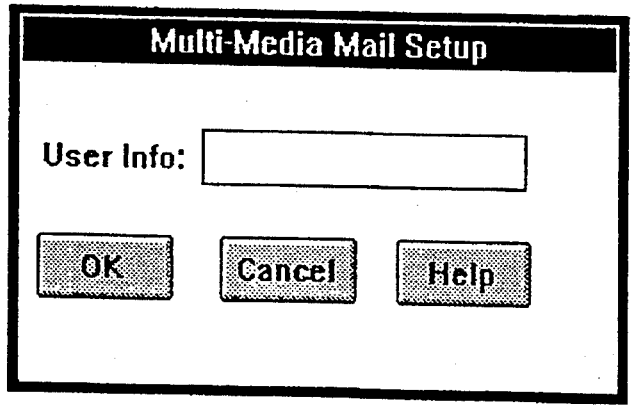
FIG. 47 is a multi-media mail setup screen display compatible with the present invention.
Figure 48:
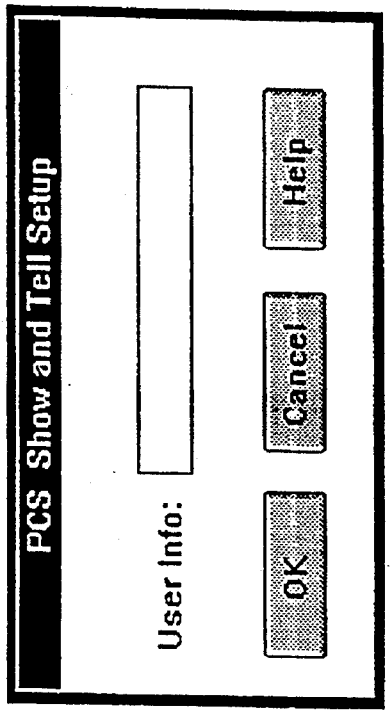
FIG. 48 is a show and tell setup screen display compatible with the present invention.

If from the setup functions 135 the hold call function is selected, the hold call display as illustrated in FIG. 43 is shown to the user, who may then enter a numeric value to specify the number of hours all outgoing calls are to be held. If at setup functions 135 the voice mail setup option is selected, the screen display as illustrated in FIG. 44 is displayed to the user who may then enter a file name to be used as a greeting file for all incoming calls. If at setup functions 135 the PBX setup function is selected, the screen display of FIG. 45 is shown to the user who may then enter a dialing prefix to be applied to any outgoing telephone number. This provides for an easy way to use a list of telephone numbers with an in-house PBX system without making modification to the telephone number list. If at setup functions 135 the fax setup function is selected, the screen display of FIG. 46 is displayed to the user who may then enter a numeric value which represents the number of times to attempt to send a fax before timing out. If at setup functions 135 the multi-media mail setup function is selected, the display of FIG. 47 is shown to the user who may then enter the name of a file to be used for user information. If at setup functions 135 the show & tell function is selected, the screen display of FIG. 48 is shown to the user who may then enter show & tell user information.

Figure 21:
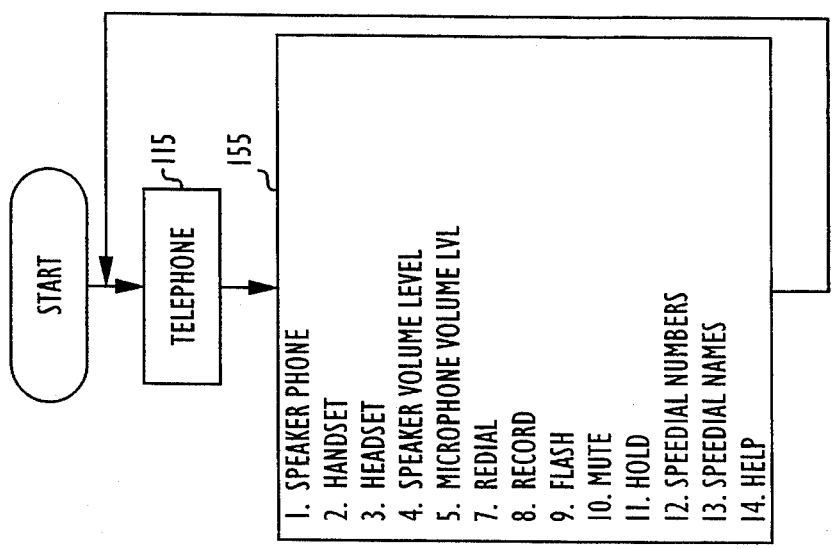
FIG. 21 is a flow diagram of telephone software compatible with the present invention.

FIG. 49 shows the telephone control function display as shown to the user. FIG. 21 further illustrates the steps and options 155 available when the telephone control function 115 is selected. The user may use the mouse to select between a speaker phone, a handset, or a headset to be used with the communications device, and may adjust the volume of the speaker with a first logical slider switch, and the gain of the microphone with a second logical slider switch, both slider switches being displayed on the screen. During a call, the user may select to save a telephone number, redial a telephone number, record a call, flash between calls, mute a call, or place a call on hold.

Figures 22, 23, 24:
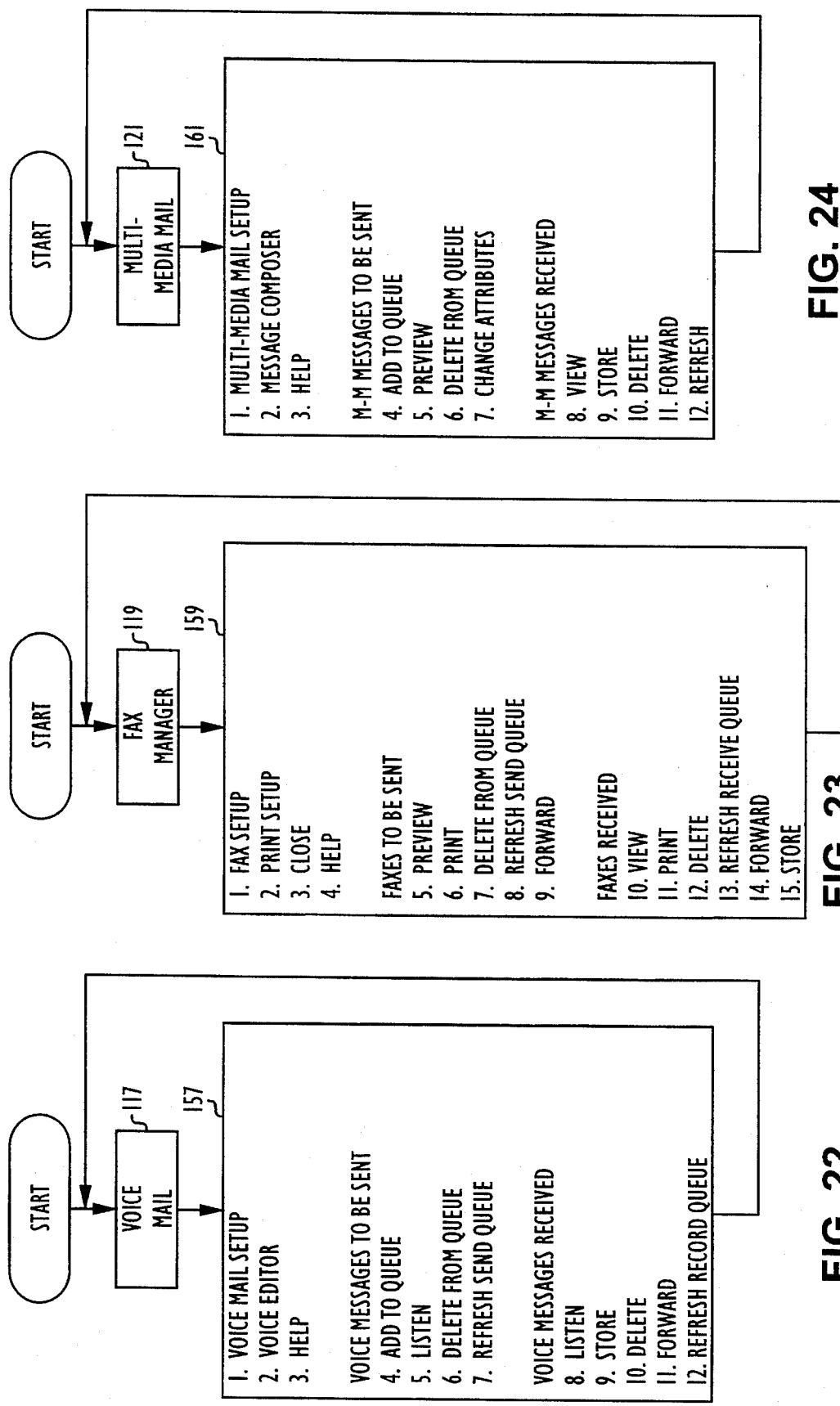
FIG. 22 is a flow diagram of voice mail software compatible with the present invention.
FIG. 23 is a flow diagram of fax manager software compatible with the present invention.
FIG. 24 is a flow diagram of multi-media mail software compatible with the present invention.
Figure 50:
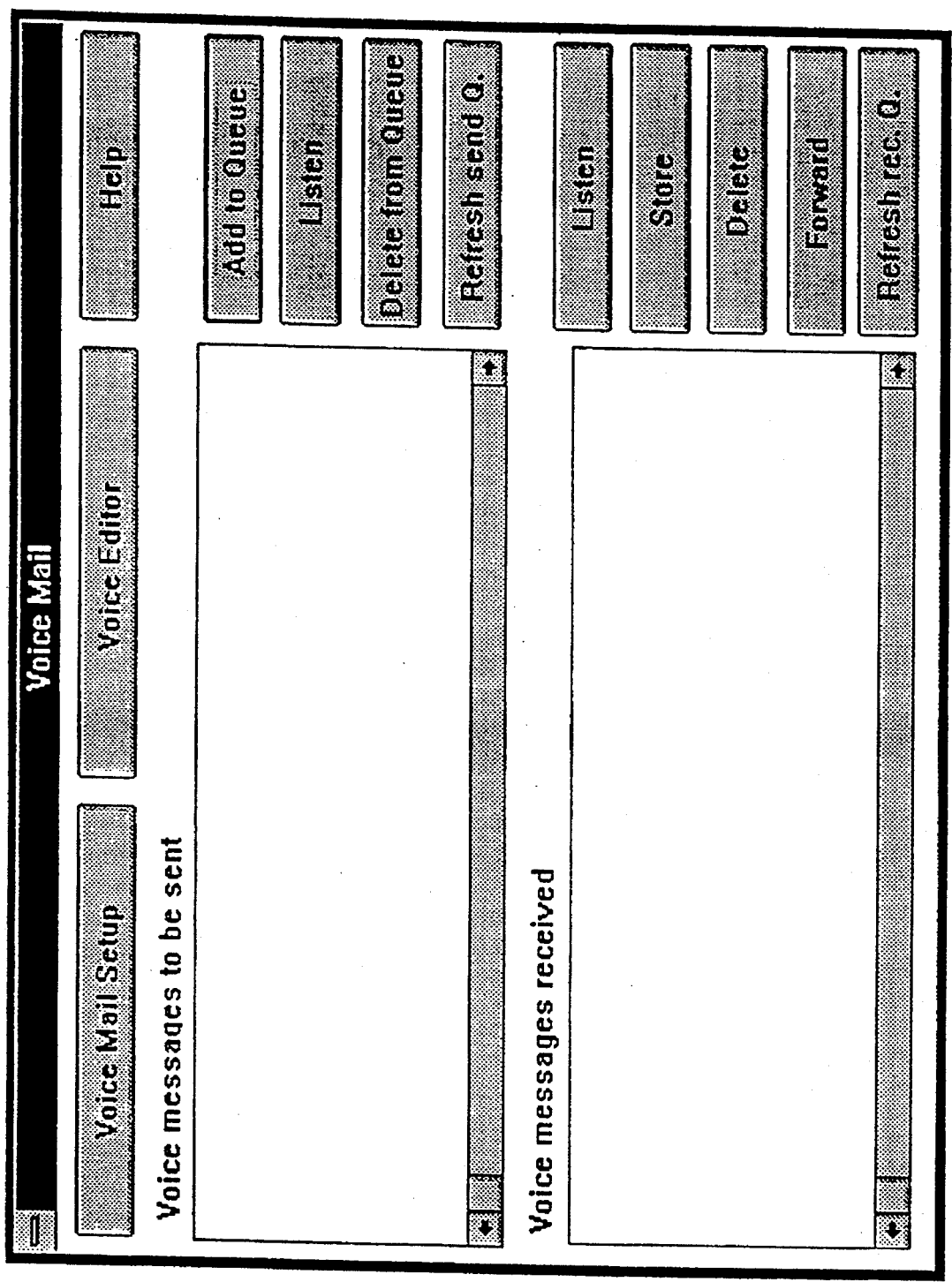
FIG. 50 is a voice mail control screen display compatible with the present invention.
Figure 51:
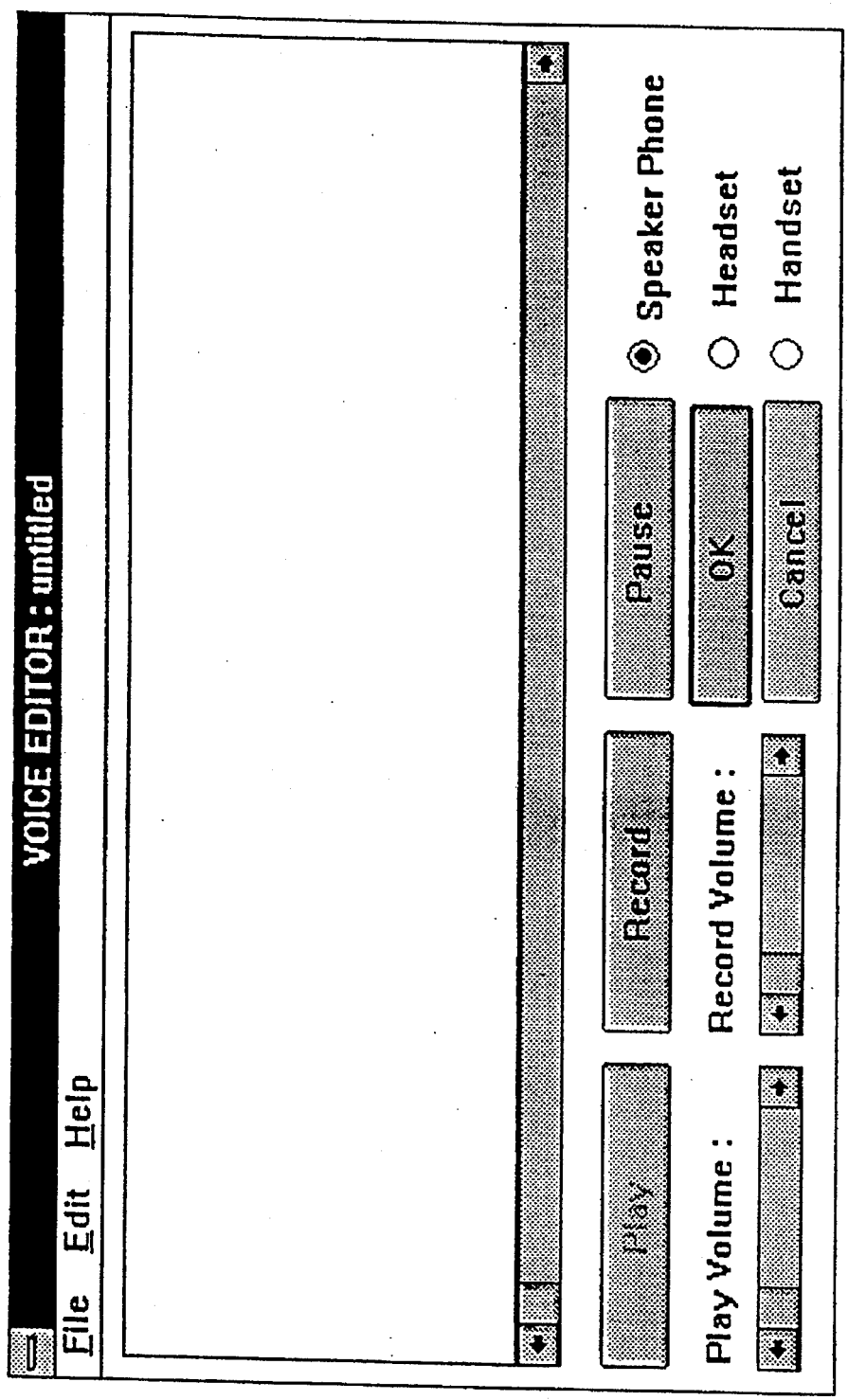
FIG. 51 is a voice editor screen display compatible with the present invention.

FIG. 22 shows the voice mail functions 157 that are available upon selecting voice mail 117. A user may set up a voice mail greeting file or may edit a voice mail message by selecting the voice mail editor as shown in FIG. 50. The PCS software provides for two voice mail queues: the first for voice mail messages to be sent and the second for voice mail messages received. In the send queue a user may add messages to the queue, listen to messages in the queue, delete messages from the queue, or refresh the send queue display. With the receive queue a user may listen to messages in the queue, store messages in the queue, delete messages from the queue, forward messages from the queue to another voice mail user, or refresh the queue. The voice mail editor as shown to the user in FIG. 51 allows the user to select file functions to open or save a Voice mail message, edit functions for editing a voice mail message, playing, recording, and pausing a voice mail message, and adjusting the play volume and the record volume. The user may also optionally select between a speaker phone, headset, and handset.

Figure 52:
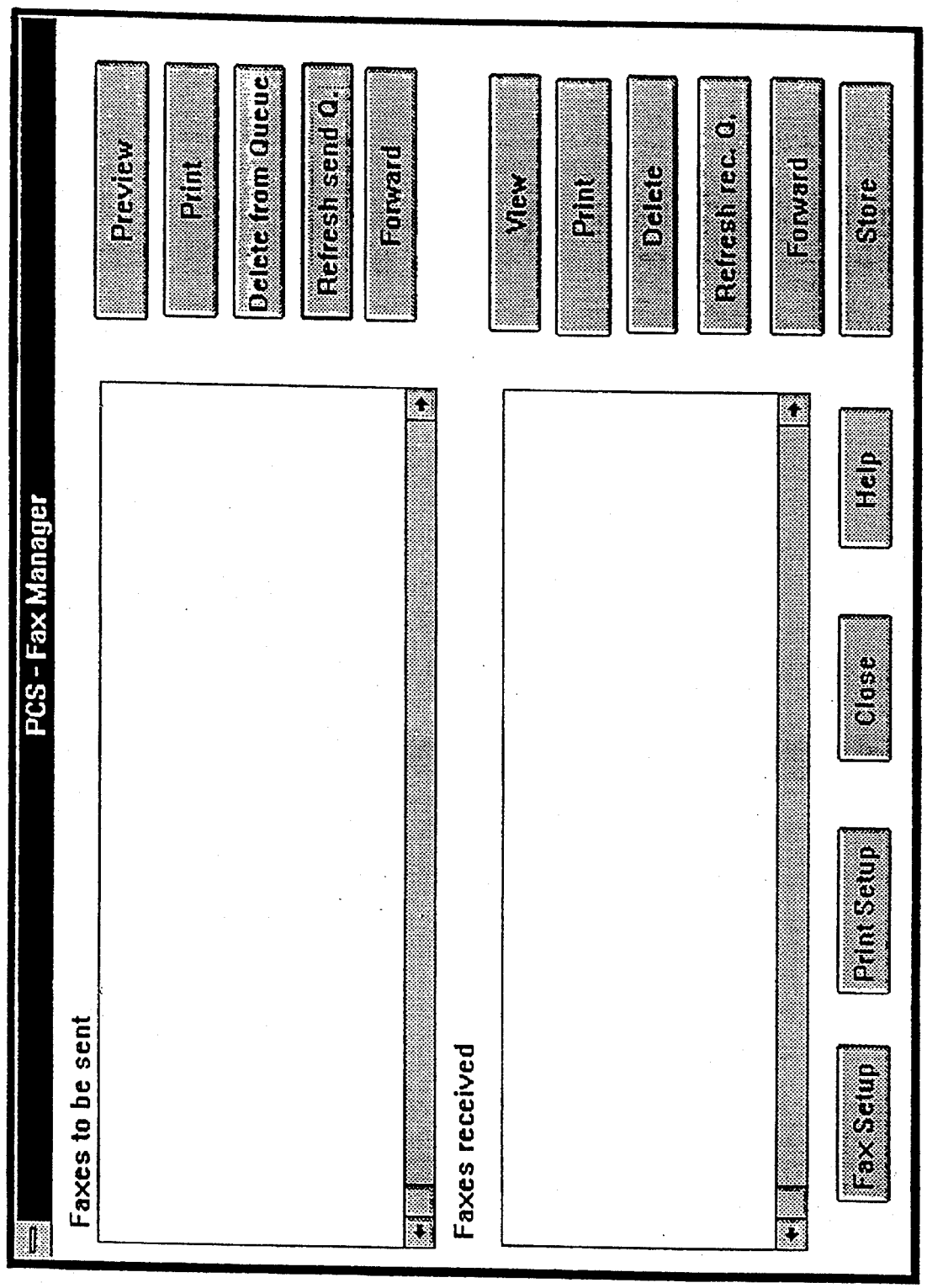
FIG. 52 is a fax manager control screen display compatible with the present invention.

FIG. 52 illustrates the fax manager display as shown to the user. FIG. 23 illustrates the fax manager functions 159 that are available to a user after selecting the fax manager function 119 from the main menu 111. The fax manager function provides for two queues: the first for faxes to be sent and the second for faxes that are received. When reviewing the first queue of faxes to be sent, the user may preview a fax, print a fax, delete a fax from the queue, refresh the send fax queue, or forward a fax to another user. When reviewing the second queue of received faxes, the user may view a fax, print a fax, delete a fax, refresh the received fax queue, forward a fax to another user, or store a fax.

Figure 53:
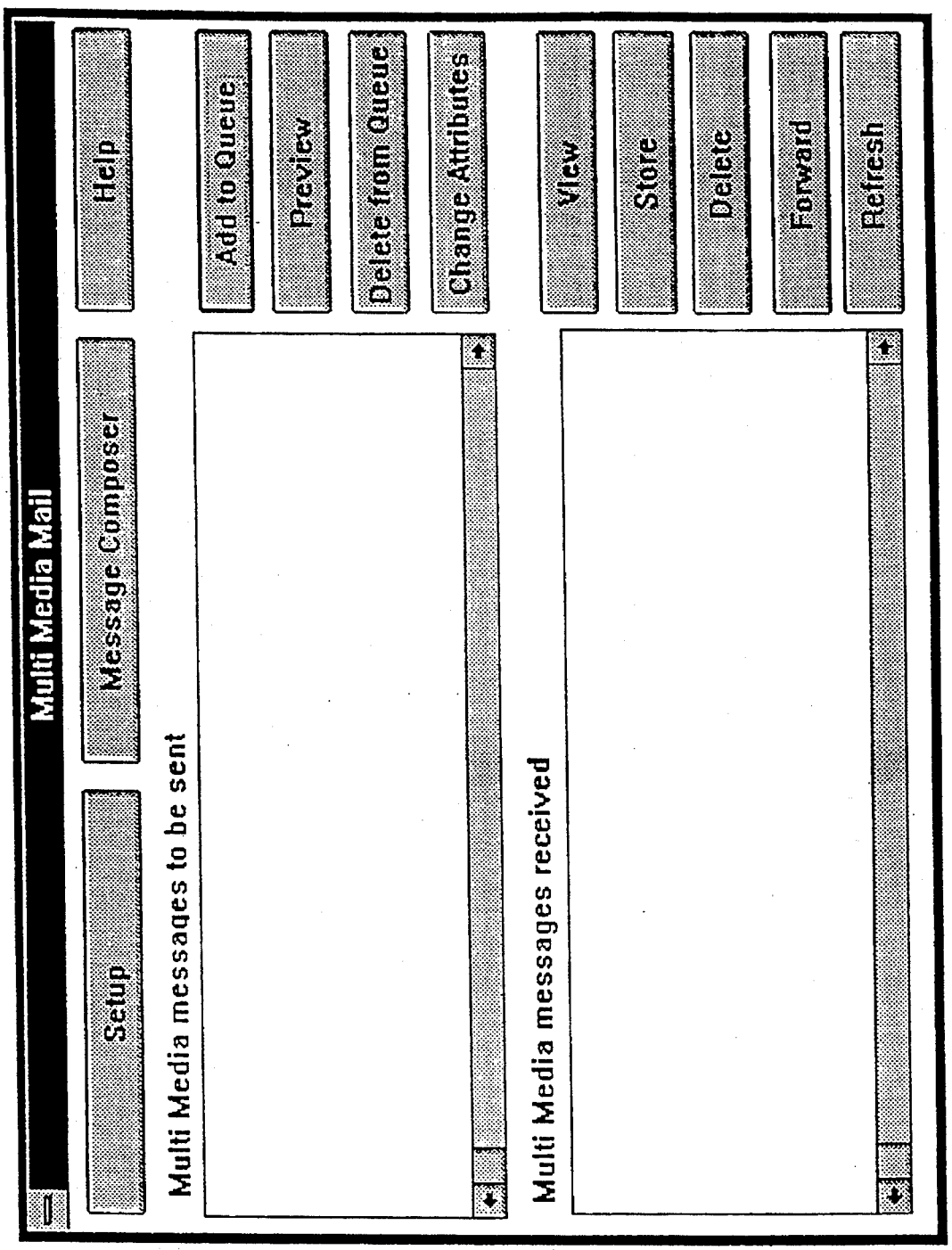
FIG. 53 is a multi-media mail control screen display compatible with the present invention.

FIG. 53 describes the multi-media mail display that is shown to the user. FIG. 24 describes the multi-media mail functions 161 that are available to a user upon selecting the multi-media mail function 121. Upon selecting multi-media mail the PCS software provides for setup, composing a message with the message composer, or allowing the user to view and edit multi-media messages in two queues: the first queue having multi-media messages to be sent and the second queue having multi-media messages that have been received. When reviewing the first queue of send messages, a user may add messages to the queue, preview messages in the queue, delete messages from the queue, or change attributes of messages in the queue. When a user is accessing the second queue of multi-media messages that have been received, the user may view messages, store messages, delete messages, forward messages to another user, or refresh the queue.

Figure 54:
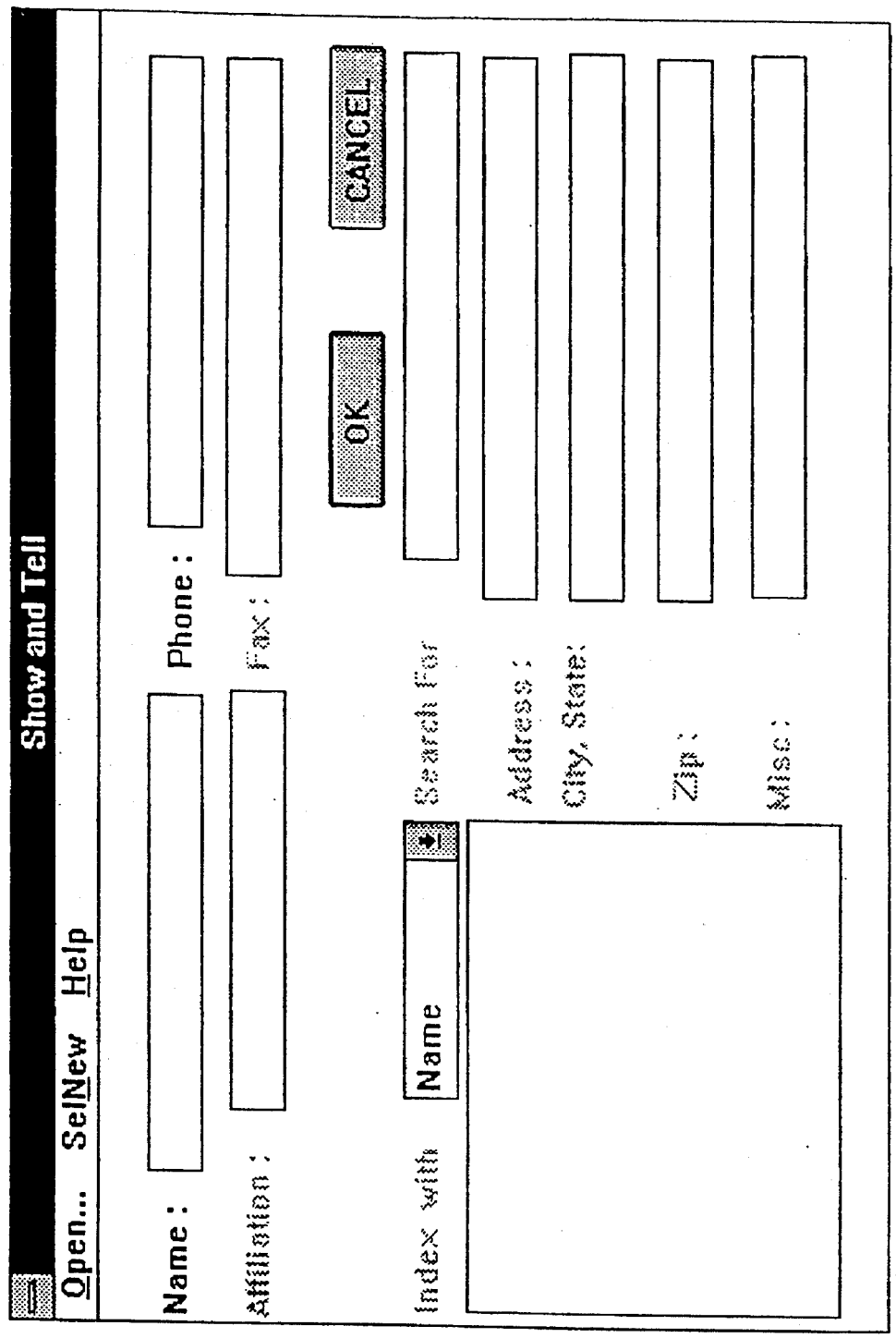
FIG. 54 is a show and tell control screen display compatible with the present invention.
Figure 55:
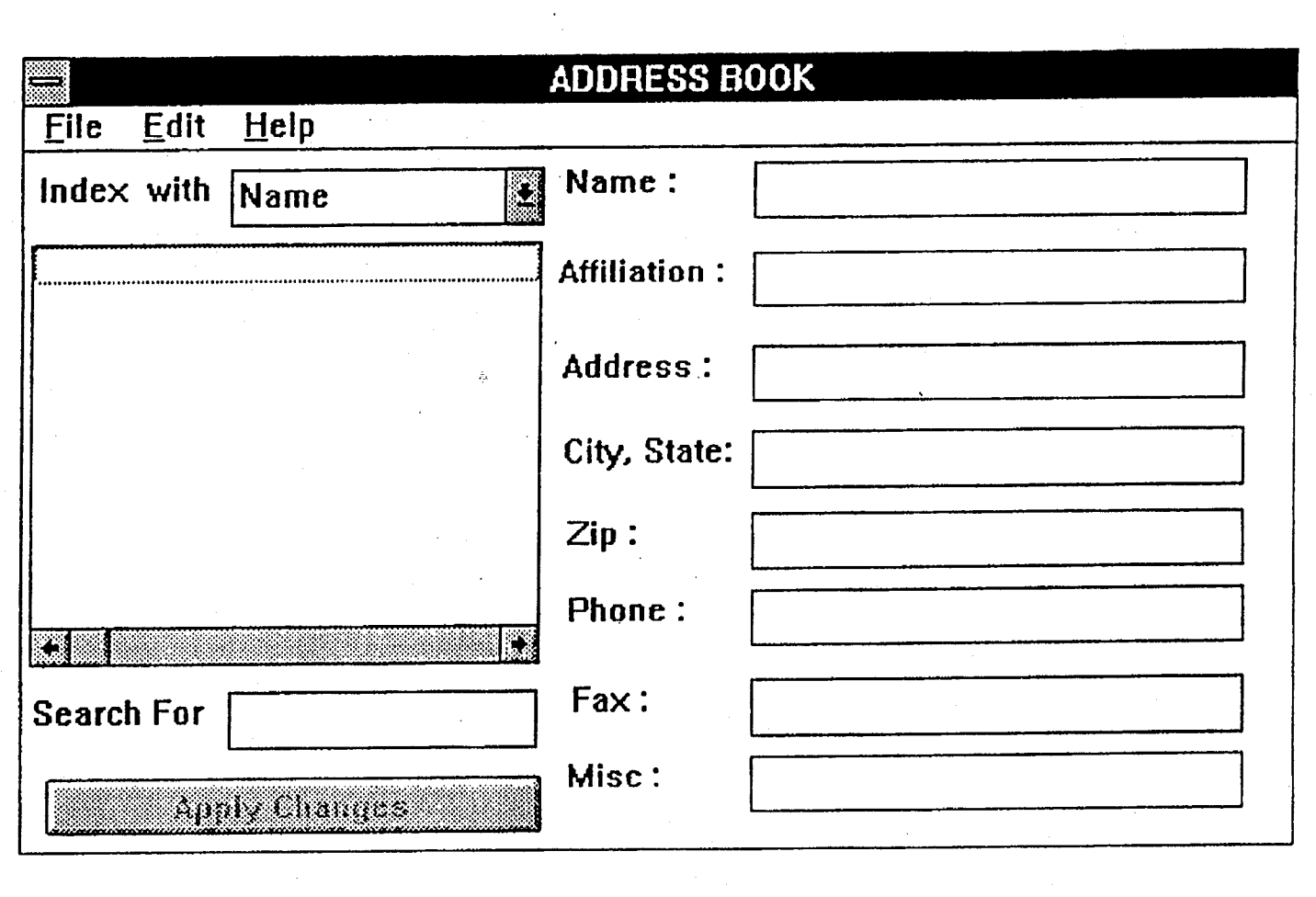

FIG. 54 illustrates the display shown to the user upon selecting the show & tell function 123 from the main menu 111. FIG. 55 illustrates the display that is shown to the user upon selecting the address book function 127 from the main menu 111. A user may open a previously stored address book file or may edit an existing address book file by adding, deleting, or changing entries that are in the file. Additionally, the PCS software provides for a user to search through the data base by using a dynamic pruning algorithm keyed on order insensitive matches. As the user enters a search string at a dialogue box, the list of matches displayed is automatically updated in real time to correspond to as much of the search string that has already been entered. The list continues to be updated until the search string has been completely entered.

Software Control Description

The preferred embodiment of the software control system of the present invention runs under Microsoft Windows software on an IBM PC or compatible. It will be recognized that other software implementations are available on other types of computers and windowing systems without loss of generality.

Figure 25:
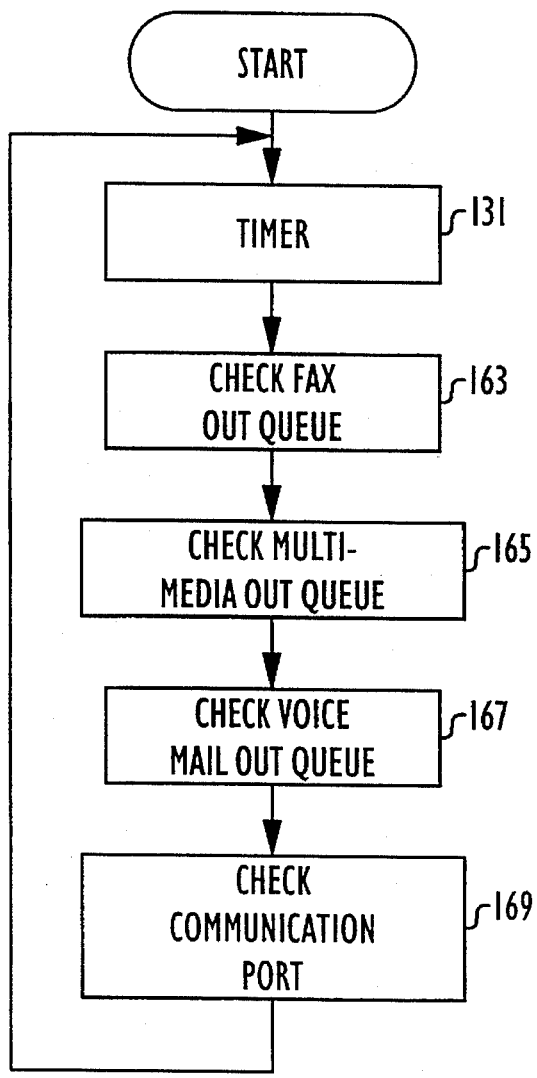
FIG. 25 is a flow diagram of a timing loop compatible with the present invention.

FIG. 25 shows the timing loop 131 of FIG. 18 in greater detail. In order to process pending actions, the timer 131 checks the fax out queue at 163, the multi-media out queue at 165, the voice mail out queue at 167, and the communication port at 169. The three output queues and the communication port are checked substantially once every 10 seconds to determine if there are any pending actions to be performed. If the timer does find a pending action in one of the queues, or if there is information coming in from the communication port, a secondary timer of duration 100 miliseconds is spawned in order to handle each pending action. This polling of the output queues continues as long as the main PCS software is active and running. The polling interval rate of substantially 10 seconds is short enough such that there is no significant time delay in handling any pending action in any of the output queues. It will be recognized that short timing intervals other than substantially 10 seconds may be used without loss of generality.

Figure 38:
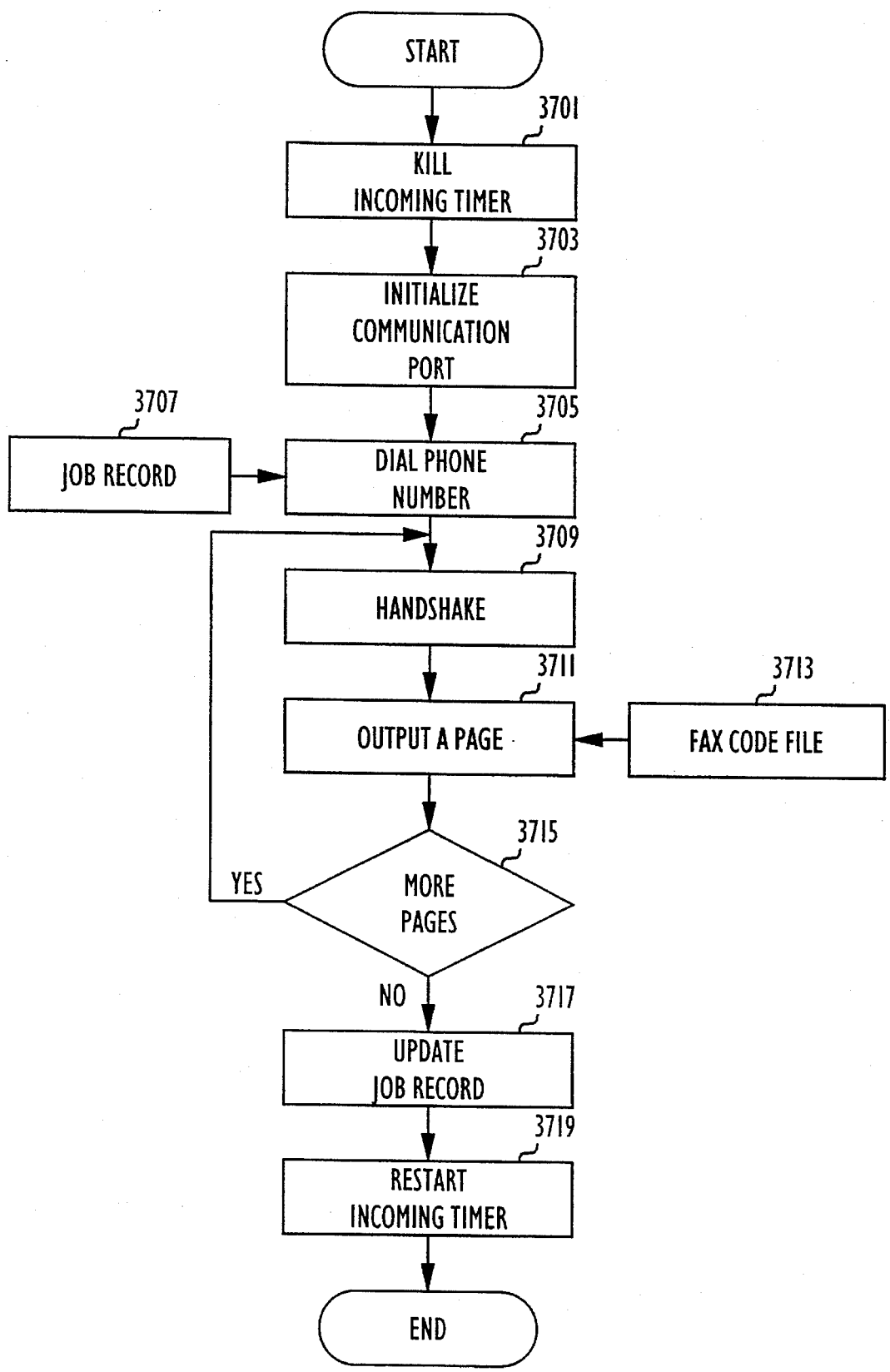
FIG. 38 is a flow diagram of an outgoing timer loop compatible with the present invention.

FIG. 38 illustrates the flow control for the outgoing queue timer. The incoming timer is stopped at 3701 and the communication port is initialized at 3703. A job record 3707 is used to determine the destination for this message and dial the telephone at 3705. After a protocol handshake at 3709, an output page is sent at 3711 which may include a fax code file 3713. The remaining number of pages to be sent is checked at 3715, and if there are more pages, control returns to 3709 so that the additional page or pages can be sent to the destination. Otherwise, if at 3715 there are no more pages to be sent, the job record 3707 is updated at 3717 and the incoming time is restarted at 3719.

Figure 39:
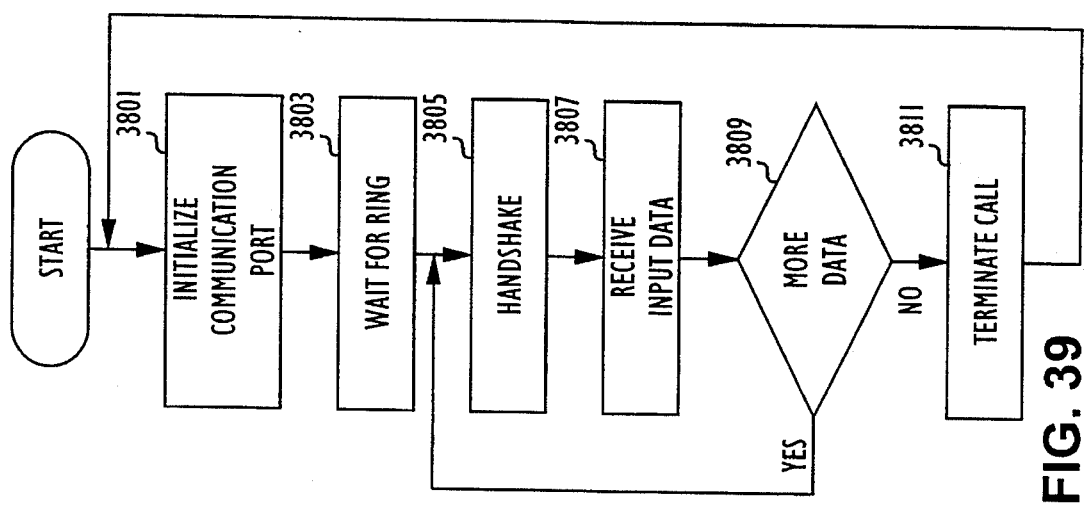
FIG. 39 is a flow diagram of an outgoing timer loop compatible with the present invention.

FIG. 39 illustrates the flow control for the incoming queue timer. At 3801 the communication port is initialized, and the software waits for a ring indicator from an incoming call at 3803. After receiving a ring, the software answers, establishes a connection via a protocol handshake at 3805, and receives input data at 3807. If at 3809 there is more data to be received, control passes back to 3805 so that the pending data may be received. Otherwise, if at 3809 there is no more data to be received, the call is terminated at 3811.

Figure 26:
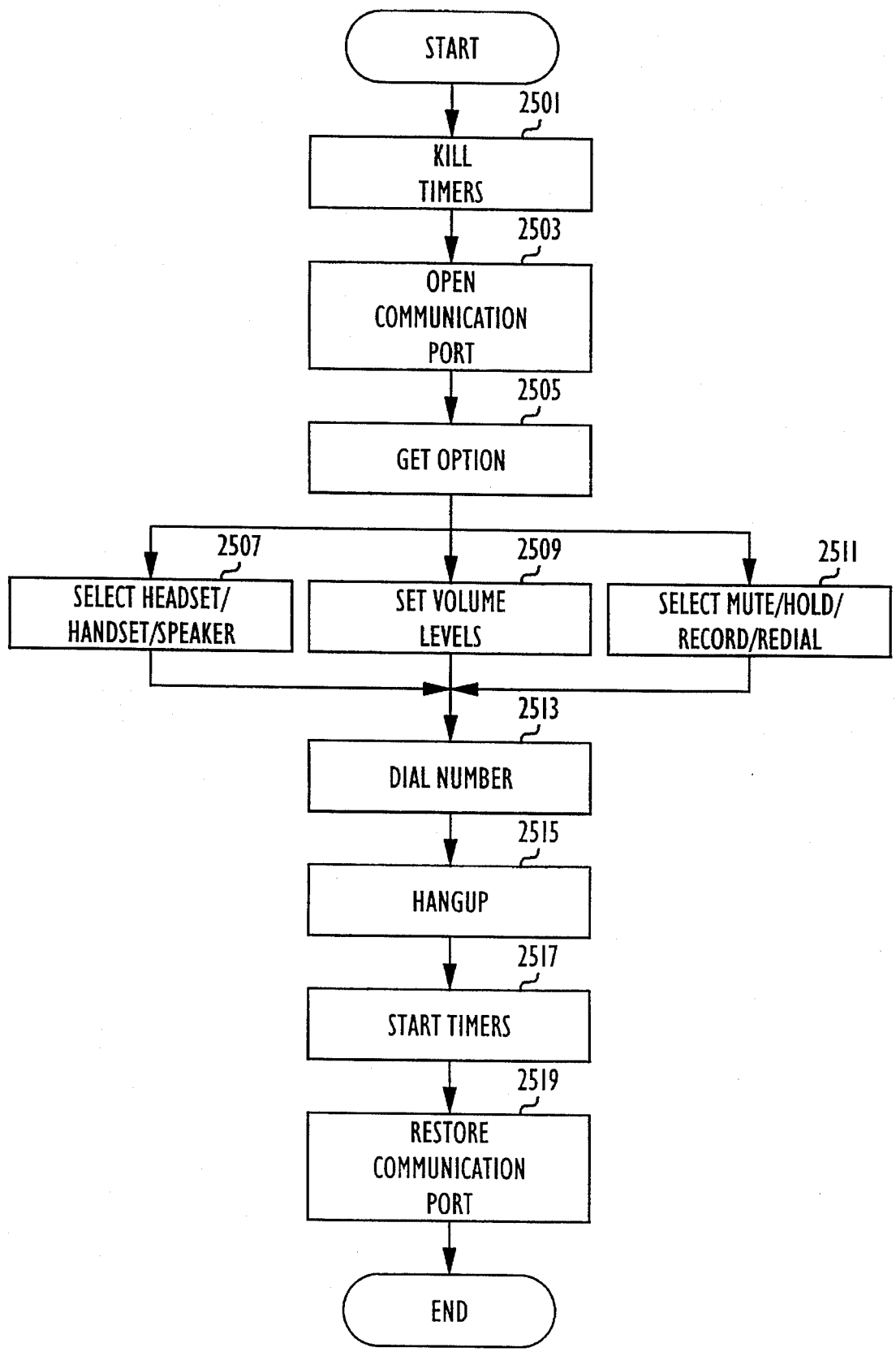
FIG. 26 is a flow diagram of telephone control software compatible with the present invention.

FIG. 26 shows the control software used for a hands-off telephone. The telephone control software is invoked upon selection of the telephone option 115 shown in FIG. 2. Upon selection of the telephone option at 2501, any timers that have been spawned or are currently running are disabled, and at 2503 the communication port for the personal computer is initialized. At 2505 the telephone control software handles any options that have been selected by the user as displayed to the user by FIG. 49. At 2507 the user may logically select between a headset, handset, or speaker phone, at 2509 the user may adjust the volume level of the speaker or the gain of the microphone, and at 2511 the user may select between mute, hold, record, and redial functions for the hands-off telephone. After the user selects options at 2513, a telephone number is dialed and the call initiated. After the call is complete, at 2515 the user hangs up, and at 2517 any timers that had been stopped at 2503 are restarted and at 2519 the communication port is restored to its previous state.

Figure 27:
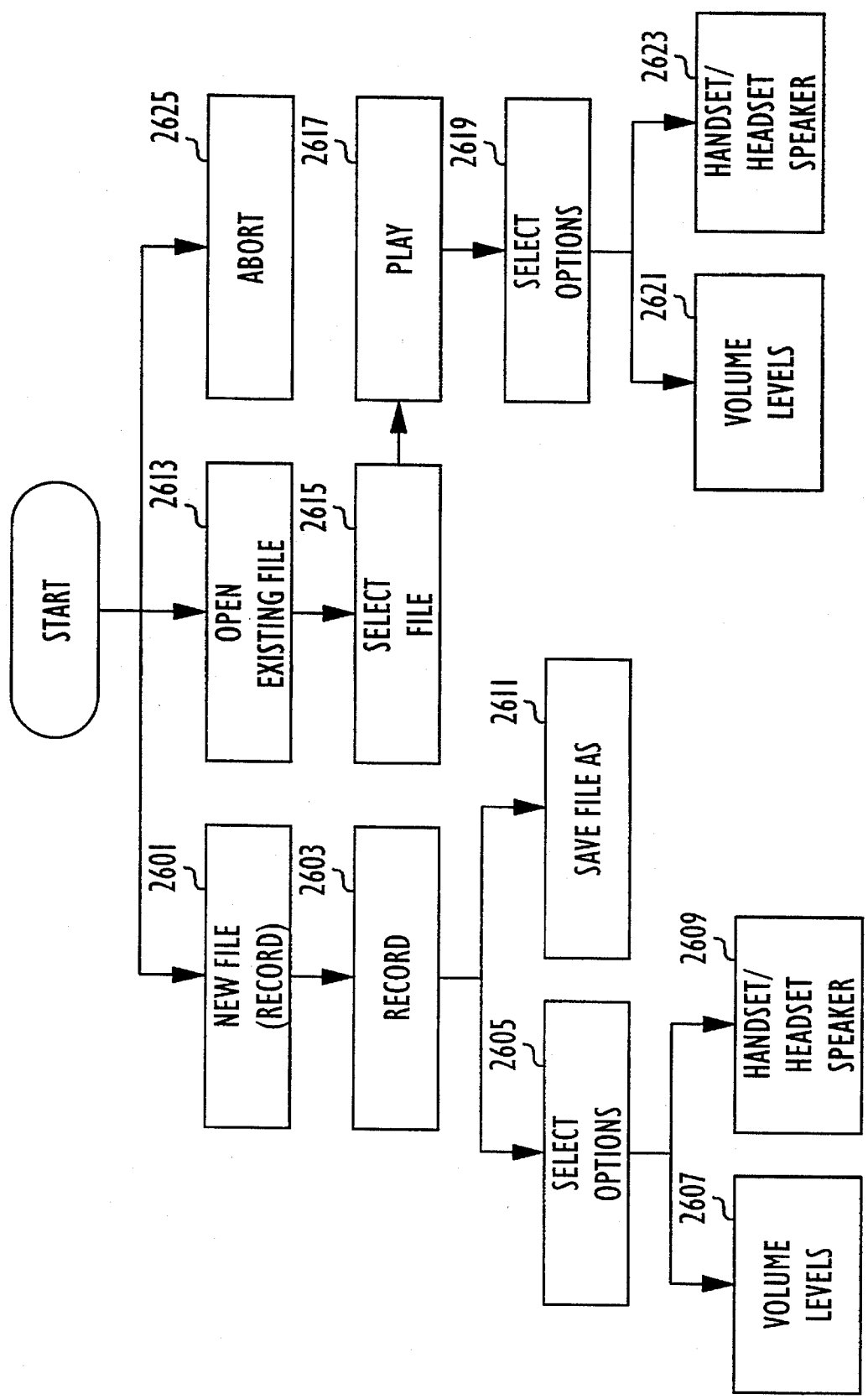
FIG. 27 is a flow diagram of voice mail control software compatible with the present invention.

FIG. 27 shows the voice mail control software that is invoked by option 117 from FIG. 2. The user may select either a new file or record at 2601, open an existing file at 2613, or abort at 2625. Upon selecting a file or record at 2603, the file may be saved at 2611 or the user may select options at 2605. The selectable options include setting the volume or record levels at 2607, or selecting between a handset, a headset, or a speaker phone at 2609 as shown to the user by the voice mail editor display given in FIG. 51. If an existing file is opened at 2613, the file name is selected at 2615 whereupon a user may then play the file at 2617 or select options at 2619. The selectable options from 2619 include setting the volume or record levels at 2621 or selecting between a headset, handset, or speaker phone at 2623. Once a voice mail message has been recorded or opened from a previous session, a graphical representation of the voice mail message is displayed in a window with x and y dimensions, where the x dimension represents time and the y dimension represents the volume of the voice mail message at that point in time. The pointing device may be used to modify the voice message by graphically changing the two dimensional voice message plot. The cursor is placed within the two dimensional voice message plot in order to indicate the portion of the voice message to be modified. A scroll button beneath the two dimensional voice message plot may be used to select the time portion of the message to be displayed within the two dimensional plot window. Time is shown increasing from the left to the right, corresponding to the x axis of the plot. As the scroll button is moved to the right, later portions of the voice message are displayed. As the scroll button is moved to the left, earlier portions of the voice mail message are displayed. A numeric value is shown substantially on the left side of the two dimensional plot window which is updated continuously and corresponds to the time value of the current location on the x axis.

Figure 56:
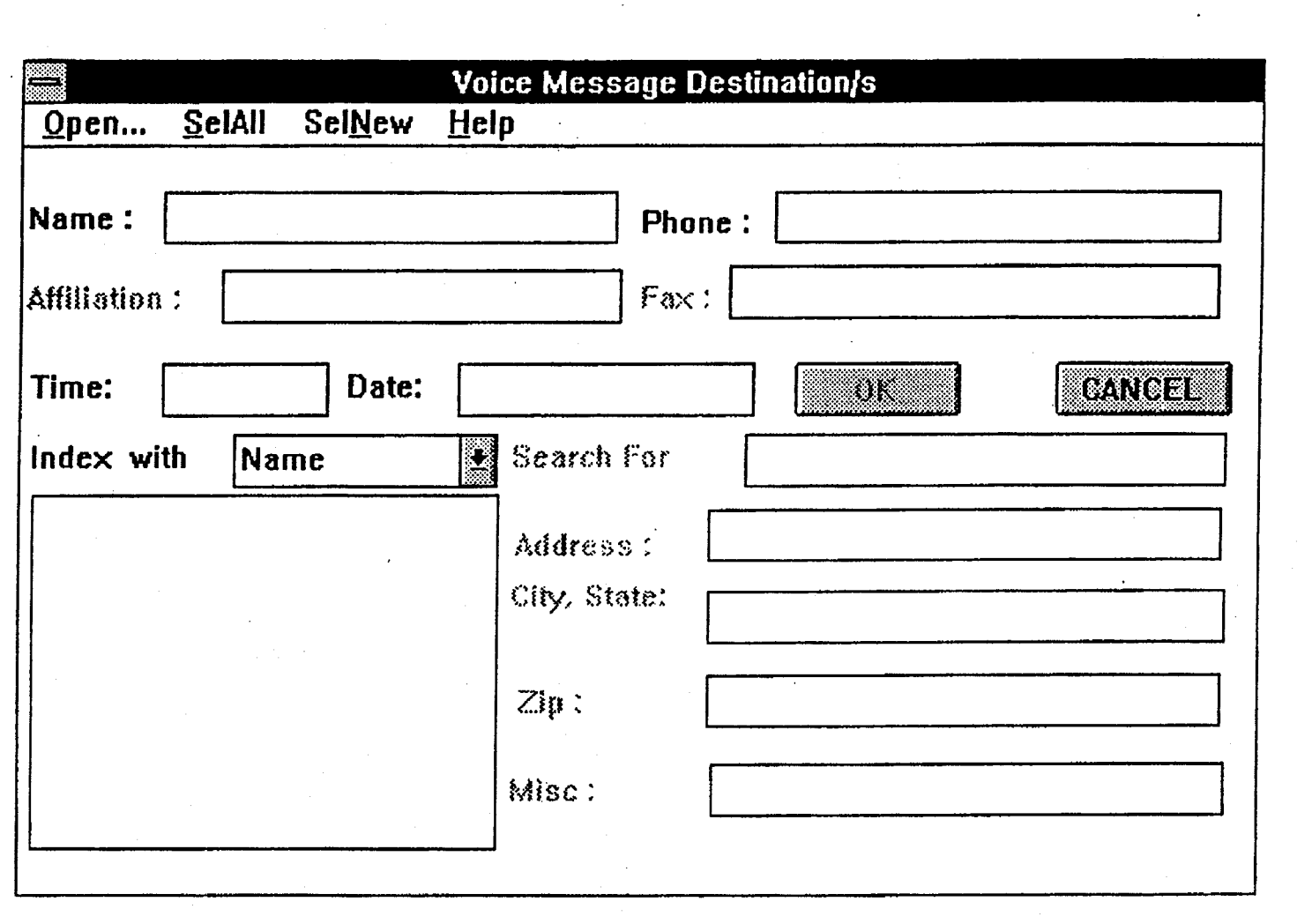

Upon the recording of a voice mail message, the voice mail may be added to the voice mail send queue as displayed to the user in FIG. 50 and described at 159 in FIG. 23. Upon adding a voice mail message to the voice mail queue, the user is prompted as shown in FIG. 56 to enter a name and a telephone number to whom the voice mail message must be sent. The user may select from a predetermined list of voice mail recipients previously set up in the address book as shown to the user in FIG. 55.

Figure 28:
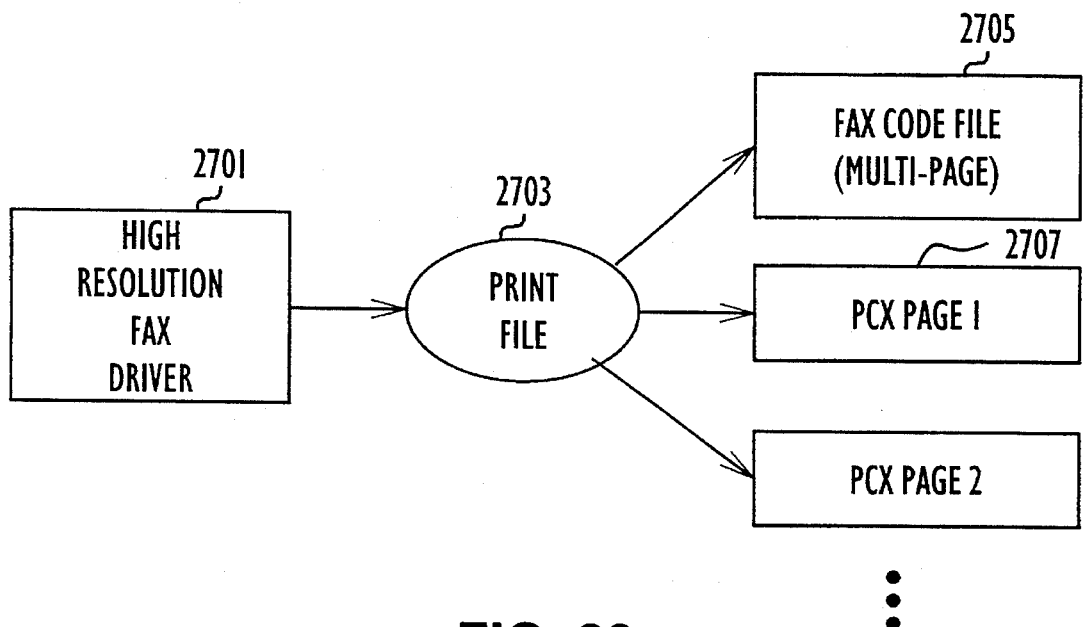
FIG. 28 is a flow diagram of high resolution fax driver software compatible with the present invention.
Figure 29:
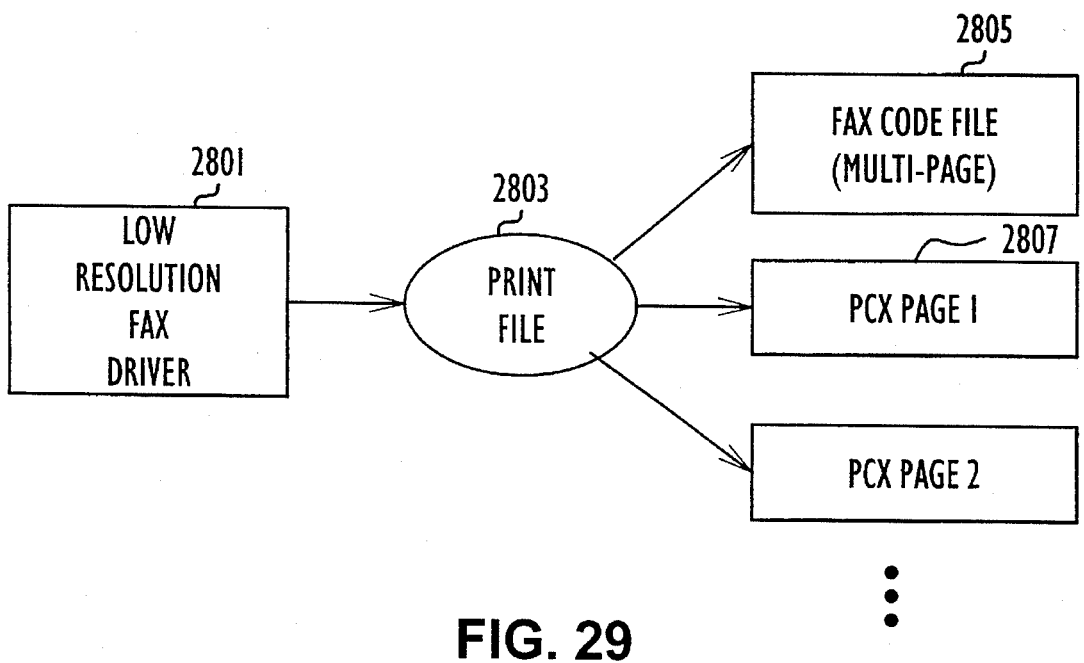
FIG. 29 is a flow diagram of low resolution fax driver software compatible with the present invention.

FIGS. 28 and 29 show how the fax code drivers of the PCS software typically work. The fax capability is tied to the windowing system print command so that facsimile transmissions may be sent by any software that can print through the windowing environment. At 2701 in FIG. 28, a high resolution fax driver examines a print file at 2703 that has been printed by a windowing system application. The print file is then converted and imaged at 2705 into a PCX bit-mapped format which of the correct horizontal and vertical resolution in dots per inch (dpi) for high resolution facsimile devices. FIG. 29 shows an equivalent process used by a low resolution fax driver at 2801. A print file 2803 is converted at 2805 to a low resolution PCX bit-mapped format for use with low resolution facsimile devices. Upon converting a print file to a facsimile document, the facsimile document may be added to the fax out queue as displayed to the user in FIG. 52. The user may select the name and telephone number of a person to send the fax to through the address book function as shown to the user in FIG. 55. Received faxes may be viewed or printed from the fax in queue.

Figure 30:
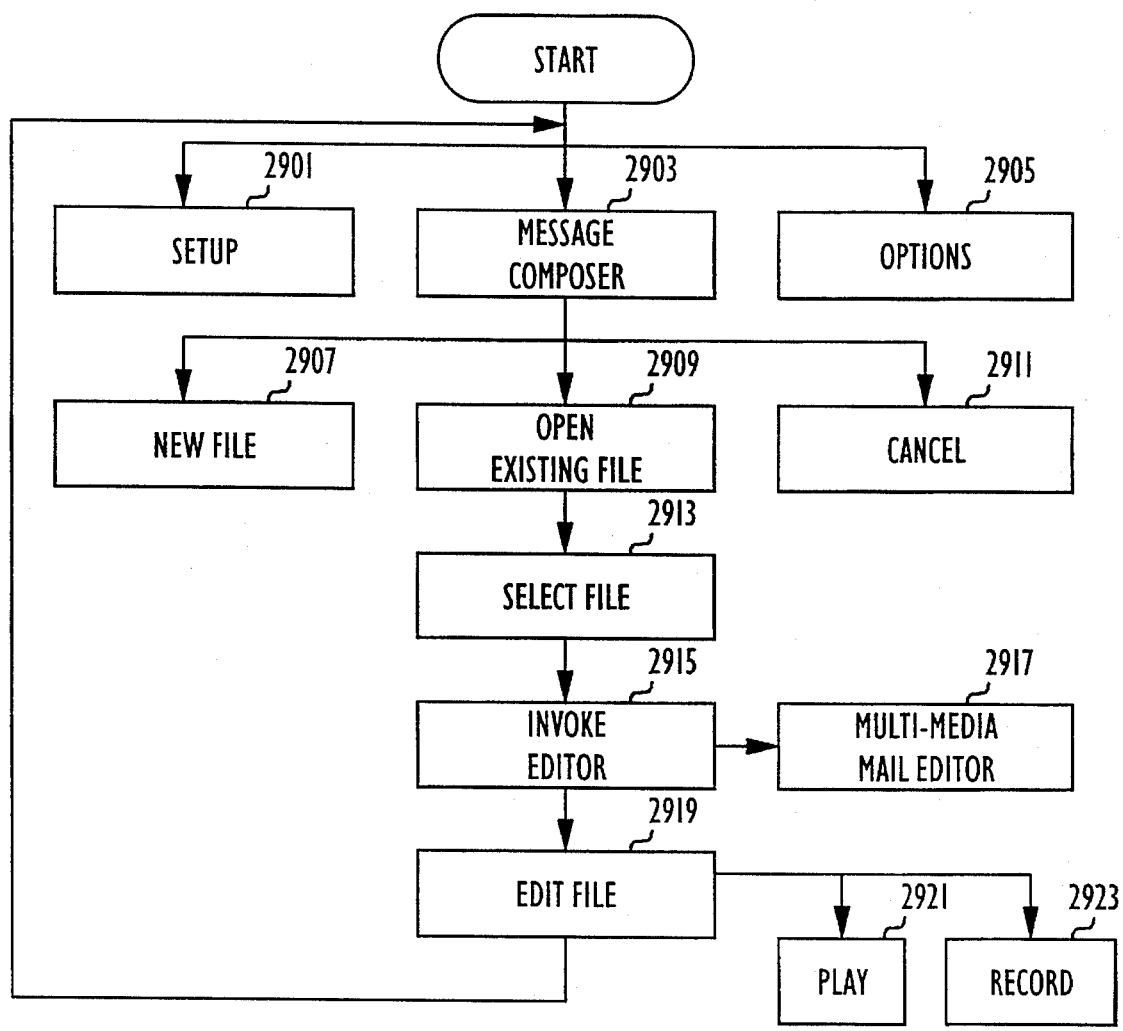
FIG. 30 is a flow diagram of multi media mail control software compatible with the present invention.
Figure 32:
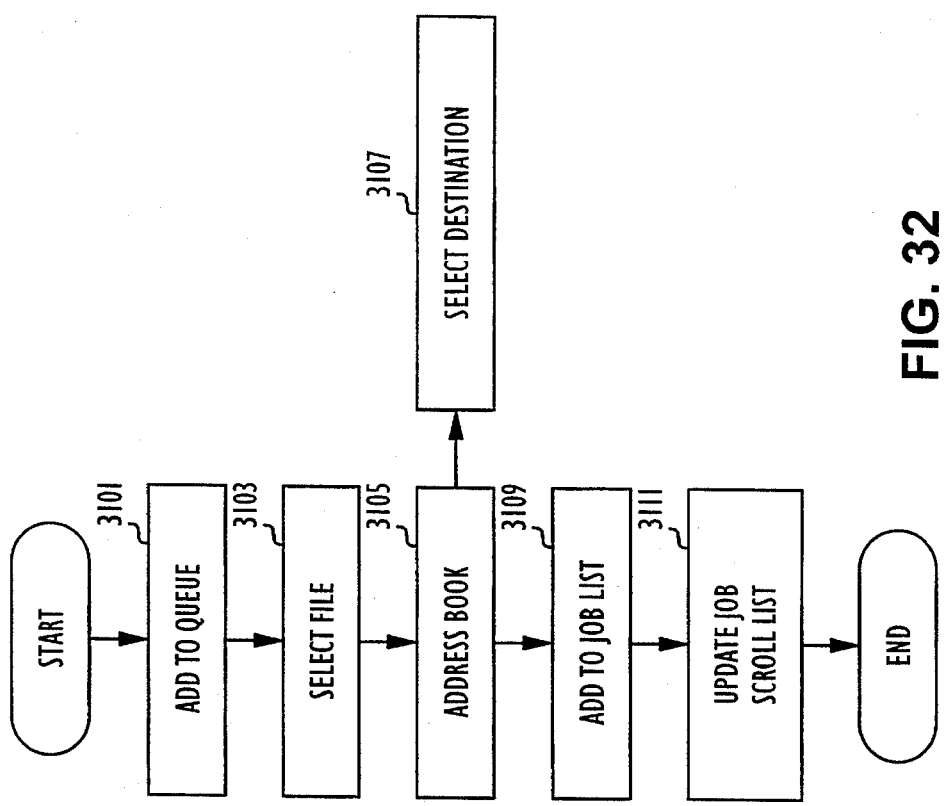
FIG. 32 is a flow diagram of multi media mail transmit software compatible with the present invention.
Figure 31:
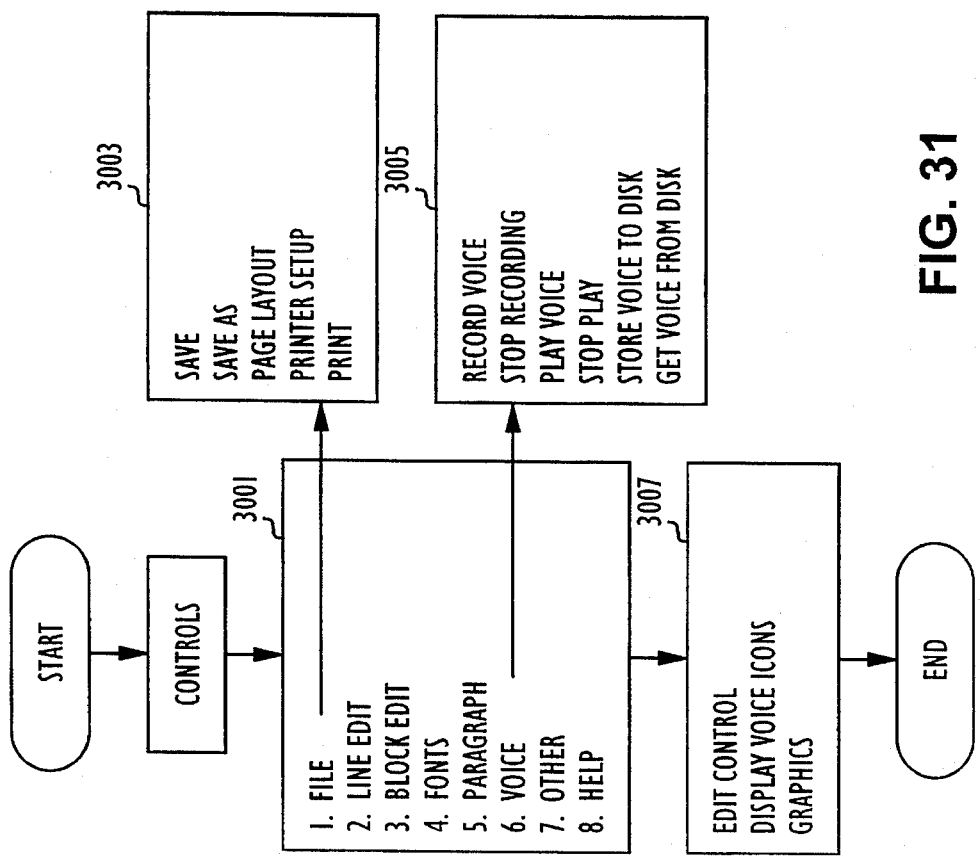
FIG. 31 is a flow diagram of multi media mail editor software compatible with the present invention.
Figure 57:
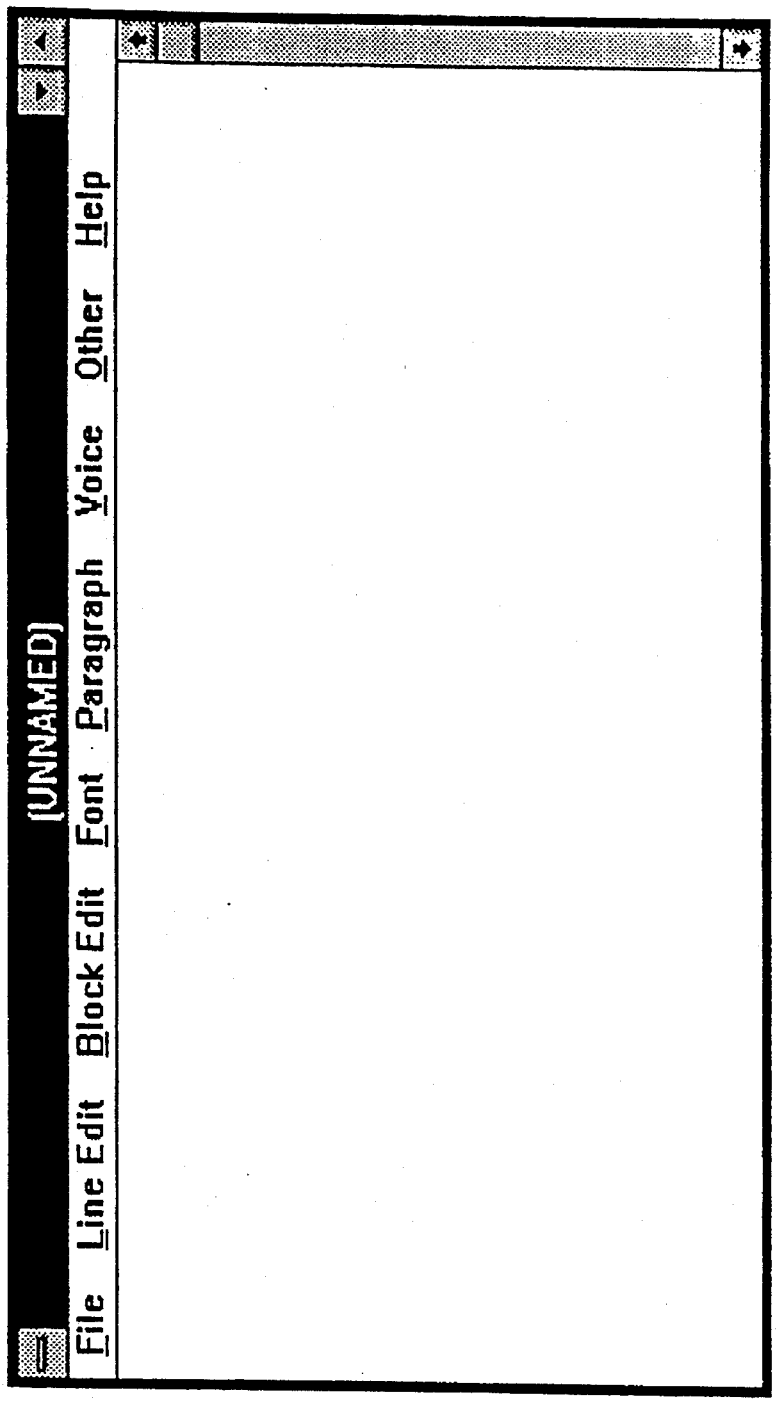
FIG. 57 is a message composer screen display compatible with the present invention.

FIG. 30 shows the multi-media control software that is invoked by a user selecting multi-media option 121 shown to a user in FIG. 2. The user may initialize multi-media mail settings at 2901, select various multi-media mail options at 2905, or invoke a message composer at 2903 as shown to the user by the screen display of FIG. 57. In the message composer 2903, the user may open a new file at 2907 or cancel the message composer at 2911 or open an existing file at 2909. Upon opening an existing file, the file name is selected is 2913 and the multi-media mail editor 2917 is invoked at 2915. While editing a file at 2919 a user may select to alternately play a message at 2921 or record a message at 2923. The user may edit in line mode either inserting, deleting, joining, or splitting lines, edit in block mode by moving, copying, deleting, or highlighting blocks of text, changing the font used to display the text, or changing the indent and justification attributes of paragraphs of text. Standard search features such as forward and backward search and global search and replace are also available through an "other" menu. FIG. 31 further describes the options available that are shown to the user by the multi-media edit display of FIG. 57 at 3001 the file line edit, block edit, fonts, paragraph, voice, "other", and help options are available. If at 3001 the user selects "file", the options shown in 3003, save, save as, page layout, printer setup, and print, are available to the user. If at 3001 the user selects "voice", the options available at 3005, record voice, stop recording, play voice, stop play, store voice to disk, and get voice from disk, are available to the user. After selecting from edit controls 3001, at 3007 the appropriate action is taken by the PCS software, the voice icon is displayed, and any additional graphics are also displayed.

After a multi-media message has been created, at 3101 the user may add a message to the send queue. Upon adding the message, at 3103 the user selects the name and telephone number of a person to send a message to, or at 3105 selects a name from the address book and at 3107 selects a destination from the address book to send the message to. The message is then added to the job list at 3109 at 3111 the job scroll list is updated.

Figure 33:
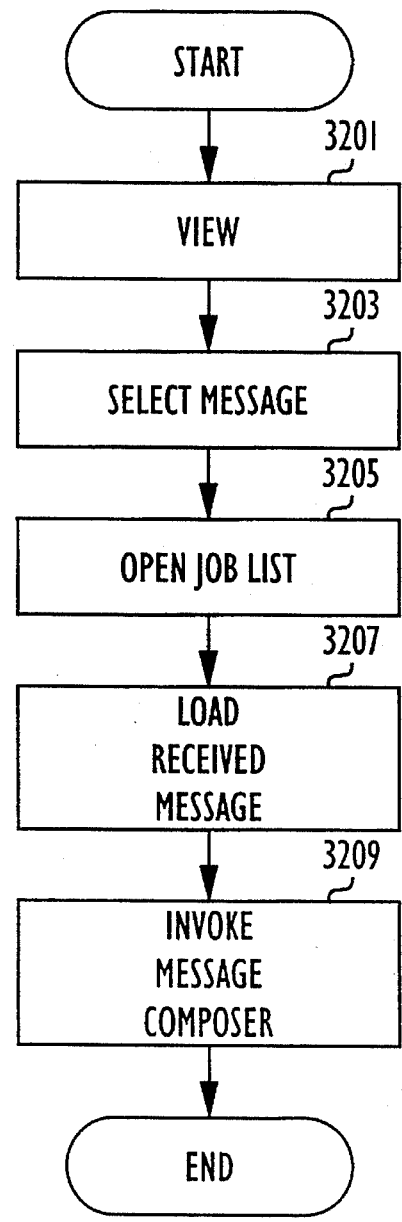
FIG. 33 is a flow diagram of multi media mail receive software compatible with the present invention.

FIG. 33 shows the options available when a multi-media message has been received. At 3201 the user may select and view the message. At 3203 the software selects the appropriate message, opens the job list at 3205, loads the received message at 3207 and invokes the message composer at 3209 in order to display the received multi-media message.

Figure 34:
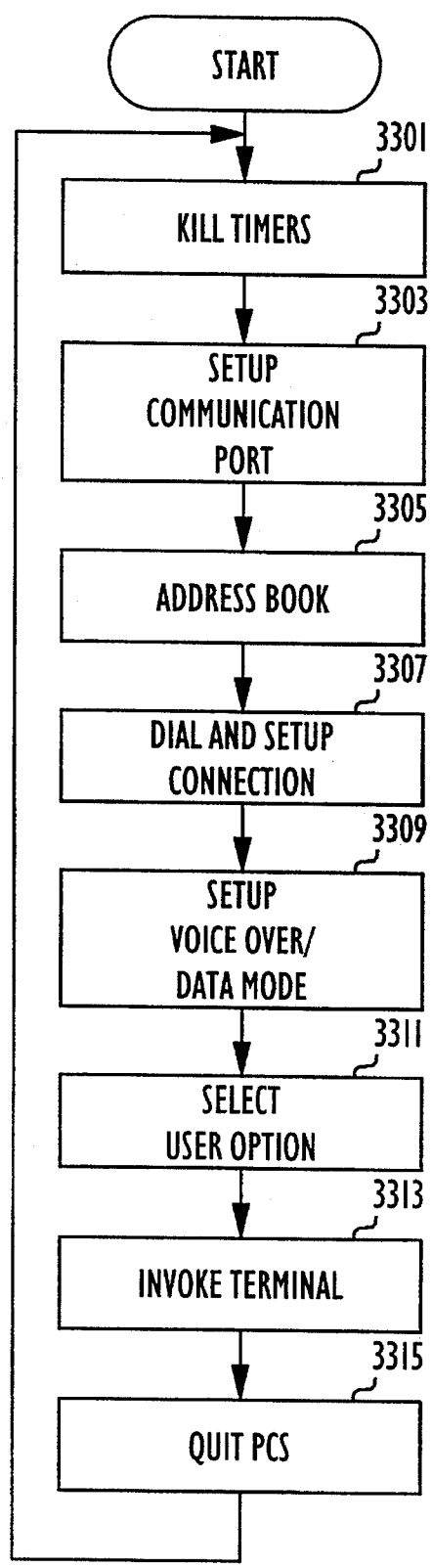
FIG. 34 is a flow diagram of show and tell transmit software compatible with the present invention.

FIG. 34 shows the software control procedure used with the show and tell feature to provide data over voice capability when selected at 123 from FIG. 2. At 3301 any existing timers are disabled and the communications port is initialized at 3303. The destination for any messages is accessed from the address book at 3305, whereupon the telephone number is dialed and the connection is set up at 3307. Upon detecting a successful connection, the data over voice mode is initialized at 3309 while a message is being transmitted at 3311 the user may select options of either quitting PCS at 3315, or invoking a terminal emulation at 3313. The data over voice connection is accomplished by multiplexing the bandwidth of the connection as described elsewhere in this specification.

Figure 35:
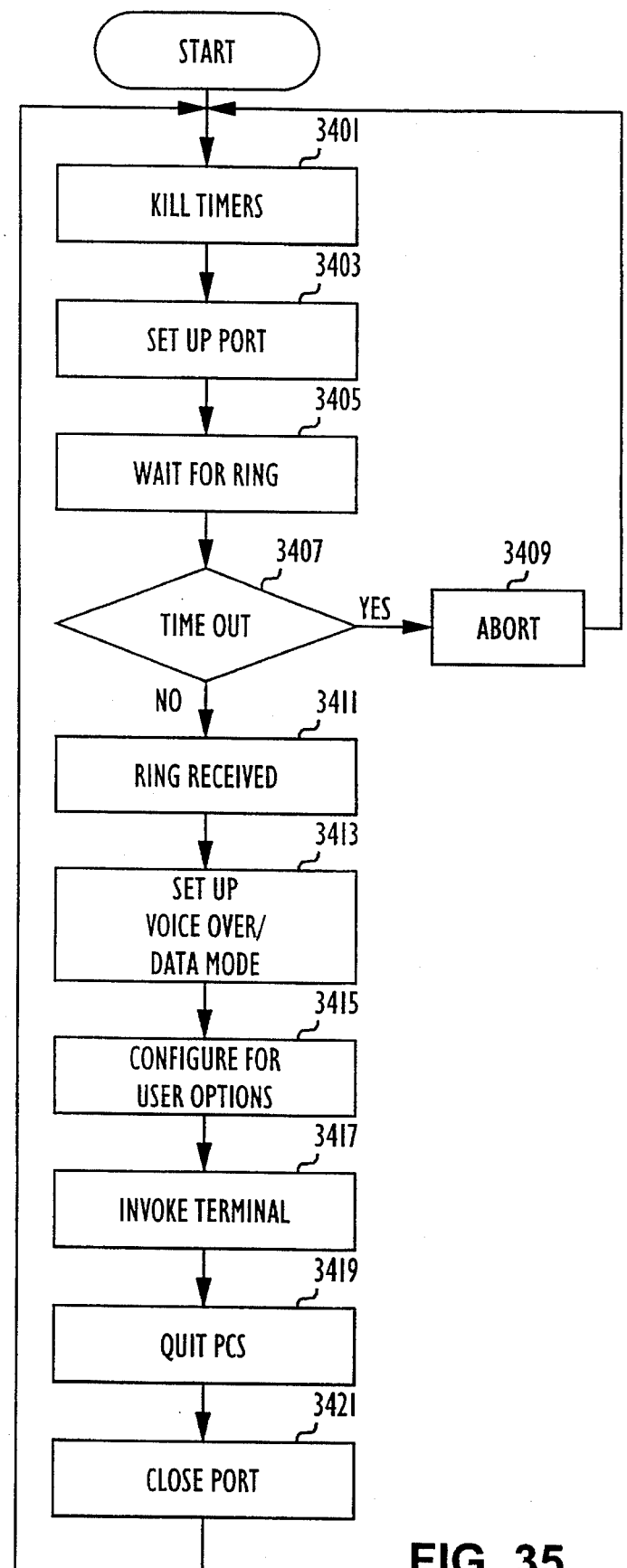
FIG. 35 is a flow diagram of show and tell receive software compatible with the present invention.

FIG. 35 shows the control procedure used when receiving data over voice messages. At 3401 any existing timers are disabled and the communications port is initialized at 3403. At 3405 the software waits for a ring indicator. If, after a predetermined amount of time, no ringing indicator is detected, a timeout occurs at 3407 whereupon the PCS software aborts are returns at 3409. Otherwise, at 3411 a rang indicator is received, the data over voice connection is established at 3413, and the user may select options at 3415 either to quit the PCS software at 3419 and close the communication port at 3421, or invoke terminal emulation at 3417.

Figure 36:
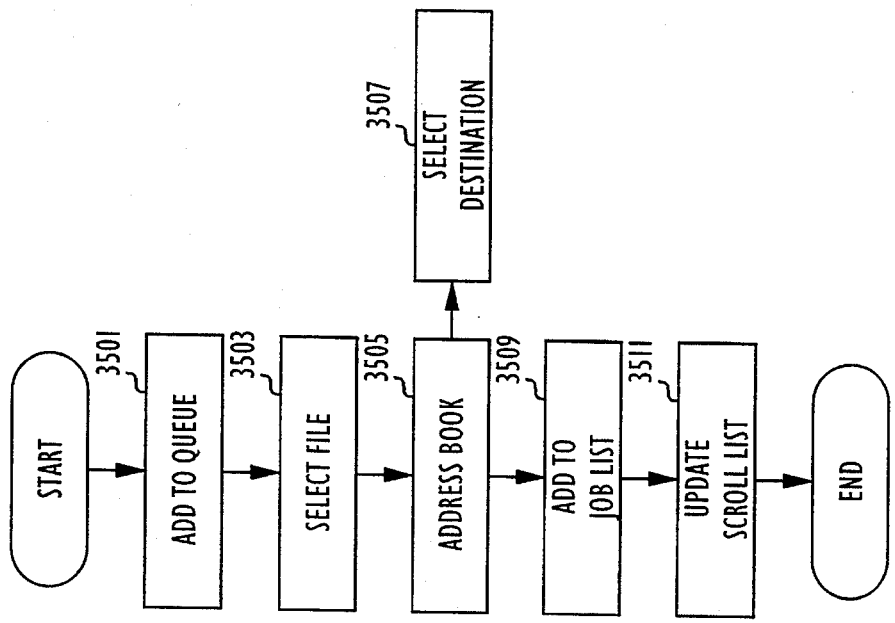
FIG. 36 is a flow diagram of voice mail transmit software compatible with the present invention.

FIG. 36 shows the control procedure used when transmitting voice mail messages. At 3501 a voice mail message is added to the send queue, whereupon at 3503 the user specifies the message file name, and at 3505 indicates a nee from a previously entered address book entry 3505 and destination telephone number 3507 to send the message to. The message is then added to the job list at 3509, and the queue display is updated at 3511.

Figure 37:
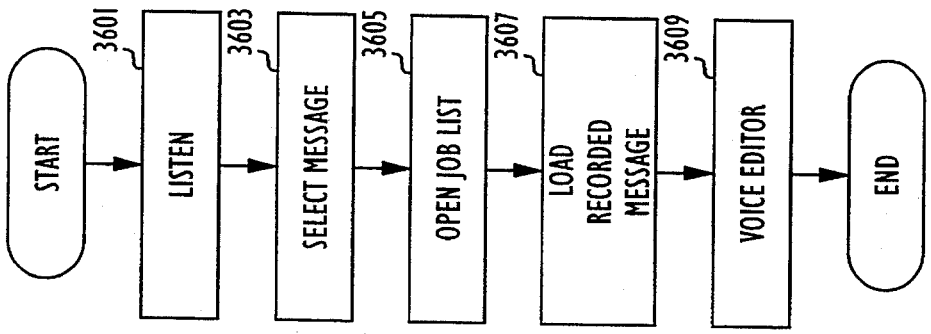
FIG. 37 is a flow diagram of voice mail receive software compatible with the present invention.

FIG. 37 shows the control procedure used when receiving voice mail messages. At 3601 a voice mail message is received and recorded by the PCS software. At 3603 the user selects a message to be reviewed or edited, after which the software opens the job list at 3605, loads the selected recorded message into memory at at 3607, and invokes the voice editor at 3609 with the selected recorded message. The user may then select various functions from within the voice editor to review or edit the message as previous described above.

Data Structures Description

Descriptions of the data structures and variable names and types are given below for the preferred embodiment of the present invention. The preferred embodiment is written the in C programming language runs under Microsoft Windows software on an IBM PC or compatible system, however, it will be recognized that these data structures and methods are generic and potentially useful for a wide variety of other windowing software, systems, and programming languages.

Address Book

Address key types are used to indicate how information within the address book should be displayed to the user:

| | | |
|---|---|---|
| KEY_NAME | 0 | list addresses by name |
| KEY_AFFILIATION | 1 | by affiliation |
| KEY_STREETADRS | 2 | by streetadrs code |
| KEY_CITYSTATE | 3 | by citystate code |
| KEY_ZIP | 4 | by zip code |
| KEY_PHONE | 5 | by phone code |
| KEY_FAX | 6 | by fax code |
| KEY_MISC | 7 | by misc code |
| KEY_TYPE_COUNT | 8 | number of key types |

The address entry structure defines what fields are associated with each address book entry:

```
s_address_entry_struct
    unsigned int delFlag ;          delete flag
    unsigned int caName ;           Name field
    unsigned int caAffiliation ;    Affiliation field
    unsigned int caStreetAdrs ;     Street Address field
    unsigned int caCityState ;      City State field
    unsigned int caZip ;            Zip field
    unsigned int caPhone ;          Phone Number field
    unsigned int caFax ;            Fax Number field
    unsigned int caMisc ;           Miscellaneous field
Key Names [KEY_TYPE_COUNT] =
    "Name",
    "Affiliation",
    "StreetAdrs",
    "CityState",
    "Zip",
    "Phone",
    "Fax",
    "Misc"
```

The following character strings are used to hold address book information:

```
        char g_adrsbooktemp[MAX_FILE_NAME_LEN] =
        "temp.adr" ;
static  char g_ClipboardFormat[] = "CF_FLOCOM" ;
static  char g_adrsbookDlgName[] = "AdrsBkDlg" ;
static  char g_adrsbookFileName[MAX_FILE_NAME_LEN] ;
static  char g_FaxStr[ADDRESS_ENTRY_FIELD_SIZE] ;
static  char g_PhoneStr[ADDRESS_ENTRY_FIELD_SIZE] ;
static  char g_NameStr[ADDRESS_ENTRY_FIELD_SIZE] ;
```

Fax Send and Receive Queues

A structure definition is used to indicate how information within the fax send and receive queues is stored:

```
struct s_jobDesc {
    union {
        unsigned char phoneNum[32];
        short nbrOfJobs;
    } u1;
    union {
        short nextJobNum;
        unsigned char date[16];
    } u2;
    unsigned char title[64];
        unsigned char receiver[32];
        unsigned char coverFile[32];
        unsigned char telNum[32];
    unsigned char faxCdFile[8];
    unsigned char time[8];
    WORD zState;
        time_t zTime;
    short zPages;
    short zResult;
    int zTries;
    char zType;
    char zDummy[19];
} t_jobDesc, *tp_jobDesc, far *tpl_jobDesc;
static t_jobDesc g_curJob, g_bufJob;
```

Multi Media Send and Receive Queues

The following structure definition is used to indicate how information within the multi media send and receive queues is stored:

```
struct s_jobDesc {
    union {
        unsigned char phoneNum[32];
        short    nbrOfJobs;
    } u1;
    union {
        short nextJobNum;
            unsigned char date[16];
    } u2;
    unsigned char title[64];
        unsigned char receiver[32];
        unsigned char coverFile[32];
        unsigned char telNum[32];
    unsigned char MMCdFile[8];
    unsigned char time[8];
    WORD zState;
    time_t zTime;
    short zPages;
    short zResult;
    int zTries;
    char zType;
    char zDummy[19];
} t_jobDesc,. *tp_jobDesc, far *tpl_jobDesc;
```

Show and Tell

The show and tell structure definition is the same as that used in the address book. The static variables to define field sizes are given below:

```
/*
Static Variables Used For Address Book Proc. The Variable
Names Are Same As The ones In "Adrsbook", So That Same
Modules Could Be Used
*/
#define ADDRESS_ENTRY_FIELD_SIZE        64
#define NUM_MEMBERS_ADRS_STRUCT          8
#define NUM_ADRS_FIELDS                  8
```

```
#define VAL_PAUSE                                2000
#define PCKT_COM_TIME                              20
#define WAIT_RING_TIME                            120
#define DIAL_TIME                                  60
//1029 vasanth for delay before %p1 command
#define DELAYTIME                                  10
/* Address Key Types */
#define KEY_NAME              0  /* list addresses by name
*/
#define KEY_AFFILIATION       1  /* by affiliation */
#define KEY_STREETADRS        2  /* by streetadrs code */
#define KEY_CITYSTATE         3  /* by citystate code */
#define KEY_ZIP               4  /* by zip code */
#define KEY_PHONE             5  /* by phone code */
#define KEY_FAX               6  /* by fax code */
#define KEY_MISC              7  /* by misc code */
#define KEY_TYPE_COUNT        8  /* number of key types */
```

Voice Mail Send and Receive Queues

The voice mail structure definition and static variables to define field sizes are given below:

```
#define READCOUNT                              24000
#define FRAME_SIZE                              2000
#define SCROLL_STEP                                4
#define POS_IN_PAGE                              100
#define T_POSITION                              0.02
#define COMP_FRAME_SZ                             24
#define BYTES_IN_FRAME                         12000
#define BYTE_NUMBER                                6
#define WAVE_COEF                                  1
#define FORMAT_STR1    "%s -> %s # %s Schedule: %s: %s"
#define FORMAT_STR2    "%s -> %s # %s Sent: %s: %s"
#define OUT_JOBS_FILE_NAME   "jobs"
#define IN_JOBS_FILE_NAME    "jobs"
#define MAX_JOBS                                  10
struct s_jobDesc {
    union {
            unsigned char phoneNum[32];
        short      nbrOfJobs;
    } u1;
    union {
        short nextJobNum;
            unsigned char date[16];
    } u2;
    unsigned char title[64];
        unsigned char receiver[32];
        unsigned char coverFile[32];
        unsigned char telNum[32];
    unsigned char faxCdFile[8];
    unsigned char time[8];
    WORD zState;
    time_t zTime;
    Short zPages;
    short zResult;
    int zTries;
    char zType;
    char zDummy[19];
} t_jobDesc, *tp_jobDesc, far *tpl_jobDesc;
static   HWND hwndVMDlg;
static   int g_cxWave ;      /* width of waveform window */
static   int g_cyWave ;      /* height of waveform window */
static   int g_nSamples ;    /* sample counter */
static   char g_outVMDir[MAX_FILE_NAME_LEN];
static   char g_inVMDir[MAX_FILE_NAME_LEN];
static   HANDLE g_outJobsHndl = 0;
static   HANDLE g_inJobsHndl = 0;
static   HANDLE g_jobFileHndl = 0;
static   t_jobDesc g_outJobs0;
static   t_jobDesc g_outJobsn;
static   t_jobDesc g_inJobs0;
static   t_jobDesc g_inJobsn;
static   short     g_numOfOutJobs =0;
static   short     g_numOfInJobs =0;
static   int g_VMOutIx = -1;
static   int g_VMInIx = -1;
```

```
static   OFSTRUCT  jOfStruct ;
static   FILE   *vdata ;
static   OFSTRUCT  OfStruct ;
static   int  hFile ;
static   OFSTRUCT  oOfStruct ;
static   int  hoFile ;
static   char  g_inFileName[MAX_FILE_NAME_LEN] ;
static   int  hjFile ;
static   char  g_jFileName[MAX_FILE_NAME_LEN] ;
static   char  g_uFileName[MAX_FILE_NAME_LEN] ;
static   char  g_oFileName[MAX_FILE_NAME_LEN] ;
static   char  g_sendListenFile[MAX_FILE_NAME_LEN] ;
static   char  g_recListenFile[MAX_FILE_NAME_LEN] ;
```

The following are variables to be used to write the playback or record level into the pcs.ini volume field names:

```
char *g_PlayVolume = "Play Volume";
char *g_RecVolume = "Record Volume";
    Default volume levels for record and play:
int g_recPos = 5;
int g_playPos = 5;
char g_MicroVol[10] = ">MV0";    Microphone level to be
                                 used for recording.
char g_PlayVol[10] = ">SV0";     Speaker level to be used
                                 for play.
int g_offhk = FALSE;             Off hook flag indicating that
                                 either record or play is in
                                 progress. If flag is set only
                                 then send packet commands
                                 to increase/decrease
                                 volume level.
```

Below are given Static Variables Used For Address Book Proc. The Variable Names Are Same As The Ones In "Adrsbook.c", So That Same Modules Could Be Used.

```
#define MAX_REC_VOL                               13
#define MIN_VOL_LEVEL                              0
#define MAX_PLAY_VOL                               9
#define MAX_ADRS_ENTRIES                         512
#define ADDRESS_ENTRY_FIELD_SIZE                  64
#define NUM_MEMBERS_ADRS_STRUCT                    8
#define NUM_ADRS_FIELDS                            8
```

The present inventions are to be limited only in accordance with the scope of the appended claims, since others skilled in the art may devise other embodiments still within the limits of the claims.

Microfiche Appendix

The microfiche appendix to the present patent application contains the source code for the software running on the personal computer and the source code for the software running on the voice control DSP/CODEC.

We claim:

1. A method for communication of voice and data information, comprising the steps of:

receiving local voice signals from a local user;

conveying remote voice signals from a remote user to the local user;

converting the local voice signals into outgoing digital voice data;

converting incoming digital voice data into the remote voice signals;

compressing the outgoing digital voice data into compressed outgoing digital voice data;

decompressing compressed incoming digital voice data into the incoming digital voice data;

packetizing the compressed outgoing digital voice data into compressed outgoing digital voice data packets;

placing headers on each of the compressed outgoing digital voice packets;

depacketizing the compressed incoming digital voice data packets into the compressed incoming digital voice data;

packetizing computer digital data into computer digital data packets;

placing headers on each of the computer digital data packets;

multiplexing the compressed outgoing digital voice data packets with outgoing computer digital data packets to produce an outgoing packet stream;

transmitting the outgoing packet stream;

receiving multiplexed incoming data which contains incoming computer digital data packets multiplexed with the compressed incoming digital voice data packets; and demultiplexing the incoming computer digital data packets and the compressed incoming digital voice data packets.

2. The method according to claim 1 further including the steps of:

detecting quiet periods in which below threshold local voice signals are received and producing therefrom a quiet signal;

transmitting digital voice data packets and outgoing computer digital data packets when the quiet signal indicates a presence of local voice signals; and transmitting only computer digital data packets when the quiet signal indicates an absence of local voice signals.

3. A method according to claim 2 wherein said detecting quiet periods step includes the steps of:

determining a power of a at least a portion of the compressed outgoing digital voice data packet including a plurality of samples of the local voice signals as a function of the summation of the square of each sample over the portion of the compressed outgoing digital voice data packet; and comparing the power of the portion of the compressed outgoing digital voice data packets to a preselected threshold to indicate whether the compressed outgoing digital voice data packet is a silent compressed outgoing digital voice data packet.

4. The method according to claim 3 wherein the multiplexing and transmitting of the compressed outgoing digital voice data packets and outgoing computer digital data packets when the quiet signal indicates the presence of local voice signals, includes the steps of:

collecting and buffering outgoing computer digital data packets;

collecting compressed outgoing digital voice data including non-silent compressed outgoing digital voice data packets and silent compressed outgoing digital voice data packets;

buffering non-silent compressed outgoing digital voice data packets;

discarding silent compressed outgoing digital voice data packets; and transmitting non-silent compressed outgoing digital voice data packets on a priority basis with respect to outgoing computer digital data packets to ensure integrity of real time voice transmission by monitoring the buffering of the non-silent outgoing compressed digital voice data packets.

5. The method according to claim 1 wherein the method further includes the steps of:

detecting corrupted incoming computer digital data packets and requesting retransmission in response thereto; and detecting corrupted compressed incoming digital voice data packets and ignoring such corruption to preserve real time operation of voice transmission.

6. A communication module for use with a personal computer, comprising:

a communications interface connected to the personal computer and operable for receiving computer data from the personal computer;

communication line interface connected to a communications line;

voice interface means for receiving local voice signals from a local user and for conveying remote voice signals from a remote user to the local user;

conversion means connected to the voice interface means for converting the local voice signals into outgoing digital voice data and for converting incoming digital voice data into the remote voice signals;

means connected to the conversion memos for compressing the outgoing digital voice data into compressed outgoing digital voice data packets and for decompressing compressed incoming digital voice data packets into the incoming digital voice data, each of the compressed outgoing digital voice data packets having headers and each of the compressed incoming digital voice data packets having headers;

means connected to the communication line interface, connected for receiving the compressed outgoing digital voice data packets from the means for compressing, connected for receiving computer data from the personal computer through the communications interface, operable for 1.) placing the computer data into computer data packets having headers;

2.) multiplexing the compressed outgoing digital voice data packets and the computer data packets to produce multiplexed outgoing data;

3.) sending the multiplexed outgoing data to the communication line interface for transmission over the communication line;

4.) receiving multiplexed incoming data from the communications line interface, the multiplexed incoming data containing incoming computer data packets multiplexed with the compressed incoming digital voice data packets, 5.) demultiplexing the incoming computer data packets and the compressed incoming digital voice data packets, 6. ) removing the incoming computer data from the incoming computer data packets;

7.) sending the computer data to the personal computer through the communications interface; and 8.) sending the compressed incoming digital voice data packets to the means for compressing.

7. The communication module of claim 6 wherein the compressed outgoing digital voice data packets and the computer data packets conform to the CCITT V.42 packet protocol.

8. The communication module of claim 6 wherein the means connected for receiving computer data from the personal computer through the communications interface is further operable for entering a packet mode of communication on the communication interface between the communication module and the personal computer by receiving a break command on the communications interface from the personal computer to initiate the packet mode of communicating both control information and data.

9. The communication module of claim 8 wherein the means connected for receiving computer data from the personal computer through the communications interface is further operable for receiving a qualified packet having a stream mode identifier; and switching the communications module from the packet mode of communicating both control information and data into stream mode of communicating data to allow the communication module to receive large amounts of asynchronous information.

10. The communication module of claim 9 wherein the means connected for receiving computer data from the personal computer through the communications interface is further operable for receiving an escape command in stream mode to cause the communications module to enter command state.

* * * * *